US000001414H

United States Statutory Invention Registration [19]

[11] Reg. Number: H1414

Borgen

[43] Published: Feb. 7, 1995

[54] NONVOLATILE MEMORY SYSTEM FOR STORING A KEY WORD AND SENSING THE PRESENCE OF AN EXTERNAL LOADER DEVICE AND ENCRYPTION CIRCUIT

[75] Inventor: Gary S. Borgen, Port Hueneme, Calif.

[73] Assignee: The United States of America as represented by the Secretary of the Navy, Washington, D.C.

[21] Appl. No.: 654,452

[22] Filed: Feb. 12, 1991

[51] Int. Cl.[6] ..... H04L 9/00

[52] U.S. Cl. ..... 380/4; 380/9; 380/21; 380/49; 380/50; 395/425

[58] Field of Search ..... 395/425; 364/443

[56] References Cited

U.S. PATENT DOCUMENTS

| | | | |
|---|---|---|---|
| 4,097,923 | 6/1978 | Eckert, Jr. et al. | 364/464.02 |
| 4,247,908 | 1/1981 | Lockhart, Jr. et al. | 395/325 |
| 4,376,299 | 3/1983 | Rivest | 380/23 |
| 4,392,241 | 7/1983 | Hurst | 380/33 |
| 4,424,573 | 1/1984 | Eckert, Jr. et al. | 364/464.02 |
| 4,470,127 | 9/1984 | Thompson | 395/575 |
| 4,563,546 | 1/1986 | Glitz | 380/49 |
| 4,654,860 | 3/1987 | Ouimet et al. | 375/40 |
| 4,800,590 | 1/1989 | Vaughan | 380/25 |
| 5,046,006 | 9/1991 | Revord et al. | 364/423 |

OTHER PUBLICATIONS

Borgen, "Design of a Nonvolatile Memory System", Master's Thesis, Univ. of Calif., Santa Barbara, Jul. 1989, pp. 1–62.

*Primary Examiner*—Bernarr E. Gregory
*Attorney, Agent, or Firm*—Melvin J. Sliwka; David S. Kalmbaugh

[57] ABSTRACT

A nonvolatile memory system is disclosed which will store a key or digital word for a period of time of approximately three years with minimum power consumption. The nonvolatile memory system includes a nonvolatile static random access memory for receiving and storing a key word from a loader, and a nonvolatile memory sequence control circuit which provides logic signals for controlling read and write operations of the nonvolatile static RAM, as well as logic signals to allow for transfer or down loading of the key word from the loader to the RAM. In addition, the nonvolatile memory sequence control circuit provides logic signals to interface with an encryption device which allows the key word to be transferrred or up loaded from the nonvolatile static RAM to the encryption device and logic signals for storing the key word in a nonvolatile electrically erasable programmable read only memory (PROM) and then bringing the nonvolatile static RAM to a low power standby state. An erasable PROM (EPROM) is used to control the sequencing of operations within the nonvolatile static RAM with addressing for the EPROM being provided by the nonvolatile memory sequence control circuit. The EPROM and the nonvolatile memory sequence control circuit may be also brought to a low power standby state by a power control signal provided by the memory sequence control circuit.

22 Claims, 21 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

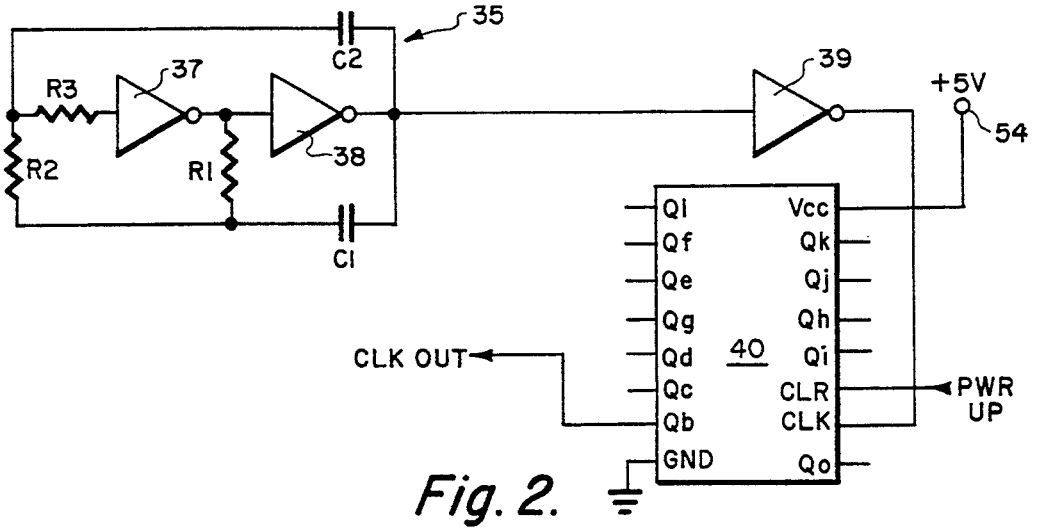
Fig. 2.
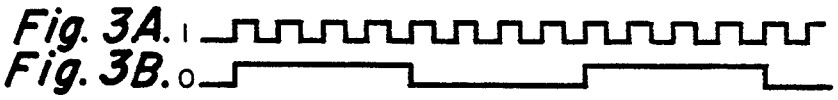
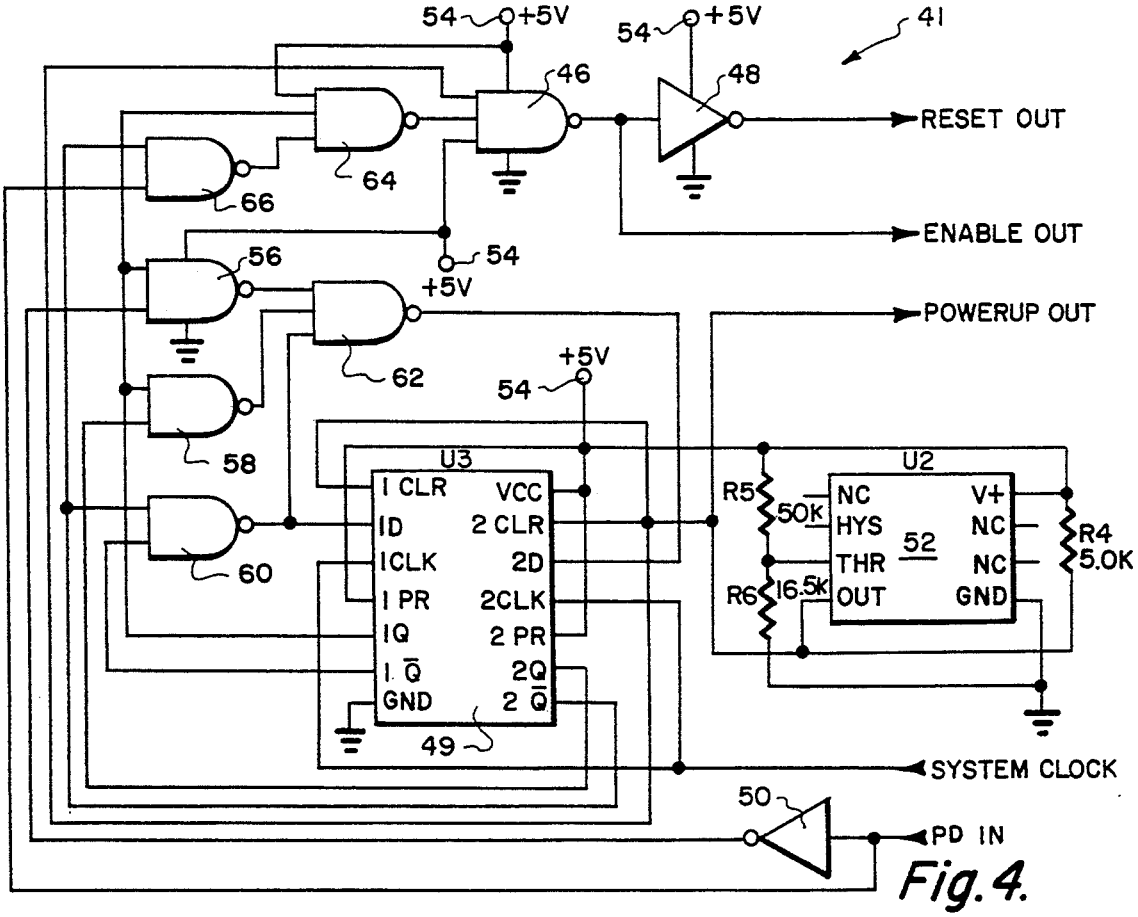
Fig. 4.

| TRUTH TABLE FOR POWER CONTROL CIRCUIT | | | | | | | | | |
|---|---|---|---|---|---|---|---|---|---|
| A | $\bar{A}$ | B | $\bar{B}$ | POWER | PD | A' | B' | RESET | ENABLE |
| 0 | 1 | 0 | 1 | 0 | 0 | 0 | 0 | 0 | 1 |
| 0 | 1 | 0 | 1 | 1 | X | 0 | 1 | 1 | 0 |
| 0 | 1 | 1 | 0 | X | X | 1 | 0 | 1 | 0 |
| 1 | 0 | 0 | 1 | X | 1 | 1 | 0 | 1 | 0 |
| 1 | 0 | 0 | 1 | X | 0 | 1 | 1 | 0 | 1 |
| 1 | 0 | 1 | 0 | X | X | 1 | 1 | 0 | 1 |

X = Don't Care

| REDUCED TRUTH TABLE FOR POWER CONTROL CIRCUIT | | | | | |
|---|---|---|---|---|---|
| PRESENT STATE | | | NEXT STATE | | |
| A | B | PD | A' | B' | RESET |
| 0 | 0 | X | 0 | 1 | 1 |
| 0 | 1 | X | 1 | 0 | 1 |
| 1 | 0 | 1 | 1 | 0 | 1 |
| 1 | 0 | 0 | 1 | 1 | 0 |
| 1 | 1 | X | 1 | 1 | 0 |

X = Don't Care

AO

DATE IN
0 0 1 1 0

/WE

TRI-STATE
D1

TRI-STATE
D2
phi 0
phi 1
phi 2
phi 3
phi 012
120
122
124
126
128
110
114

CLOCK
RESET
D Q
CLK
CLR Q
116
118
130
132
134
RESET SYSTEM
112
Fig. 12A. CLOCK
Fig. 12B. PHI 0
Fig. 12C. PHI 1
Fig. 12D. PHI 2
Fig. 12E. PHI 3
Fig. 12F. PHI 012
Fig. 12G. RESET

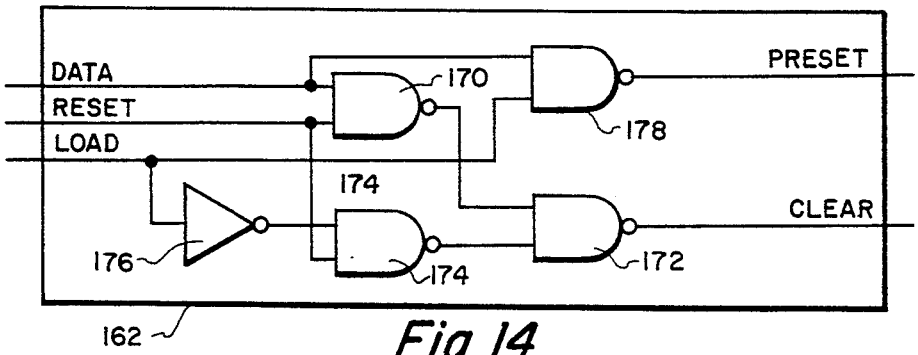
Fig. 14.
| LOAD TRUTH TABLE | | | |
|---|---|---|---|
| LOAD | RESET | DATA | CLEAR |
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |
Fig. 15A.
| PRESET TRUTH TABLE | | | | | |
|---|---|---|---|---|---|
| LOAD | DATA BIT | RESET | PRESET | CLEAR | Q |
| 0 | 0 | 1 | 1 | 1 | X |
| 0 | 1 | 1 | 1 | 1 | X |
| 1 | 0 | 1 | 1 | 0 | 0 |
| 1 | 1 | 1 | 0 | 1 | 1 |
X = Don't Care
Fig. 15B.
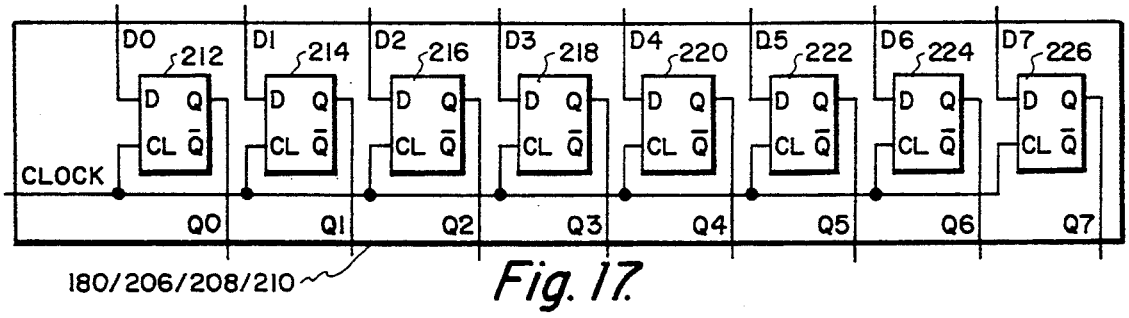
Fig. 17.

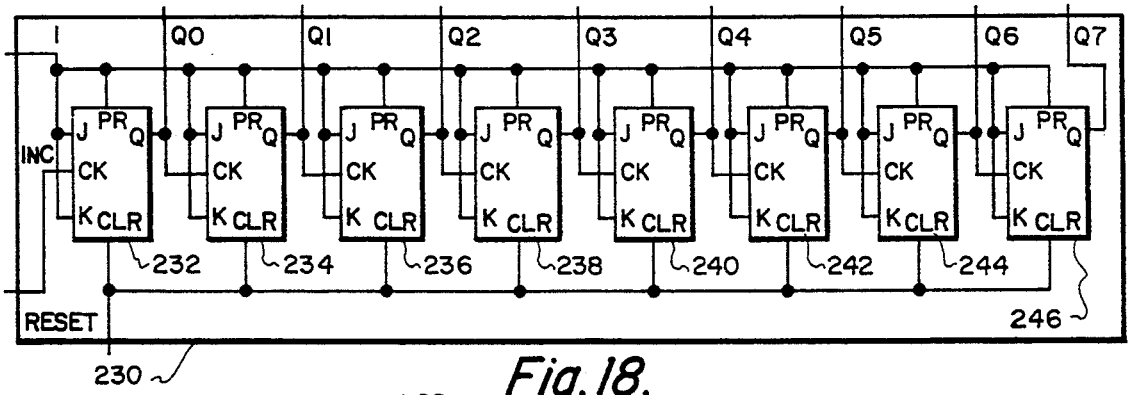
Fig. 18.
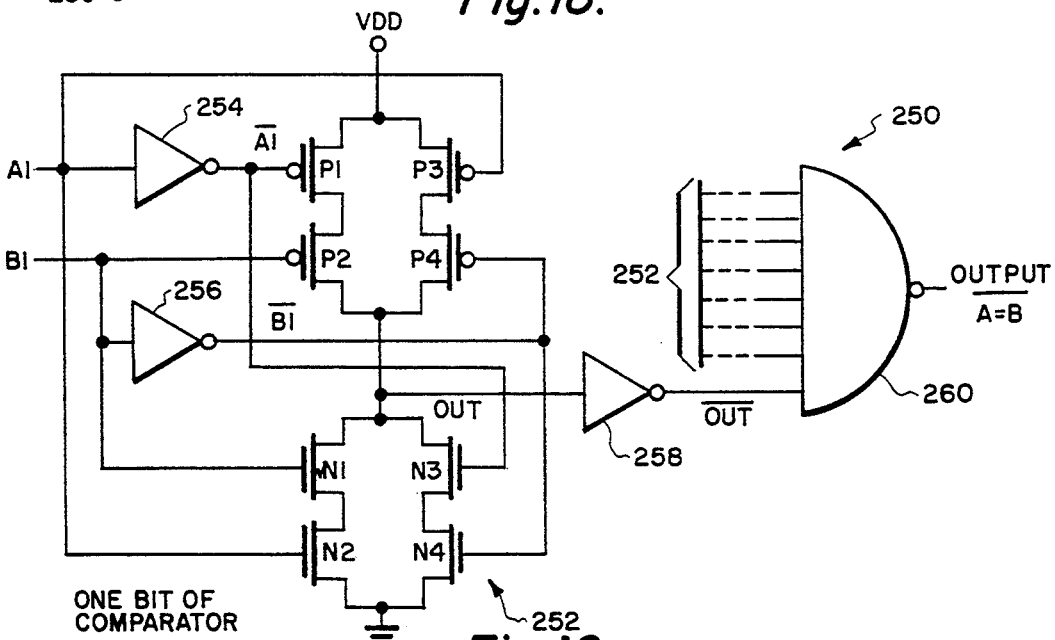
Fig. 19.
| TRUTH TABLE FOR ONE BIT OF COMPARATOR | | | | | | | | | | | | | |
|---|---|---|---|---|---|---|---|---|---|---|---|---|---|
| AI | BI | $\overline{AI}$ | $\overline{BI}$ | P1 | P2 | P3 | P4 | N1 | N2 | N3 | N4 | OUT | $\overline{OUT}$ |
| 0 | 0 | 1 | 1 | 1 | 0 | 0 | 1 | 0 | 0 | 1 | 1 | 0 | 1 |
| 0 | 1 | 1 | 0 | 1 | 1 | 0 | 0 | 1 | 0 | 1 | 0 | 1 | 0 |
| 1 | 0 | 0 | 1 | 0 | 0 | 1 | 1 | 0 | 1 | 0 | 1 | 1 | 0 |
| 1 | 1 | 0 | 0 | 0 | 1 | 1 | 0 | 1 | 1 | 0 | 0 | 0 | 1 |
$P1 = \overline{AI}$ $P2 = BI$ $P3 = AI$ $P4 = \overline{BI}$
$N1 = BI$ $N2 = AI$ $N3 = \overline{AI}$ $N4 = \overline{BI}$
$Out = \overline{AI}BI + \overline{BI}AI$
Fig. 20.

TRUTH TABLE FOR THE EIGHT-TO-ONE MULTIPLEXER

| S2 | S1 | S0 | $\bar{S}2$ | $\bar{S}1$ | $\bar{S}0$ | Q0 | Q1 | Q2 | Q3 | Q4 | Q5 | Q6 | Q7 | QA | QB | QC | QD | QE | QF | QG | QH | QX | QY | OUT | OUT B |
|---|---|---|---|---|---|---|---|---|---|---|---|---|---|---|---|---|---|---|---|---|---|---|---|---|---|
| 0 | 0 | 0 | 1 | 1 | 1 | 0 | X | X | X | X | X | X | X | 0 | Q1 | Z | Z | Q4 | Q5 | Z | Z | 0 | Q4 | 0 | 0 |
| 0 | 0 | 0 | 1 | 1 | 1 | 1 | X | X | X | X | X | X | X | 1 | Q1 | Z | Z | Q4 | Q5 | Z | Z | 1 | Q4 | 1 | 1 |
| 0 | 0 | 1 | 1 | 1 | 0 | X | 0 | X | X | X | X | X | X | Q0 | 0 | Z | Z | Q4 | Q5 | Z | Z | 0 | Q5 | 0 | 0 |
| 0 | 0 | 1 | 1 | 1 | 0 | X | 1 | X | X | X | X | X | X | Q0 | 1 | Z | Z | Q4 | Q5 | Z | Z | 1 | Q5 | 1 | 1 |
| 0 | 1 | 0 | 1 | 0 | 1 | X | X | 0 | X | X | X | X | X | Z | Z | 0 | Q3 | Z | Z | Q6 | Q7 | 0 | Q6 | 0 | 0 |
| 0 | 1 | 0 | 1 | 0 | 1 | X | X | 1 | X | X | X | X | X | Z | Z | 1 | Q3 | Z | Z | Q6 | Q7 | 1 | Q6 | 1 | 1 |
| 0 | 1 | 1 | 1 | 0 | 0 | X | X | X | 0 | X | X | X | X | Z | Z | Q2 | 0 | Z | Z | Q6 | Q7 | 0 | Q7 | 0 | 0 |
| 0 | 1 | 1 | 1 | 0 | 0 | X | X | X | 1 | X | X | X | X | Z | Z | Q2 | 1 | Z | Z | Q6 | Q7 | 1 | Q7 | 1 | 1 |
| 1 | 0 | 0 | 0 | 1 | 1 | X | X | X | X | 0 | X | X | X | Q0 | Q1 | Z | Z | 0 | Q5 | Z | Z | Q0 | 0 | 0 | 0 |
| 1 | 0 | 0 | 0 | 1 | 1 | X | X | X | X | 1 | X | X | X | Q0 | Q1 | Z | Z | 1 | Q5 | Z | Z | Q0 | 1 | 1 | 1 |
| 1 | 0 | 1 | 0 | 1 | 0 | X | X | X | X | X | 0 | X | X | Q0 | Q1 | Z | Z | Q4 | 0 | Z | Z | Q1 | 0 | 0 | 0 |
| 1 | 0 | 1 | 0 | 1 | 0 | X | X | X | X | X | 1 | X | X | Q0 | Q1 | Z | Z | Q4 | 1 | Z | Z | Q1 | 1 | 1 | 1 |
| 1 | 1 | 0 | 0 | 0 | 1 | X | X | X | X | X | X | 0 | X | Z | Z | Q2 | Q3 | Z | Z | 0 | Q7 | Q2 | 0 | 0 | 0 |
| 1 | 1 | 0 | 0 | 0 | 1 | X | X | X | X | X | X | 1 | X | Z | Z | Q2 | Q3 | Z | Z | 1 | Q7 | Q2 | 1 | 1 | 1 |
| 1 | 1 | 1 | 0 | 0 | 0 | X | X | X | X | X | X | X | 0 | Z | Z | Q2 | Q3 | Z | Z | Q6 | 0 | Q3 | 0 | 0 | 0 |
| 1 | 1 | 1 | 0 | 0 | 0 | X | X | X | X | X | X | X | 1 | Z | Z | Q2 | Q3 | Z | Z | Q6 | 1 | Q3 | 1 | 1 | 1 |

Nfet
0 = off
1 = on

Pfet
0 = on
1 = off

X = Don't Care
Z = Tri-state (No Current Flow)

*Fig. 22.*

| TRUTH TABLE INCREMENT 10 BIT COUNTER FUNCTION | | | | |
|---|---|---|---|---|
| INC 10 BIT IN | PH12 | FILL CLOCK IN | FEED THRU MODE | INC 10 BIT OUT |
| X | 0 | 0 | 0 | 1 |
| 0 | 0 | 0 | 1 | 0 |
| 0 | 0 | 1 | X | 0 |
| 0 | 1 | X | X | 1 |
| X | 0 | 1 | 0 | 1 |

Fig. 24A.

| TRUTH TABLE FILL CLOCK OUT FUNCTION | | | |
|---|---|---|---|
| FILL CLOCK ENABLE | PH10 | PH12 | FILL CLOCK OUT (FCO) |
| 0 | 0 | 0 | FCO-1 |
| 0 | 0 | 1 | 0 |
| 0 | 1 | 0 | 1 |
| 0 | 1 | 1 | NOT ALLOWED |
| 1 | X | X | FCO-1 |

Fig. 24B.

| TRUTH TABLE RESET 10 BIT COUNTER FUNCTION | | |
|---|---|---|
| RESET 10 BIT IN | PH13 | RESET 10 BIT OUT |
| 0 | 0 | 0 |
| 0 | 1 | 1 |
| 1 | X | 0 |

X = Don't Care

Fig. 24C.

| TRUTH TABLE NOVRAM FUNCTION | | | | | | | |
|---|---|---|---|---|---|---|---|
| RC1 | RC0 | PH13 | FILL CLOCK IN | FEED THRU MODE | NOVRAM | | |
| | | | | | STORE | RECALL | R/W |
| 0 | 0 | X | X | X | 1 | 1 | 1 |
| 0 | 1 | X | X | X | 0 | 1 | 1 |
| 1 | 0 | X | X | X | 1 | 0 | 1 |
| 1 | 1 | X | 0 | 0 | 1 | 1 | 1 |
| 1 | 1 | X | 1 | 0 | 1 | 1 | 0 |
| 1 | 1 | 0 | X | 1 | 1 | 1 | 1 |
| 1 | 1 | 1 | X | 1 | 1 | 1 | 0 |

Fig. 24D.

| TRUTH TABLE COUNTER-TIMER FUNCTION | | | | | |
|---|---|---|---|---|---|
| CTI | CTO | PHI3 | COUNTER-TIMER | | |
| | | | LOAD | RESET | INCREMENT |
| 0 | 0 | X | 0 | 0 | 0 |
| 0 | 1 | X | 1 | 0 | 0 |
| 1 | 0 | X | 0 | 1 | 0 |
| 1 | 1 | 0 | 0 | 0 | 0 |
| 1 | 1 | 1 | 0 | 0 | 1 |

Fig. 24E.

| TRUTH TABLE LOAD MICROCOUNTER FUNCTION | | |
|---|---|---|
| CMPIN | PHI3 | LOAD MICROCOUNTER |
| 0 | 0 | 0 |
| 0 | 1 | 1 |
| 1 | X | 0 |

X = Don't Care

Fig. 24F.

| TRUTH TABLE FOR CONTROL LOGIC DECODER 304 | | | | | |
|---|---|---|---|---|---|
| B | A | 1 | 2 | 3 | 4 |
| 0 | 0 | 1 | 1 | 1 | 0 |
| 0 | 1 | 0 | 1 | 1 | 1 |
| 1 | 0 | 1 | 0 | 1 | 1 |
| 1 | 1 | 1 | 1 | 0 | 1 |

Fig. 27.

| TRUTH TABLE FOR CONTROL LOGIC DECODER 320 | | | | | |
|---|---|---|---|---|---|
| B | A | 1 | 2 | 3 | 4 |
| 0 | 0 | 0 | 0 | 0 | 1 |
| 0 | 1 | 1 | 0 | 0 | 0 |
| 1 | 0 | 0 | 1 | 0 | 0 |
| 1 | 1 | 0 | 0 | 1 | 0 |

Fig. 28.

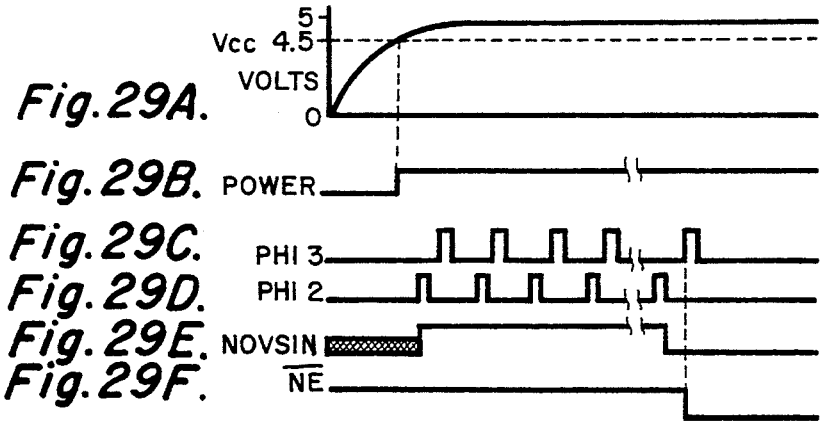

| NONVOLATILE STATIC RAM TRUTH TABLE | | | | | | |
|---|---|---|---|---|---|---|
| $\overline{CE}$ | $\overline{WE}$ | $\overline{NE}$ | $\overline{OE}$ | MODE | I/O | POWER |
| H | X | X | X | NOT SELECTED | OUTPUT HIGH IMPED. | STANDBY |
| L | H | H | L | READ RAM | OUTPUT DATA | ACTIVE |
| L | L | H | X | WRITE "I" RAM | INPUT DATA HIGH | ACTIVE |
| L | L | H | X | WRITE "O" RAM | INPUT DATA LOW | ACTIVE |
| L | H | L | L | ARRAY RECALL | OUTPUT HIGH IMPED. | ACTIVE |
| L | L | L | H | NONVOLATILE STORING | OUTPUT HIGH IMPED. | ACTIVE |
| L | H | H | H | OUTPUT DISABLED | OUTPUT HIGH IMPED. | ACTIVE |
| L | L | L | L | NOT ALLOWED | OUTPUT HIGH IMPED. | ACTIVE |
| L | H | L | H | NO OPERATION | OUTPUT HIGH IMPED. | ACTIVE |

Fig. 30.

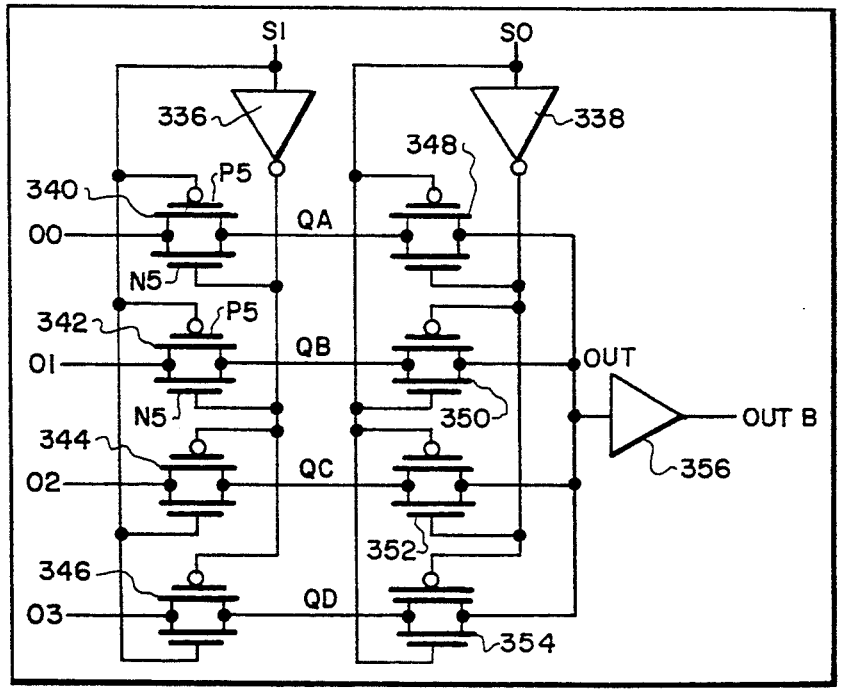

Fig. 31.

| TRUTH TABLE FOR THE FOUR-TO-ONE DEMULTIPLEXER/DECODER | | | | | | | | | | | | | |
|---|---|---|---|---|---|---|---|---|---|---|---|---|---|
| S1 | S0 | $\overline{S1}$ | $\overline{S0}$ | Q0 | Q1 | Q2 | Q3 | QA | QB | QC | QD | OUT | OUT B |
| 0 | 0 | 1 | 1 | 0 | X | X | X | 0 | Q1 | Z | Z | 0 | 0 |
| 0 | 0 | 1 | 1 | 1 | X | X | X | 1 | Q1 | Z | Z | 1 | 1 |
| 0 | 1 | 1 | 0 | X | 0 | X | X | Q0 | 0 | Z | Z | 0 | 0 |
| 0 | 1 | 1 | 0 | X | 1 | X | X | Q0 | 1 | Z | Z | 1 | 1 |
| 1 | 0 | 0 | 1 | X | X | 0 | X | Z | Z | 0 | Q3 | 0 | 0 |
| 1 | 0 | 0 | 1 | X | X | 1 | X | Z | Z | 1 | Q3 | 1 | 1 |
| 1 | 1 | 0 | 0 | X | X | X | 0 | Z | Z | Q2 | 0 | 0 | 0 |
| 1 | 1 | 0 | 0 | X | X | X | 1 | Z | Z | Q2 | 1 | 1 | 1 |

Nfet
0 = off
1 = on

Pfet
0 = on
1 = off

X = Don't Care
Z = Tristate "No current flow"

NONVOLATILE MEMORY SYSTEM FOR STORING A KEY WORD AND SENSING THE PRESENCE OF AN EXTERNAL LOADER DEVICE AND ENCRYPTION CIRCUIT

BACKGROUND OF THE INVENTION

1. Field of the Invention

This invention relates generally to digital communication systems. In particular, this invention relates to an electronic memory circuit for storing a serial stream of digital data which does not require the use of a battery power system.

2. Description of the Prior Art

Telemetry systems are used to provide digital data on missile performance during flight with the digital data being provided by a radio frequency data link consisting of a missile telemetry transmitter and a ground, aircraft or ship board telemetry receiving system. The missile telemetry transmitter modulates the missile data which is then transmitted in free space and received, recorded and processed by the receiving system whether authorized or unauthorized. Unauthorized reception of this data can provide an intercepter with technical information relating to the missile's performance. This missile performance data may be then used to develop effective countermeasures to the missile.

Thus, there is a need for a secured communications system to protect missile performance data during transmission. Secured communications systems, such as the systems described in U.S. Pat. Nos. 4,392,241 and 4,563,546, generally use an encryption circuit which scrambles the digital data prior to transmission so that the true information content of the digital data is not revealed during transmission.

Generally, encryption circuits such as the Model KGV-68 encryption circuit manufactured by Motorola and the enciphering device described in U.S. Pat. No. 4,563,546 receive a digital/key word which initiates the scrambling of the digital data to hide its true information. The digital or key words, in turn, are often stored for lengthy periods of time in a battery backed Random Access Memory (RAM) storage system.

However, the batteries utilized are often large due to high current drain needed to operate the Random Access Memory and associated voltage sensing circuits. In addition, the high amperage hour batteries utilized with the battery backed RAM are often dangerous due to the batteries caustic chemicals. Thus, it can readily be seen that there is a need for a digital memory storage device for use aboard missiles which does not require battery power.

Therefore, it is an object of the present invention to provide a memory circuit for storing digital data for lengthy periods of time which does not require backup batteries.

It is a further object of the present invention to provide a memory circuit which is small in size since there is limited space on board a missile.

Yet another object of the present invention is to provide a memory system which can store digital data for a period of time of approximately three years.

Another object of the present invention is to provide a memory system which is compatible with encryption circuits.

These and other objects, advantages and novel features of the invention will become apparent from the following description of the invention when considered in conjunction with the accompanying drawings.

SUMMARY OF THE INVENTION

The aforesaid and other objects of the invention are accomplished by a nonvolatile memory system which will store a key or digital word for a period of time of approximately three years with minimum power consumption. The nonvolatile memory system includes a nonvolatile statie random access memory for receiving and storing a key word from a loader and a nonvolatile memory sequency control circuit which provides logic signals for controlling read and write operations of the nonvolatile static RAM, as well as logic signals to allow for transfer or down loading of the key word from the loader to the RAM. In addition, the nonvolatile memory sequence control circuit provides logic signals to interface with an encryption device which allows the key word to be transferred or up loaded from the nonvolatile static RAM to the encryption devide and logic signals for storing the key word in a nonvolatile electrically erasable programmable read only memory (PROM) and then bringing the nonvolatile static RAM to a low power standby state. An erasable prom (EPROM) is used to control the sequencing of operations within the nonvolatile static RAM with addressing for the EPROM being provided by the nonvolatile memory sequence control circuit. The EPROM and the nonvolatile memory sequence control circuit may be also brought to a low power standby state by a power control signal provided by the memory sequence control circuit.

BRIEF DESCRIPTION OF THE DRAWINGS

FIG. 2 is an enlarged circuit diagram of the memory system clock of FIGS. 1A and 1B;

FIGS. 3A and 3B is graphical representation of the system clock signal of the present invention;

FIG. 4 is an enlarged circuit diagram of the power control circuit of FIGS. 1(A) and 1(B);

FIGS. 8A to 8I is the timing diagram for the circuit of FIG. 7;

FIG. 11 is a circuit diagram of the Johnson counter used in the present invention;

FIGS. 12A to 12J is the timing diagram for the clock signals generated by the circuit of FIG. 11;

FIG. 14 illustrates the load circuit attached to each counter stage of the ten bit parallel loadable up counter used in the present invention;

FIGS. 15A–15B respectively illustrate the load truth table and present truth table for the load circuit of FIG. 14;

FIG. 17 is a circuit diagram of an eight bit latch used in the present invention;

FIG. 18 is the circuit diagram of the eight bit binary counter used in the present invention;

FIG. 19 is the circuit diagram of the eight-by-two bit comparator circuit used in the present invention;

FIG. 20 is the truth table for one bit of the eight-by-two bit comparator of FIG. 19;

FIG. 22 is the truth table for the eight-by-one multiplexer circuit of FIG. 21;

FIGS. 24A–24F illustrate the truth tables for the input output functions of the control circuit of FIG. 23;

FIG. 27 is the truth table for decoder 304 of the control circuit of FIG. 23;

FIG. 28 is the truth table for decoder 320 of the control circuit of FIG. 23;

FIGS. 29A to 29F is a graphic illustration of various logic signals generated by the present invention during power up and power down;

FIG. 30 is a truth table for the nonvolatile static RAM used in the present invention;

FIG. 31 is a circuit diagram of a four to one demultiplexer/decoder used in the present invention;

FIG. 32 is the truth table for the demultiplexer decoder of FIG. 31; and

FIGS. 33A to 33I are flow charts illustrating the operation of the nonvolatile memory system constituting the present invention.

DETAILED DESCRIPTION OF THE PREFERRED EMBODIMENT

Figure 1A:
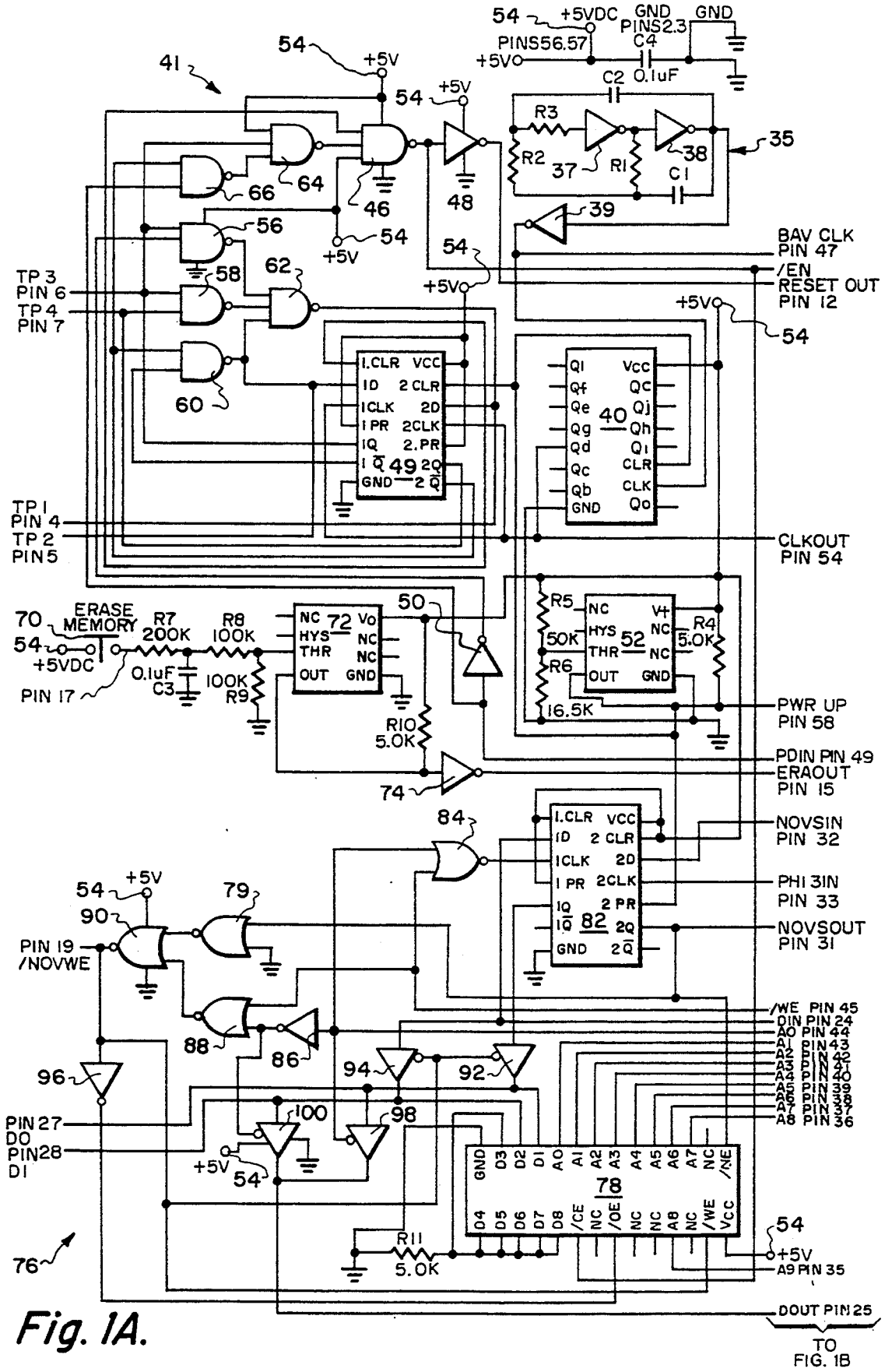
FIGS. 1A and 1B represent a circuit diagram of a memory system constituting the present invention.

Referring now to FIGS. 1A, 1B, 2 and 3 there is shown the memory system clock 35 for a nonvolatile memory system 36, (FIGS. 1A and 1B) with memory system clock 35 including an inverter 37 having an output connected to the input of an inverter 38 which has its output connected to its input through a capacitor C1 and a resistor R1. The output of inverter 38 is also connected to the input of inverter 37 through capacitor C1 and a pair of resistors R2 and R3 as well as a capacitor C2 and resistor R3. The clock circuit of FIG. 2 oscillates in accordance with the following equations:

$$R2=10R1 \quad (1)$$

$$R3=10R2 \quad (2)$$

$$C1=100C2 \quad (3)$$

$$F=1/(1.2R1C1) \quad (4)$$

where F is the frequency of oscillation of memory clock circuit 35; R1, R2 and R3 are respectively the magnitudes of resistors R1, R2 and R3 and C1 and C2 are respectively the magnitudes of capacitors C1 and C2. In the preferred embodiment of the present invention R1 is 700 ohms, R2 is 7 kilo-ohms, R3 is 70 kilo-ohms, C1 is 0.047 microfarads and C2 is 470 picofarads resulting in a frequency of oscillation for clock 35 of 253 Kilohertz. The resistor R2 and the capacitor C2 network provides hysteresis, thereby delaying the onset of the transition of inverter 37 until capacitor C1 has enough voltage to move inverter 37 through its transition region. When inverter 37 is in its transition region, capacitor C2 provides positive feedback, thereby rapidly moving inverter 37 out of its transition region.

The clock signal of FIG. 3A generated by memory system clock 35 is inverted by an inverter 39 and then provided to the input of a binary counter 40 which divides the clock signal by four so that the system clock signal of FIG. 3B has a frequency of 63.5 Kilohertz. The binary counter used in the preferred embodiment of the present invention is a model SN74HC4040 asynchronous 12-bit binary counter which advances the count on a high to low transition and is manufactured by Texas Instruments of Dallas, Tex. It should be noted that binary counter 40 can provide a system clock signal other than 63.5 Kilohertz since an input signal supplied to the input of counter 40 may be numerically divided by a whole number from 2 thru 12 depending upon which output of conter 40 is selected by the designer.

Figure 1B:
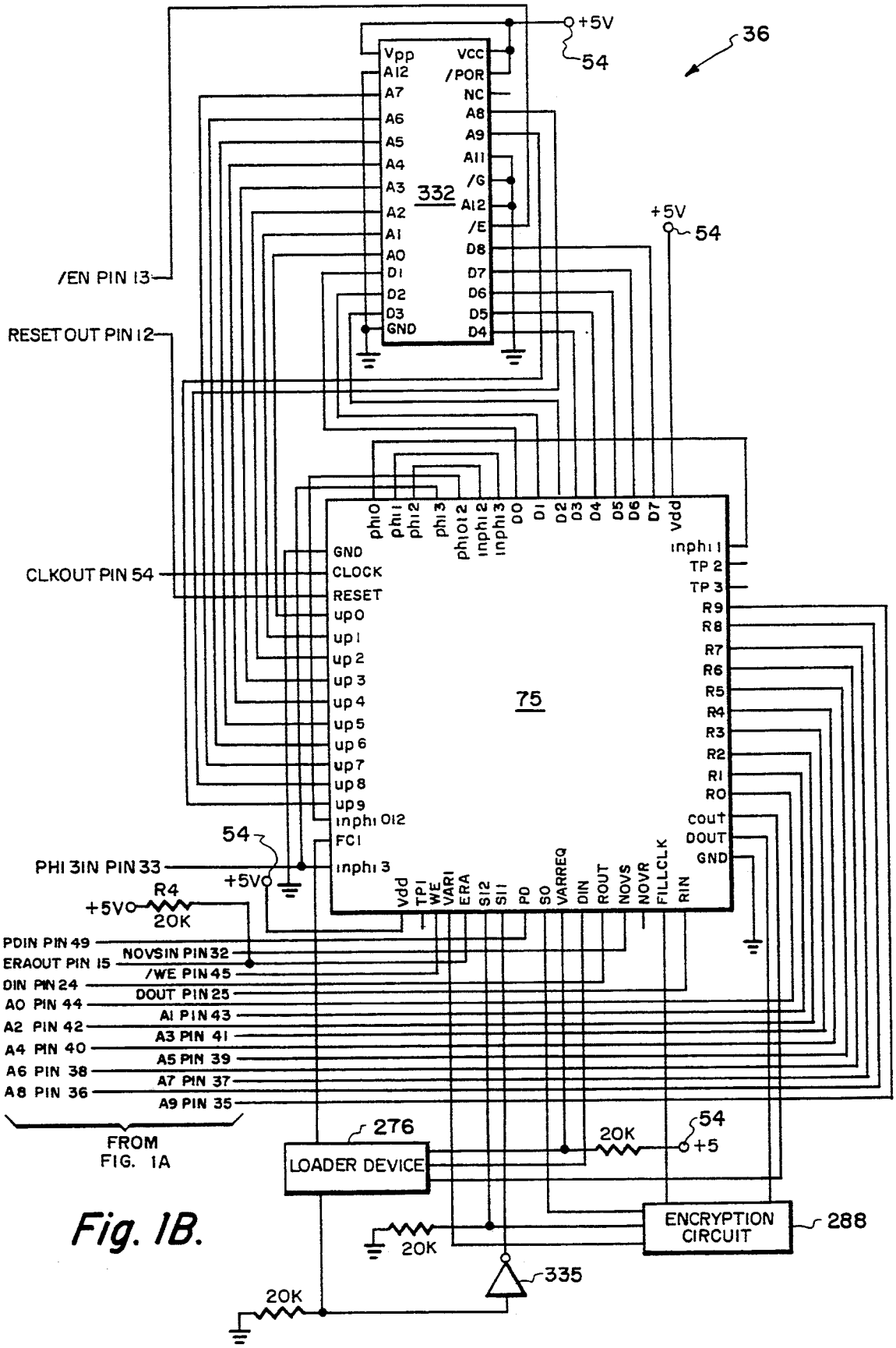
Figures 5, 6A, 6B:
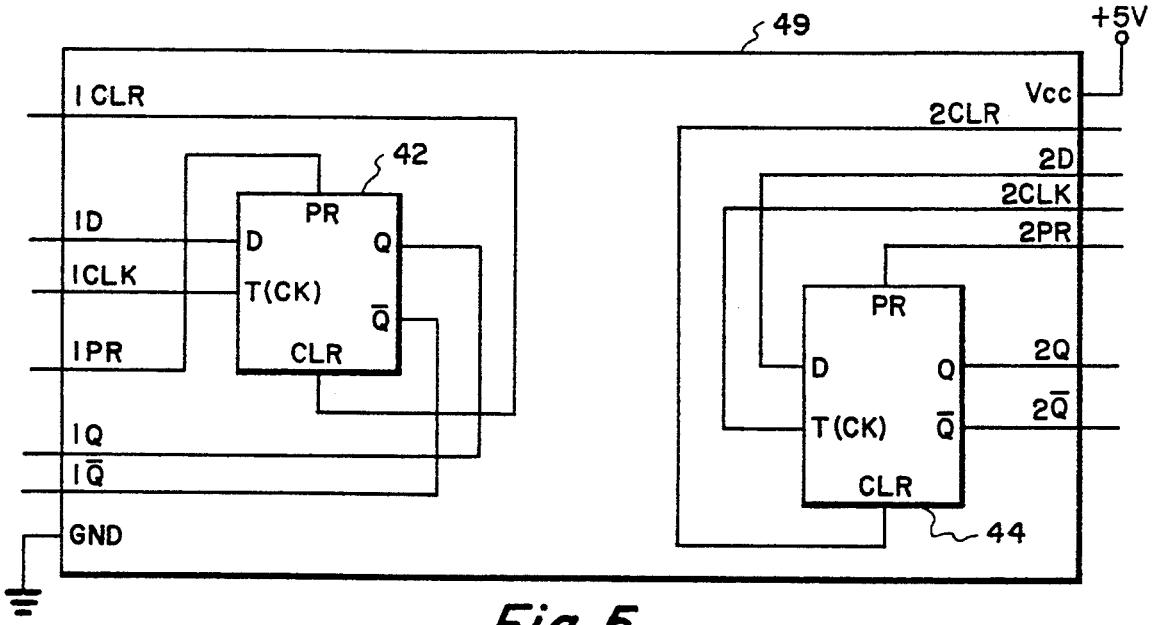
FIG. 5 illustrates a dual D type flip-flop used in the power control circuitry of the present invention.
FIGS. 6A and 6B illustrate the truth tables for the power control circuitry of FIG 3.

Referring now to FIGS. 3, 4 and 5, there is shown a power control circuit 41 which operates according to the following logic equations:

$$A'=A+B \quad (5)$$

$$B'=\overline{AB}+AB+\overline{PDA} \quad (6)$$

$$RESET=\overline{A}+PD\overline{B} \quad (7)$$

$$\text{ENABLE}=\overline{\text{RESET}} \quad (8)$$

where A is the present state of the Q output (1Q) of a D flip-flop 42, B is the present state of the Q output (2Q) of a D flip-flop 44, A' is the next state of the Q output of D flip-flop 42, B' is the next state of the Q output of D flip-flop 44, PD is the power down output of a nonvolatile memory circuit 36, FIG. 1B, $\overline{A}$ is the $\overline{Q}$ output ($1\overline{Q}$) of D flip-flop 42, $\overline{B}$ is the $\overline{Q}$ output of D flip-flop 44, ENABLE (1EN) is the output of a NAND gate 46 and RESET is the output of an inverter 48. At this time it should be noted that a dual D type positive edge trigger flip-flop manufactured by Texas Instruments and having a model number SN74HC74 was used to implement D flip-flops 42 and 44 in the preferred embodiment of the present invention.

Referring again to FIGS. 1A, 4, 5, and 6 a voltage sensing circuit 52 is set so as to change state from a logic "0" to a logic "1" whenever the direct current voltage signal provided by direct current voltage source 54 to the threshold voltage input of circuit 52 exceeds 4.5 volts. It should be noted that the voltage sensing circuit 52 used in the present invention is a model ICL8211 Programmable Voltage Detector manufactured by Intersil of Cupertino, Calif.

As is best illustrated by the truth table of FIG. 6A and the graphical representations of FIGS. 29A and 29B, when power is a logic "0", that is the output of source 54 is less then 4.5 volts and the power down (PD) signal is a logic "0", the reset signal is set at a logic "0" state and the enable signal is set at a logic "1" state, since the logic "0" at the output of voltage sensing circuit 52 is supplied to the second input of a NAND gate 46, which results in the enable output of NAND gate 46 being a logic "1". The logic "1" at the enable output of NAND gate 46 is, in turn, inverted by an inverter 48 resulting in a logic "0" at the reset output of inverter 48.

When power is first turned on and the voltage Vcc of FIG. 29A is less than 4.5 volts, the logic "0" at the output of voltage sensing circuit 52 is provided to the clear inputs of D flip-flops 42 and 44 thereby causing the Q outputs of flip-flops 42 and 44 to be set at a logic "0" state and the $\overline{Q}$ outputs of flip-flop 42 and 44 to be set at a logic "1" state. The "0" at the Q output of flip-flop 42 is provided to the first input of a nand gate 64 resulting in a logic "1" at the output of NAND gate 64. The logic "1" output of NAND gate 64 is provided to the first input of NAND gate 46. The second and third inputs of NAND gate 46 are respectively provided with a "1" from circuit 52 and source 54 which results in the enable output of NAND gate 46 being "0" and the reset output of inverter 48 being "1".

The "0" at the Q output of flip-flop 42 is also supplied to the first input of a NAND gate 56 and the first input of a NAND gate 58 resulting in a "1" at the outputs of gates 56 and 58. The "1" at the $\overline{Q}$ output of flip-flop 42 and the $\overline{Q}$ output of flip-flop 44 are respectively supplied to the first and second inputs of a NAND gate 60 resulting in a "0" at the output of gate 60, which, in turn, results in a "1" at the output of a NAND gate 62. The logic "0" at the output of NAND gate 60 is supplied to the data input of flip-flop 42, while the logic "1" at the output of nand gate 62 is supplied to the data input of flip-flop 44. A first clock pulse from the signal of FIG. 3B will cause the Q output of flip-flop 44 to change from logic "0" to logic "1" and the Q output of flip-flop 42 to remain at the logic "0" state.

With the Q output of flip-flop 44 changing to a logic "1" state, the output of NAND gate 60 will change from a logic "0" state to a logic "1" state since the $\overline{Q}$ output of flip-flop 44 changed state from "1" to a logic "0". The output of NAND gate 62 also changes state from logic "1" to a logic "0" since the clock pulse from the clock signal of FIG. 3B changed the state of the output of NAND 60 to a logic "1" while the outputs of gates 56 and 58 remain at a logic "1" state.

The "0" at the Q output of flip-flop 42 is also provided to the first output of NAND gate 64 while a "1" is provided to the second input of NAND gate 64 by source 54 resulting in "1" at the output of nand gate 64. The second and third inputs of NAND gate 46 are respectively provided with a "1" from circuit 52 and source 54 which results in the enable output of NAND gate 46 being "0" and the reset output of inverter 48 being "1".

The output of NAND gate 60 which is "1" is provided to the D input of flip-flop 42, while the output of NAND gate 62 which is now "0" is provided to the D input of flip-flop 44. A second clock pulse from the clock signal of FIG. 3B when provided to the clock inputs of flip-flops 42 and 44 will cause the Q output of flip-flop 42 to change to a logic "1" state and the Q output of flip-flop 44 to change to a logic "0" state. This results in the output of NAND gate 60 remaining at a logic "1" since the $\overline{Q}$ output of flip-flop 42 changed state from a logic "1" to a logic "0" output of flip-flop 44 changed state from "0" to a logic. The output of NAND gate 62 remains logic "0" since the state of the output of NAND gate 60 is "1", the output of gate 56 is now at a logic of "1" and the output of gate 58 is now at a logic "1" state.

After the second clock pulse of the clock signal of FIG. 3B the first input of NAND gate 64 changes from logic "0" to a logic "1", (since the Q output of flip-flop 42 is "1") the second input is "1" (from source 54) and the third input changes from "1" to "0" since the power down signal is now "1" and the $\overline{Q}$ output of flip-flop 44 is now "1" (resulting in "0" output from gate 66). The output of NAND gate 64 does not change remaining at logic "1" which results in the enable output of gate 46 remaining at "0" and the reset output of inverter 48 remaining at a logic "1" state.

When the power down signal provided to the input of an inverter 50 is high, that is the power down signal is a binary "1", nonvolatile memory system 36 is in an active or running state. When the power down signal goes to a logic "0", nonvolatile memory system 36 has preformed a required erasure procedure and the nonvolatile memory system 36 may proceed to a low power standby state.

After the power down signal goes to a logic "0" state, the output of NAND gate 60 which is "1" is provided to the D input of flip-flop 42, while the output of NAND gate 62 which is "0" is provided to the D input of flip-flop 44. A clock pulse from the clock signal of FIG. 3B when provided to the clock inputs of flip-flops 42 and 44 will cause the Q output of flip-flop 42 to rermain at a logic "1" state and the Q output of flip-flop 44 to remain at a logic "0" state. This results in the output of NAND gate 60 remaining at a logic "1" since the $\overline{Q}$ output of flip-flop 42 is a logic "0".

The output of NAND gate 62 changes from a logic "0" to a logic "1" since the state of the output of NAND gate 60 remains "1", the output of gate 56 remains at a logic "1" state and the output of gate 58 is now at a logic "0" state.

The first input of NAND gate 64 remains at a logic "1" state (since the Q output of flip-flop 42 is "1"), the second input is "1" (from source 54) and the third input changes from "0" to "1" since the power down signal is now "0" (resulting in a logic "1" from NAND gate 66). The output of NAND gate 64 changes state from logic "0" to a logic "1" which results in the enable output of gate 46 changing from "0" to "1" and the reset output of inverter 48 changing from "1" to "0".

As is best illustrated by the truth table of FIG. 6A, after the power down signal goes low, a second clock pulse of the clock signal of FIG. 3(B) will not alter the state of enable output of NAND gate 46 and the reset output of inverter 48. Only the Q output of flip-flop 44 changes state since this clock pulse transfers the logic "1" at the data input of flip-flop 44 to the Q output thereof.

As is best illustrated by the reduced truth table of FIG. 6(B), the state of the power down signal is valid, that is a logic "0", three clock pulses of the system clock signal after the reset output of inverter 48 goes to a logic "1" state. It should be noted that the clear inputs of flip-flops 42 and 44 are tied to the output of sensor 52 to insure a logic "1" whenever the direct current voltage provided by source 54 exceeds 4.5 volts.

Referrring now to FIGS. 1(A) and 1(B), there is shown an erase memory push button 70 which when depressed provides the 5 volt signal from source 54 to the threshold input of a voltage sensing circuit 72 which is set so as to change state from a logic "0" to a logic "1" whenever the direct current voltage signal provided by source 54 to the threshold voltage input of circuit 72 exceeds 4.5 volts. The logic "1" signal is supplied to an inverter 74 which changes the "1" to a "0" with the output from inverter 74 being the erase signal (ERA OUT) to a nonvolatile memory sequence control circuit 75. It should be noted that the voltage sensing circuit 72 used in the present invention is a model ICL8211 Programmable Voltage Detector manufactured by Intersil.

Referring to FIGS. 1(A), 1(B), 7, 8 and 9 there is shown a nonvolatile static RAM interface circuit 76 which provides for storage and retrieval of digital data from control circuit 75. The power up signal provided by circuit 52 (FIG. 4), to the preset input of a D flip-flop 77 of a dual D type positive edge triggered flip-flop 82 will set the Q output (2Q) of D flip-flop 77 to a logic "1" state. The Q output of flip-flop 77 is provided to the $\overline{NE}$ (nonvolatile enable) input of a nonvolatile static RAM 78 and the first input of a NOR gate 79 thereby causing the output of gate 79 to be set at a logic "0".

At this time it should be hoted that the nonvolatile static RAM 78 used in the present invention is a 512×8 bit model X2004 nonvolatile memory manufactured by Xicor of Milipitas, Calif. A logic "1" provided to the $\overline{NE}$ input allows for storage of digital data within RAM 78 or recall of digital data from RAM 78. It should further be noted that the $\overline{CE}$ input of RAM 78 must be low or logic "0" before RAM 78 will perform read and write operations.

Figures 8A, 8B, 8C, 8D, 8E, 8F, 8G, 8H, 8I, 11, 12H, 12I, 12J:
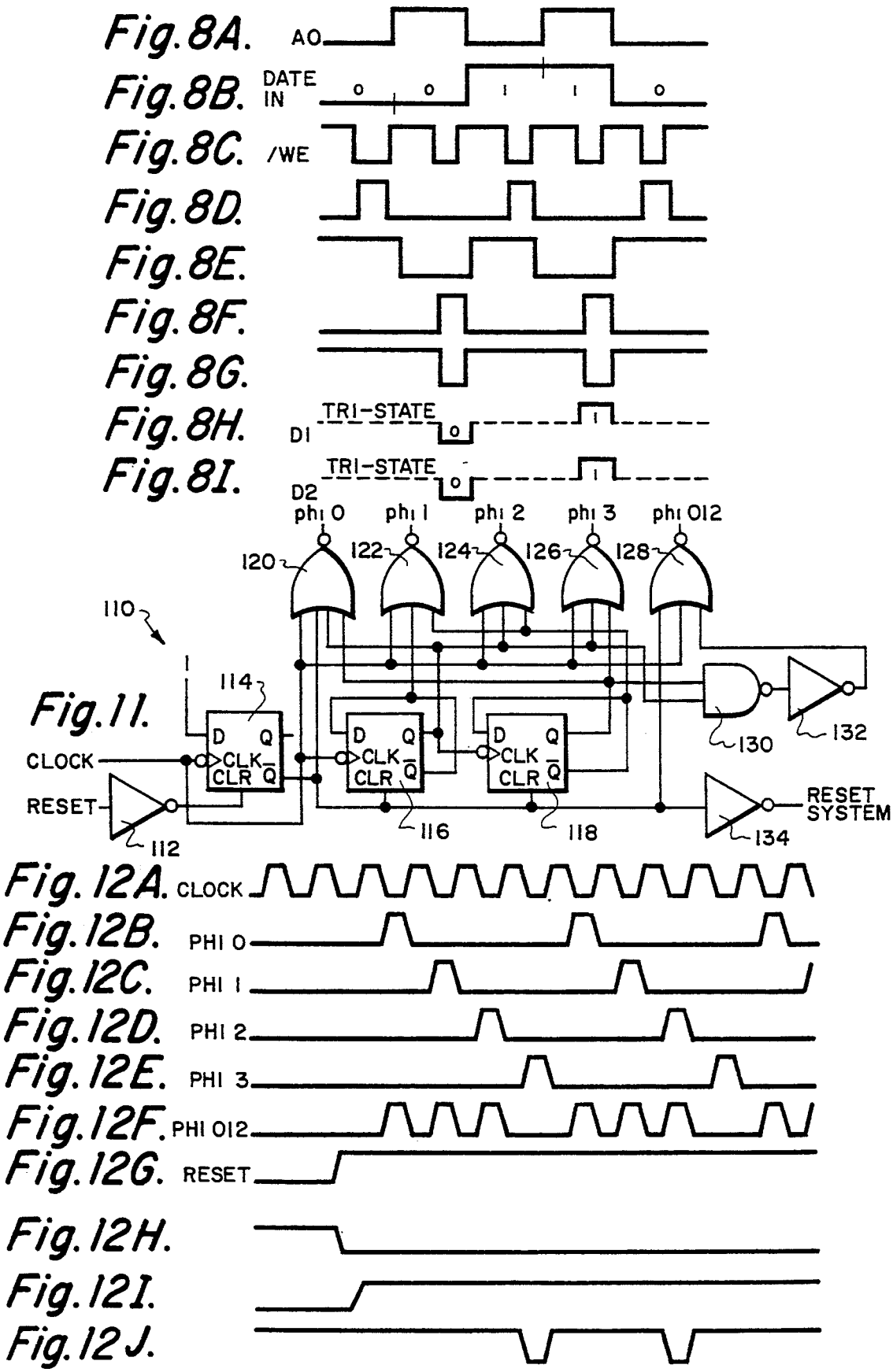

When the A0 line is low, (FIG. 8(A)), and the first data bit, (FIG. 8(B)), from nonvolatile memory sequence control circuits 75 is provided through the DATA Int line of circuit 76 to the D input of flip-flop 83, a transition from high to low of the $\overline{WE}$ line, (FIG. 8(C)), will cause the output of a NOR gate 84 to transition from low to high thereby providing to the clock input of flip-flop 83 the clock pulse illustrated in FIG. 8D. The low to high transition of the clock pulse of FIG. 8D stores or latches the first data bit of FIG. 3B in flip-flop 83. When the A0 line changes state from "0" to "1" causing the output of an inverter 86 to change from "1" to "0", (FIG. 8(E)) and the $\overline{WE}$ (write enable) line changes from "1" to "0" the output of a NOR gate 88 will change from "0" to "1" thereby providing the logic signal of FIG. 8F. The signal of FIG. 8F is inverted by a NOR gate 90 resulting in the logic signal of FIG. 8G which is supplied to the enable input of a pair of tristate output buffer gates 92 and 94 and the $\overline{WE}$ input of RAM 78.

The logic "0" of the signal of FIG. 8G latches the data bit stored by a D flip-flop 83 to the output of buffer gate 92 as illustrated by FIG. 8H and the data bit on the DATA IN line of circuit 76 to the output of buffer gate 94 as illustrated by FIG. 8I. The logic "0" of the signal of FIG. 8G also allows RAM 78 to write or store at the address specified by memory address lines A1 through A9 the data bit supplied to the D1 input of RAM 78 and also the data bit supplied to the D2 input of RAM 78. It should be understood that the RAM used in the present invention has a 512×8 bit memory array which allows for simultaneous storage of data in up to eight locations in memory using the same address. Since the preferred embodiment of the present invention requires storage capability of 1024 bits, two data inputs/outputs D1 and D2 were utilized with the necessary timing to allow for storge in and retrieval of the data from RAM 78 being provided by the circuitry of FIG. 7.

The retrieval of data from RAM 78 is accomplished by providing a logic "0" to the $\overline{OE}$ (output enable) line of RAM 78. It should be noted that the output enable input of RAM 78 controls the data output buffers of RAM 78 and is used to initiates read and recall operations. During the retrieval of data from RAM 78 the $\overline{WE}$ line is at a logic "1" state, thereby providing to the first input of NOR gate 88 a logic "1". The output of NOR gate 88 which is a logic "0" is provided to the first input of NOR gate 90 resulting in a logic "1" at the output of NOR gate 90. The logic "1" signal provided by NOR gate 90 is supplied to an inverter 96 which inverts the signal thereby providing a logic "0" to the $\overline{OE}$ (output enable) line of RAM 78 so as to initiate the read or recall operations of RAM 78. When an address is supplied to the A0–A7 inputs of RAM 78 the data bits stored at the two address locations in the memory of RAM 78 will be provided to the D1 and D2 outputs of RAM 78. When the A0 line is low, the data bit at the D1 output of RAM 78 is latched to the output of a tristate output buffer gate 98, while a high or logic "1" on the A0 line results in the D2 output of RAM 78 being latched to the output of a tristate output buffer gate 100.

Figure 10:
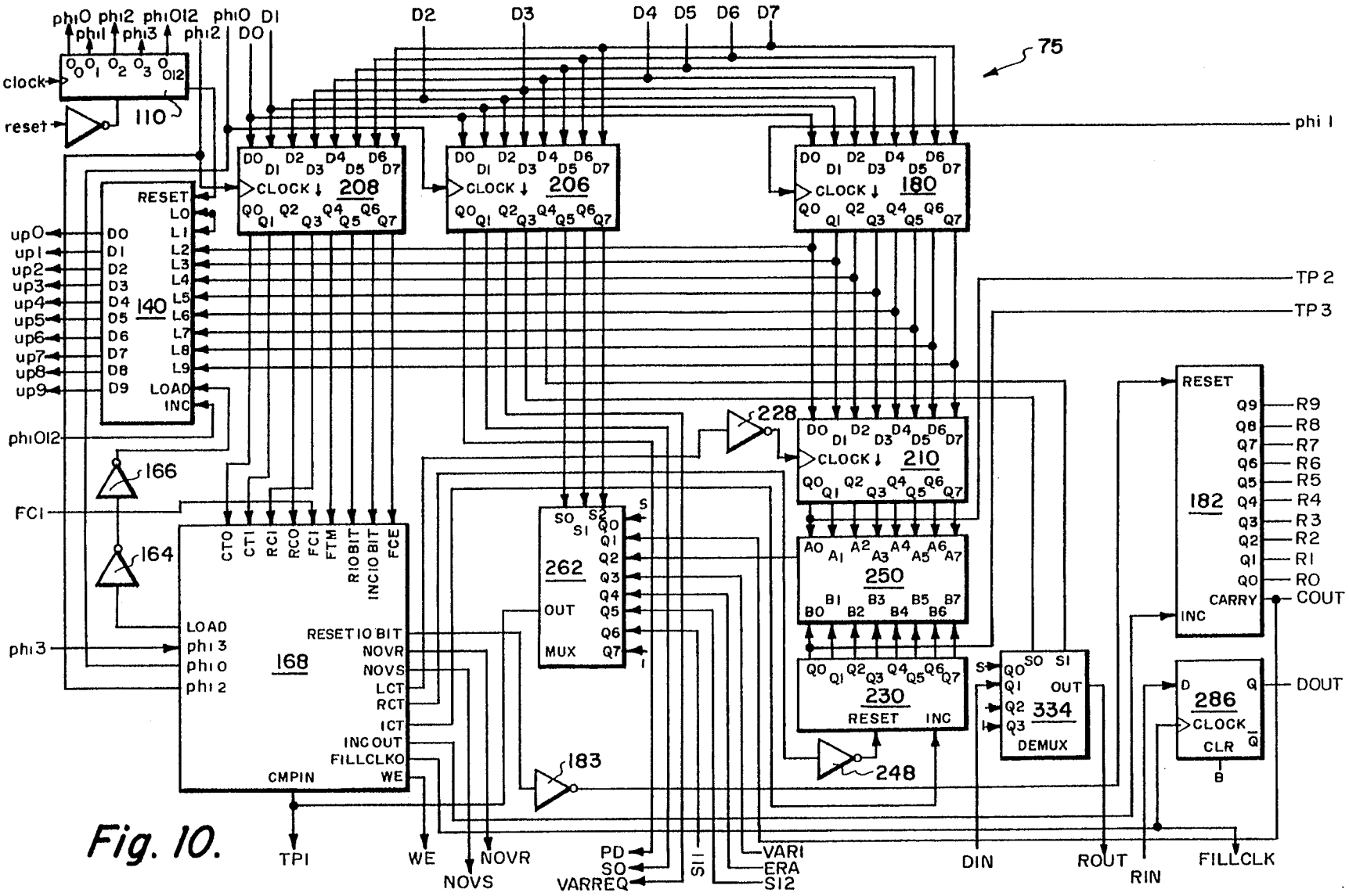
FIG. 10 is a circuit diagram of the nonvolatile memory sequence control circuit of the present invention.

Referring now to FIGS. 10 and 11, there is shown a four bit Johnson counter 110 for generating the clock signals of FIG. 11. The RESET signal of FIG. 12G which is the output of inverter 48 is supplied to the input of an inverter 112 which results in the signal of FIG. 12H being provided at the output of inverter 112. The high or logic "1" supplied by inverter 112 to the CLR input of a D flip-flop 114 sets the $\overline{Q}$ output of flip-flop 114 at a logic "1" state and the Q output at a logic "0" state. At this time it should be noted that Johnson counter 110 includes three master-slave D flip-flops 114, 116, and 118 with each flip-flop being positive or leading edge triggered with an asynchronous active high clear so that a logic "1" provided to the CLR input sets the Q output at "0" and the $\overline{Q}$ output at "1" irregardless of the state of the signal provided to the clock input of flip-flops 114, 116 and 118.

The "1" at the $\overline{Q}$ output of flip-flop 114 is provided to the CLR inputs of flip-flops 116 and 118 thereby resetting flip-flops 116 and 118 so that the Q outputs are at a logic "0" state and the $\overline{Q}$ outputs are at a logic "1" state. After the reset signal of FIG. 3A is brought high, the first clock pulse of the clock signal of FIG. 12A, which is the system clock signal of FIG. 3B, changes the $\overline{Q}$ output of flip-flop 114 to a logic "0" thereby enabling flip-flops 116 and 118. The logic "0" at the Q output of flip-flop 116 is provided to the first input of a NOR gate 120, while the logic "0" at the Q input of flip-flop 118 is provided to the second input of NOR gate 120 and the clock signal of FIG. 12A is provided to the third input of NOR gate 120. The transition of the first clock pulse of the clock signal of FIG. 12A from high to low will cause the ouptut of NOR gate 120 to transition from low to high and the transition of the second clock pulse of the clock signal of FIG. 12A from low to high will cause the output of NOR gate 120 to transition from high to low resulting in the PHI0 clock signal of FIG. 12B.

The second clock pulse of the clock signal of FIG. 12A will also trigger flip-flop 116 changing the state of its Q output from "0" to "1" and its $\overline{Q}$ output from "1" to "0". The transition of the Q output of flip-flop 116 from low to high triggers flip-flop 118 changing the state of its Q output from "0" to "1" and its $\overline{Q}$ output from "1" to "0". The logic "0" at the $\overline{Q}$ output of flip-flop 116 is provided to the first input of a NOR gate 122, while the logic "0" at the $\overline{Q}$ output of flip-flop 118 is provided to the second input of NOR gate 122 and the clock signal of FIG. 12A is provided to the third input of NOR gate 122. The transition of the second clock pulse of the clock signal of FIG. 12A from high to low will cause the output of NOR gate 122 to transition from low to high and the transition of the third clock pulse of the clock signal of FIG. 12A from low to high will cause the output of NOR gate 122 to transition from high to low resulting in the PHI1 clock signal of FIG. 12C.

The third clock pulse of the clock signal of FIG. 12A will also trigger flip-flop 116 changing the state of its Q output from "1" to "0" and its $\overline{Q}$ output from "0" to "1". The logic "0" at the Q output of flip-flop 116 is provided to the first input of a NOR gate 124, while the logic "0" at the $\overline{Q}$ output of flip-flop 118 is provided to the second input of NOR gate 124 and the clock signal of FIG. 12A is provided to the third input of NOR gate 124. The transition of the third clock pulse of the clock signal of FIG. 12A from high to low will cause the output of NOR gate 124 to transition from low to high and the transition of the fourth clock pulse of the clock signal of FIG. 12A from low to high will cause the output of NOR gate 124 to transition from high to low resulting in the PHI2 clock signal of FIG. 12D.

The fourth clock pulse of the clock signal of FIG. 12A will also trigger flip-flop 116 changing the state of its Q output from "0" to "1" and its $\overline{Q}$ output from "1" to "0". The transition of the Q output of flip-flop 116 from low to high triggers flip-flop 118 changing the state of its Q output from "0" to "1" and its $\overline{Q}$ output from "1" to "0". The logic "0" at the $\overline{Q}$ output of flip-flop 116 is provided to the first input of a NOR gate 126, while the logic "0" at the $\overline{Q}$ output of flip-flip 118 is provided to the second input of NOR gate 126 and the clock signal of FIG. 12A is provided to the third input of NOR gate 126. The transition of the fourth clock pulse of the clock signal of FIG. 12A from high to low will cause the output of nor gate 126 to transition from low to high and the transition of the fifth clock pulse of the clock signal of FIG. 12A from low to high will cause the output of NOR gate 126 to transition from high to low resulting in the PHI3 clock signal of FIG. 12E.

The logic "0" from the $\overline{Q}$ output of flip-flop 114 is provided to the first input of a NOR gate 128, while the clock signal of FIG. 12A is provided to the second input of NOR gate 128. The Q output of flip-flop 116 is provided to the first input of a NAND gate 130 and the Q output of flip-flop 118 is provided to the second input of NAND gate 130 with the output of NAND gate 130 being inverted by an inverter 132 which, in turn, has an output connected to the third input of NOR gate 128. During the first three clock pulses of the clock signal of FIG. 12A, the output of inverter 132 is a logic "0" which allows NOR gate 128 to invert and pass therethrough the clock signal of FIG. 12A. The fourth clock pulse of the clock signal of FIG. 12A provides for a logic "1" at the Q output of flip-flops 116 and 118 which results in a logic "1" being provided to the third input of NOR gate 128 so that the output of NOR gate 128 is a logic "0", thereby providing the PHIOI2 clock signal of FIG. 12F.

The signal from the $\overline{Q}$ output of flip-flop 114 is also provided to the input of an inverter 134, which inverts this signal thereby providing for the reset system signal of FIG. 12I.

Figure 13:
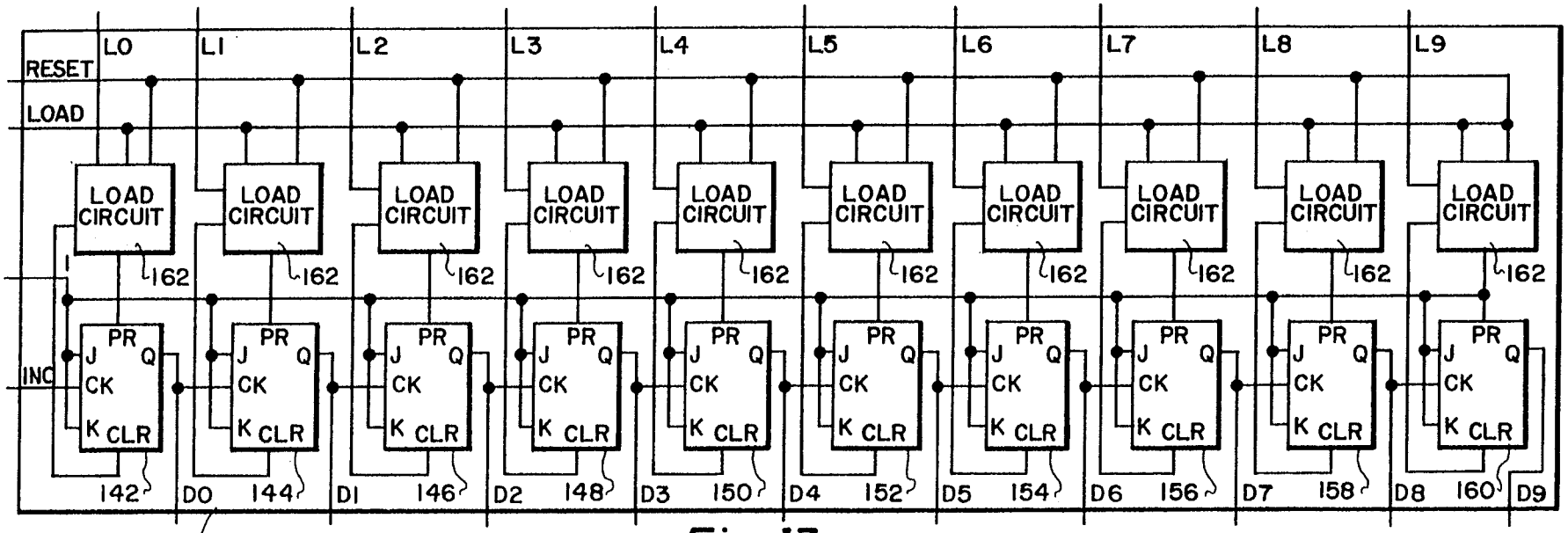
FIG. 13 is a circuit diagram of the ten bit parallel loadable up counter used in the present invention.

Referring now to FIGS. 10, 12 and 13 there is is shown a ten bit parallel loadable up counter 140 which comprises ten negative edge triggers J K flip-flops 142, 144, 146, 148, 150, 152, 154, 156, 158 and 160. The output of NOR gate 128 (FIG. 11), is connected to the clock input of flip-flop 142 thereby providing the PHIOI2 clock signal of FIG. 12(H) to the clock input of flip-flop 142. The J and K inputs of each flip-flop 142 thru 160 are connected to a logic "1" and the Q output of each flip-flop 142 thru 158 of counter 140 is, in turn, connected to the clock input of the succeeding or next stage flip-flop 144 thru 160 so that the negative or trailing edge of each clock pulse of the PHIOI2 clock signal of FIG. 3F will increment counter 140. It should be noted that counter 140 is a binary or ripple counter which counts up using only two numbers, 1 and 0. For example, the first stage of counter 140, that is flip-flop 142 stores a count up to 2, the third stage of counter 140 stores a count up to 8, and the tenth stage of counter 140 stores a count up to 1024.

Each flip-flop 142 thru 160 of counter 140 has respectively connected to the PR and CLR inputs thereof the reset and clear outputs of a load circuit 162, with each load circuit 162 having a DATA input (L1 e.g.), a RESET input connected to the output of inverter 134, (FIG. 11) and a LOAD input connected through a pair of inverters 164 and 166, (FIG. 10) to the load output of a control circuit 168, (FIG. 10). Each LOAD circuit 162 (FIG. 14), in turn, comprises a NAND gate 170 having a DATA input, a RESET input connected to the output of inverter 134, (FIG. 11) and an output connected to the first input of a NAND gate 172. The second input of NAND gate 172 is connected to the output of a NAND gate 174, with the RESET input of NAND gate 174 being connected to the output of inverter 134, (FIG. 11), and the LOAD input of NAND gate 174 being connected through an inverter 176, and inverters 164 and 166, (FIG. 10) to the LOAD output of a control circuit 168, (FIG. 10). A NAND gate 178 has a DATA input and a LOAD input connected through inverters 164 and 166 to the LOAD output of a control circuit 168, (FIG. 10).

Referring now to FIGS. 13 and 14, when the output of inverter 134, (FIG. 11), is low, a logic "0" is provided to the RESET input of counter 140. As is best illustrated by the truth table of FIG. 15A, a logic "0" to the RESET input of load circuit 162 will result in a logic "0" at the CLEAR output of circuit 162 which, in turn, sets flip-flops 142 thru 160 so that the Q output of each flip-flop 142 thru 160 is a logic "0".

After counter 140 is reset load circuits 162 allow for the parallel loading of an eight bit word provided by an eight bit latch/pipeline register 180, (FIG. 10) which is transferred from latch 180 to the L2 thrug L9 inputs of counter 140 on the trailing edge of the PHI1 clock signal of FIG. 12C. The L0 and L1 inputs of counter 140 are tied to a logic "0" signal, while the L2 thru L9 inputs of counter 140 may be either a logic "0" or "1" depending upon the state of each bit of the eight bit word provided by latch 180. As is best illustrated by the truth table of FIG. 15B, when a logic "1" is provided to the LOAD input of counter 140, circuits 162 will load the logic "1" or "0" provided to each input L0 thru L9 of counter 140 into the Q output of flip-flops 142 thru 160. For example, a logic "1" provided to the L2 input of counter 140, i.e. the data input of circuit 162 and a logic "1" provided to the LOAD input of counter 140 will result in a logic "0" of the PRESET input and a logic "1" to the CLEAR input of flip-flop 146 which sets the Q output thereof at a logic "1", while a logic "0" provided to the L3 input of counter 140 will result in a logic "1" to the PRESET input and a logic "0" to the CLEAR input of flip-flop 148 which sets the Q output of flip-flop 148 at a logic "0" state.

Figure 16:
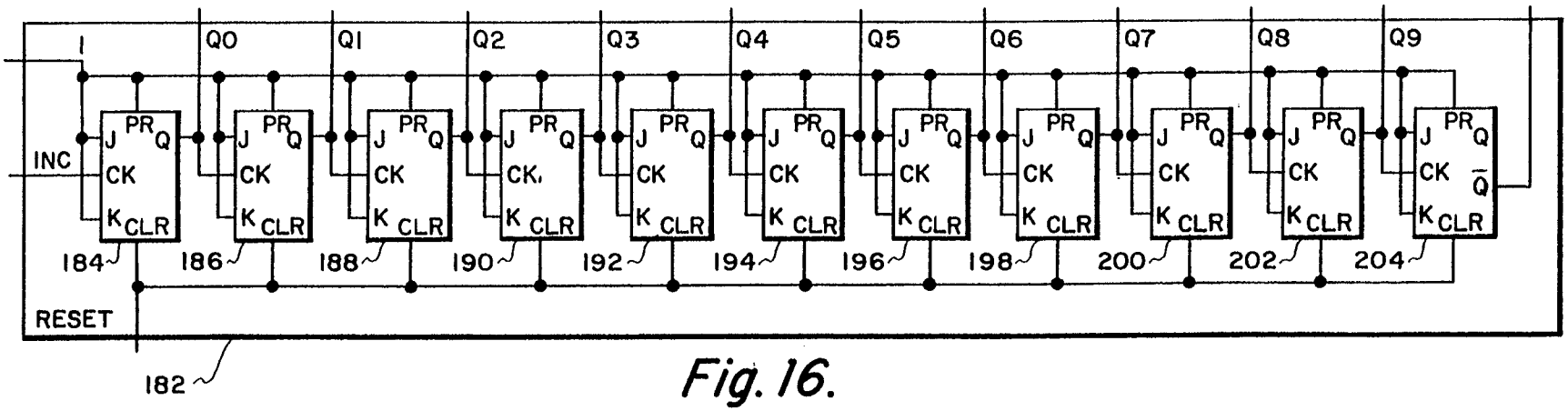
FIG. 16 is a circuit diagram of the eleven bit binary counter used in the present invention.

Referring to FIGS. 10 and 16 there is shown an eleven bit binary counter 182 which provides ten bits for the addressing of nonvolatile statie RAM 78, (FIG. 7) and an eleventh bit as an overflow indicator. Eleven bit binary counter 182 comprises eleven negative edge triggered J K flip-flops 184, 186, 188, 190, 192, 194, 196, 198, 200, 202 and 204. The increment 10 bit counter output (INCOUT) of control circuit 168 is connected to the clock input of flip-flop 184, while the reset 10 bit counter output of control circuit 168 is connected through an inverter 183 to the reset input of counter 182. The J and K inputs of each flip-flop 184 thru 204 are connected to a logic "1" and the Q output of each flip-flop 184 thru 202 of counter 182 is, in turn, connected to the clock input of the succeeding or next stage flip-flop 186 thru 204 so that the negative trailing edge of each clock pulse of a clock signal provided by control circuit 168 will increment counter 182 by a count of one.

Figure 7:
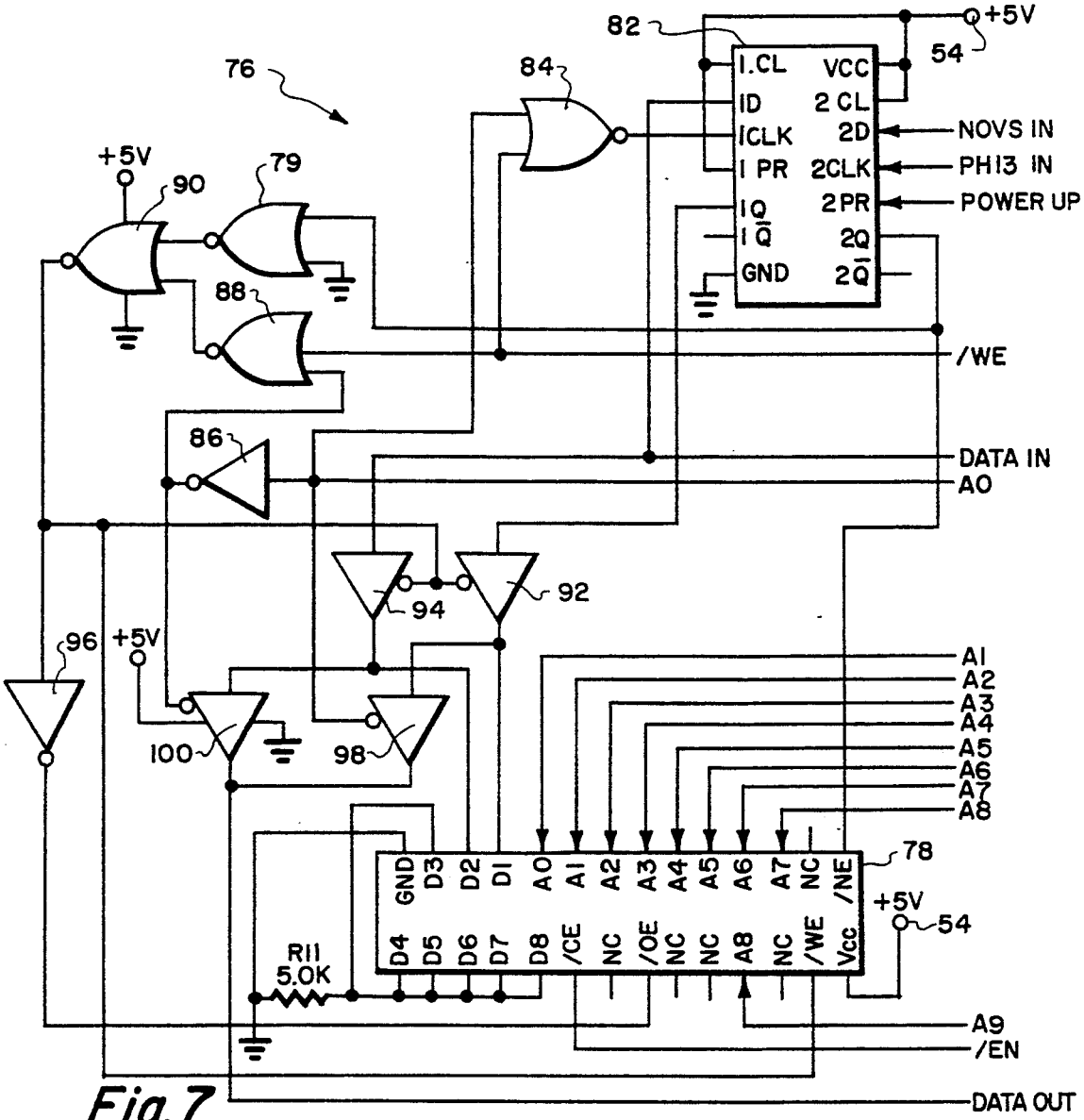
FIG. 7 is an enlarged circuit diagram of the nonvolatile static RAM interface circuit of FIGS. 1A and 1B.

Referring now to FIGS. 7 and 16 the Q output of flip-flop 184 is connected to the A0 input line of nonvolatile static RAM interface circuit 76 and the Q outputs of flip-flops 186 thru 202 are respectively connected to the A1 thru A8 inputs of RAM 78. Since the preferred embodiment of the present invention requires storage capability of 1024 bits and RAM 78 has only a 512×8 bit memory array two data inputs/outputs D1 and D2 were utilized. An address supplied to the A0–A8 address inputs of RAM 78 by the Q outputs of flip-flops 186 thru 202 of counter 182 will allow for either storage into or retrieval from RAM 78 of two data bits from different locations of the memory of RAM 78 using the same address.

Figure 9:
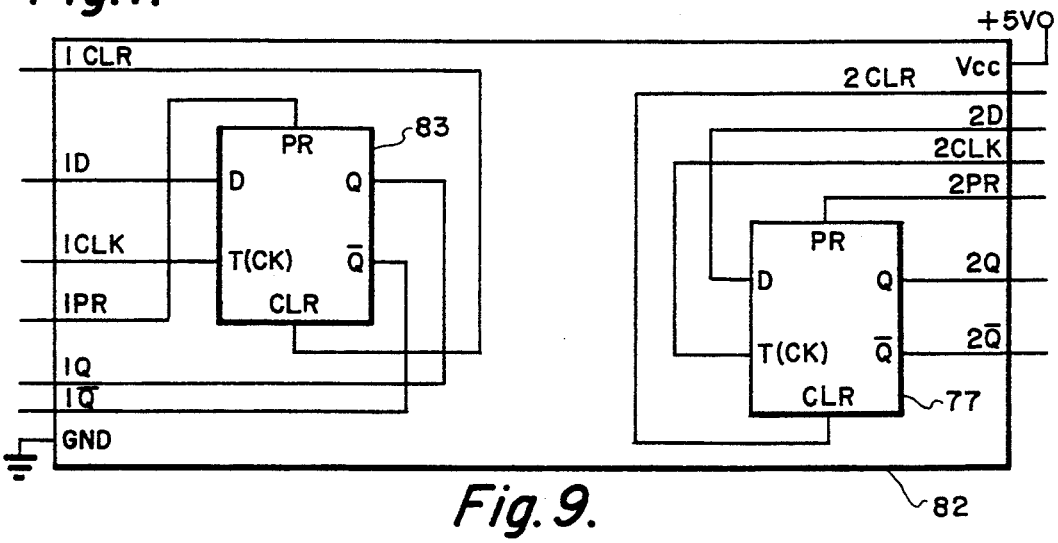
FIG. 9 illustrates a dual D type flip-flop used in the nonvolatile static RAM interface circuit of the present invention.

Referring to FIGS. 8 and 9, when the output of flip-flop 184 transitions from low to high, (FIG. 8A), the first data bit, FIG. 8(B), on the DATA IN line of circuit 76 is stored in flip-flop 83, and also provided to the input of tristate output buffer gate 92. The second data bit, (FIG. 8B), on the DATA IN line is provided to the input of tristate output buffer gate 94. A logic "0", (FIG. 8G), to the enable inputs of gates 92 and 94 latches the first data bit to the output of gate 92, (FIG. 8H), and the second data bit to the output of gate 94, (FIG. 8I). During a write cycle the $\overline{WE}$ input of RAM 78 is held low, (FIG. 8G), allowing the two data bits provided at the D1 and D2 inputs/outputs of RAM 78 to be stored in RAM 78 at the address specified by flip-flops 186–202. During a read cycle the $\overline{OE}$ input of RAM 78 is held low allowing the two data bits stored at the address specified by flip-flops 186–202 to be provided to the D1 and D2 inputs/outputs of RAM 78. When the A0 line of circuit 76 is low, (FIG. 8A) the data bit at the D1 input/output of RAM 78 is latched through gate 98 to the DATA IN line of circuit 76. When the A0 line of circui 76 is high, (FIG. 8A), the data bit at the D2 input/output of RAM 78 is latched through gate 100 to the DATA OUT line of circuit 76. When the Q output of flip-flop 204 transitions to a logic "1" and the $\overline{Q}$ transitions to a logic "0" counter 182 has reached a binary count of 512, which, in turn, indicates that 1024 data bits have been stored in or retrieved from RAM 78.

Referring now to FIGS. 10 and 17 nonvolatile memory sequence control circuit 75 has four eight bit latches 180, 206, 208, and 210, with each eight bit latch comprising eight negative edge triggered D flip-flops 212, 214, 216, 2187, 220, 222, 224, and 226. Digital data at the D0–D7 inputs of latch 206 is latched or transferred to the Q0–Q7 outputs of latch 206 by the PHI0 clock signal of FIG. 12B, digital data at the D0–D7 inputs of latch 180 is latched or transferred to the Q0–Q7 outputs of latch 180 by the PHI1 clock signal of FIG. 12C and digital data at the D0–D7 inputs of latch 208 is latched or transferred to the Q0–Q7 outputs of latch 208 by the PHI2 clock signal of FIG. 12D. A load counter timer signal, which is provided by control circuit 168 and then inverted by an inverter 228, latches the digital data at D0–D7 inputs of latch 210 to the Q0–Q7 outputs of latch 210.

Referring to FIGS. 10 and 18, there is shown an eight bit binary or ripple counter 230 which comprises eight negative edge triggered J K flip-flops 232, 234, 236, 238, 240, 242, 244 and 246. The increment counter timer (ICT) output of control circuit 168 is connected to the clock input of flip-flop 232, while the reset counter timer output of control circuit 168 is connected through an inverter 248 to the RESET input of counter 182. The J and K inputs of each flip-flop 232 thru 246 are connected to a logic "1" and the Q output of each flip-flop 232 thru 244 of counter 230 is, in turn, connected to the clock input of the succeeding or next stage flip-flop 234 through 246 so that the negative or trailing edge of each clock pulse of an increment counter timer clock signal provided by control circuit 168 will increment counter 230 by a count of one.

Referring to FIGS. 10, 19 and 20 there is shown an eight by two bit comparator 250 which compares the Q0–Q7 outputs of latch 210 to the Q0–Q7 outputs of counter 230. Comparator 250 comprises eight one bit comparator circuits 252 which operates in accordance with following logic equation:

$$Comparator\ out = \overline{A1}B1 + \overline{B1}A1 \quad (9)$$

where A1 is the input to inverter 254, B1 is the input to inverter 256, P1, P2, P3 and P4 are p-channel metal-oxide-semiconductor (MOS) transistors, N1, N2, N3 and N4 are n-channel MOS transistors, and comparator out is a digital logic signal supplied to the input of inverter 258.

It should be noted that each MOS transistor P1–P4 functions as a switch which is open when a logic "1" is applied to its gate and is closed when a logic "0" is applied to its gate. Similarly, each MOS transistor N1–N4 functions as a switch which is open when a logic "0" is applied to its gate and is closed when a logic "1" is applied to its gate. Thus, for example when a logic "0" is provided to the A1 input of circuit 250 transistor P3 is turned on, while a logic "1" at the B1 input of circuit 250 which is inverted by inverter 256 to a logic "0", will turn on transistor P4, thereby providing a logic "1" to the input of inverter 258.

As shown in the truth table of FIG. 20, when the logic signal to the A1 input of one bit comparator circuit 252 is the same as the logic signal to the B1 input of one bit comparator circuit 252 the output of inverter 258 is a logic "1". However, as shown in the truth table of FIG. 20 when the logic signals to the A1 and B1 inputs are different the output of inverter 258 is a logic "0".

Figure 21:
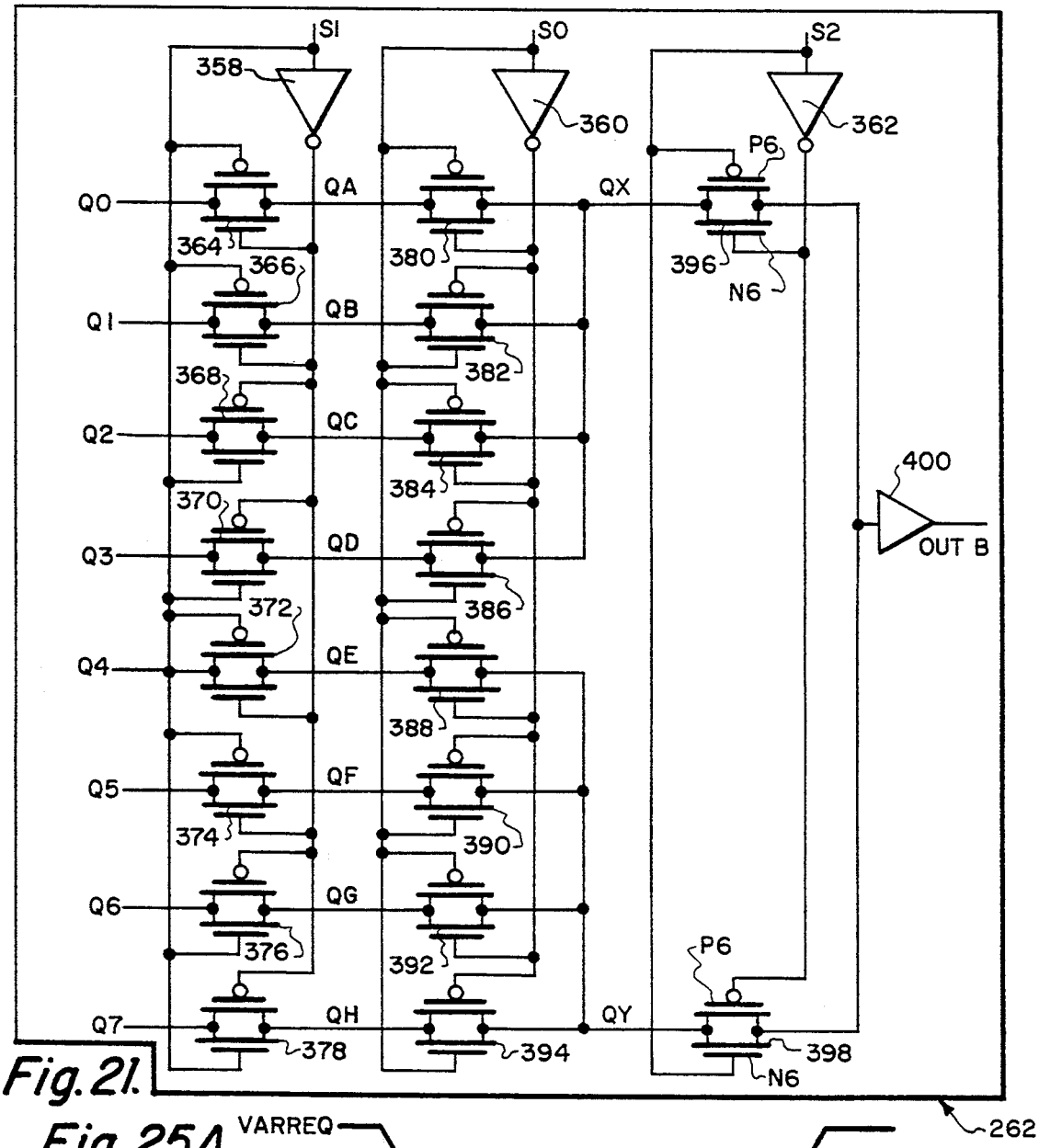
FIG. 21 is the circuit diagram of the eight-by-one multiplexer circuit used in the present invention.

The increment counter timer clock signal provided by control circuit 168 will increment counter 230 one bit for each clock pulse until the binary number at the Q0–Q7 outputs of counter 230 is the same as the binary number at the Q0–Q7 outputs of latch 210. When the binary numbers are identical the output of NAND gate 260 changes from a logic "1" to a logic "0" which is provided to the Q2 input of an eight-to-one multiplexer circuit 262, (FIG. 21).

Referring now to FIGS. 1A, 1B, 10, 23 and 24 control circuit 168 includes an increment ten bit counter circuit 264 and reset ten bit counter circuit 266 which respectively provide the clock signal and the reset signal to counter 182. As is best illustrated by the truth table of FIG. 24A when a "0" is supplied through the increment ten bit (INC10BIT) input of control circuit 168 to the first input of a NOR gate 268, the PHI2 clock signal of FIG. 12D which is supplied through an inverter 270 to the second input of NOR gate 268 will pass through NOR gate 268, a NOR gate 272 and an inverter 274 to the increment ten bit output of circuit 168 (when the output of gate 278 is a "0"). When a logic "0" is provided through the feed through mode (FTM) input of control circuit 168 to the first input of a NOR gate 278, a clock signal, FIG. 25C, provided by a loader apparatus/device 276 through the fill clock input (FCI) of control circuit 168 will pass through NOR gates 278 and 272 and inverter 274 to the increment 10 bit output of control circuit 168 (when the output of gate 268 is a "0").

Figure 25A:
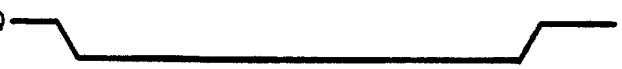
FIGS. 25A to 25D illustartes various digital logic signals provided by a loader to the present invention.
Figure 25B:
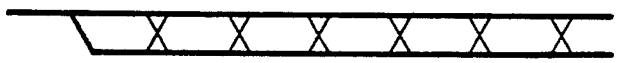
Figure 25C:
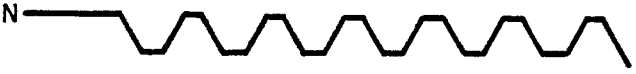

At this time, it should be noted that the loader 276 provides the key word to initiate scrambling of digital data by an encryption device and thereby hide its true information content and that loader 276 also provides the clock signal of FIG. 25C. Loader 276 may be any communications security controlled equipment such as a model number KOI-18 or a model number KYK-13 loader and it should be understood that the details of the circuitry and the operation of the loader are not particularly germane to the inventive concept of the present invention.

As is best illustrated by the truth table of FIG. 24C, when a logic "0" is provided through the reset ten bit (R10BIT) input of control circuit 168 to the first input of a NOR gate 280 the PHI3 of FIG. 12E will pass through an inverter 282 which inverts the signal of FIG. 12E to the second input of NOR gate 280 which again inverts the signal of FIG. 12E thereby providing the PHI3 clock signal at the reset ten bit (RESET10-BIT) output of control circuit 168.

Control circuit 168 also includes a fill clock enable circuit 284 which provides a clock signal to a negative edge triggered D type flip-flop 286 to allow a key word i.e. a 256 bit digital word stored in RAM 78 to be clocked from RAM 78 through flip-flop 286 to an encryption circuit 288. Encryption circuit 288 may be any communications security controlled equipment such as a model number KVG-68 encryption circuit manufactured by Motorola of Phoenix, Ariz. and it should be understood that the details of the circuitry and the operation of the encryption circuit are not particularly germane to the inventive concept of the present invention.

Circuit 284 includes a pair of NOR gates 290 and 292 configured to form a set-reset flip-flop 293. As is best illustrated by the truth table of FIG. 24B, when a logic "0" is provided through the fill clock enable (FCE) input of control circuit 168 to the first input of NOR gates 294 and 296, a clock pulse of the PHI2 clock signal of FIG. 12D which is inverted by inverter 298 and again inverted by NOR gate 294 will reset flip-flop 293 to a logic "0" state, while a clock pulse of the PHI0 clock signal of FIG. 12B which is inverted by inverter 300 and again inverted by NOR gate 296 will set flip-flop 293 to a logic "1" state. This, in turn, results in the fill clock out clock signal of FIG. 26C appearing at the fill clock out (FILLCLKO) output of control circuit 168.

Figure 25D:
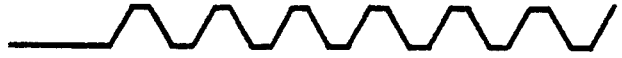

Referring now to FIGS. 1(A), 1(B), 7, 10, 23 and 24 control circuit 168 further includes a NOVRAM control circuit 302 which provides the read/write digital logic signal for either storing digital data in RAM 78 or retrieving digital data from RAM 78. As is best illustrated by the truth tables of FIGS. 24D and 27, when logic ones are supplied through the RC0 and RC1 inputs of control circuit 168 to the A and B inputs of a 2 line to 4 line decoder 304, logic ones are provided through the first, and second outputs of decoder 304 to the NOVRAM store and NOVRAM recall outputs of circuit 168 and a logic "0" is provided through the third output of decoder 304 to the first input of NOR gates 308 and 314. A logic "0" supplied through the FTM input of circuit 168 to the second input of NOR gate 314 will allow the fill clock in signal of FIG. 25C, which is inverted by inverter 312 to pass through and be inverted again by gate 314. The logic "0" supplied through the FTM input of circuit 168 is also inverted to a logic "1" by inverter 310 and supplied to the second input of NOR gate 308, which results in a logic "0" at the output of NOR gate 308 which is supplied to the first input nor gate 316. The clock signal of FIG. 25C is again inverted by nor gate 316, (FIG. 25D) and provided to the $\overline{WE}$ line of circuit 76, (FIG. 7), as the /WE signal of FIG. 8C. Similarly, a logic "1" provided through the FTM input of control circuit 168 will prevent the passage of the signal of FIG. 25C through NOR gate 314 and allow the PHI3 signal of FIG. 12E to pass through inverter 306 and NOR gate 308 to the first input of NOR gate 316. The logic "1" supplied through the FTM input of circuit 168 to the second input of NOR gate 314 results in a logic "0" at the output of nor gate 314 which is supplied to the second input of NOR gate 316. This gate 316, in turn, inverts the PHI3 signal of FIG. 12E resulting in the read/write digital logic signal of FIG. 12J which is provided to the $\overline{WE}$ line of circuit 76, (FIG. 7).

Referring now to FIGS. 10 and 23, there is shown an counter-timer control circuit 318 which provides the increment or clock signal and the reset signal to counter 230 and the clock signal to latch 210. As is best illustrated by the truth tables of FIG. 24E and 28, when a logic "1" is provided through CT1 input of control circuit 168 to the B input of a 2 line to 4 line decoder 320 and a logic "0" is provided through the CT0 input of circuit 168 to the A input of decoder 320, the second output of decoder 320 is a logic "1" which is provided to the reset counter timer (RCT) output of control circuit 168 to inverter 248 (FIG. 10) which provides a logic "0" to counter 230 (FIG. 10) to reset flip-flops 232–246, FIG. 18. Further, as is best illustrated by the truth table of FIGS. 24E and 28 when the B input of decoder 320 is a logic "0" and the A input transitions from "0" to "1" the first output of decoder transition from "0" to "1" resulting in a "0" to "1" transition at the load counter timer (LCT) output of control circuit 168 which is inverted by inverter 228. This provides to the clock input of flip-flops 212–226, FIG. 17, of latch 210 a "1" to "0" transition transferring the eight bit word-/count at the D0–D7 inputs of latch 210 to the A0–A7 inputs of comparator 250. Comparator 250, in turn will compare its eight bit count at the A0–A7 with the eight bit word/count provided by counter 230 to the B0–B7 inputs thereof and when the counts are identical comparator 250 will provide a logic "0" at its compare output which is then provided to the Q2 input of eight-to-one multiplexer circuit 262, (FIG. 21).

Again, as is best illustrated by the truth tables of FIG. 24E and 28 when logic ones are provided to the A1 and B1 inputs of decoder 320, the third output of decoder 320 is a logic "1" which is inverted by an inverter 322 thereby providing to the first input of a NOR gate 324 a logic "0". The PHI3 clock signal of FIG. 12E which is inverted by inverter 326 can then pass through NOR gate 324, which again inverts the signal, to the increment input of counter 230. The PHI3 clock signal is the clock signal for counter 230.

As is best illustrated by the truth table of FIG. 24F, the load micro counter circuit 328 of control circuit 168 allows the PHI3 clock signal of FIG. 12E to pass therethrough to the load micro counter (LMC) output thereof when a logic "0" is provided through the CMPIN input of circuit 168 to the first input of a NOR gate 330. The PHI3 clock signal of FIG. 12E is first inverted by an inverter 322, then inverted by NOR gate 330 and supplied through inverters 164 and 166 to the load input of counter 140.

Referring now to FIGS. 1A, 1B, 7, 9, 10, and 23 when power is turned on for the nonvolatile memory system, the output of direct current voltage source 54 transitions from 0 to 5 bolts as is best illustrated by FIG. 29(A). Voltage sensing circuit 52 is set so as to change state from a logic "0" to a logic "1" whenever the direct current voltage signal provided by direct current voltage source 54 to the threshold voltage input of circuit 52 exceeds 4.5 volts as is shown by FIG. 29B. The signal of FIG. 29B is provided to the PR input of flip-flop 77 which sets the Q output of FLIP-flop 77 at a logic "1" state as shown by FIG. 29F.

As is best illustrated by the truth tables of FIGS. 24D and 27, when a logic "0" is supplied through the RC0 and RC1 inputs of control circuit 168 respectively to the A and B inputs of a 2 line to 4 line decoder 304, a logic "1" is provided through the first output of decoder 304 to the NOVRAM store output of circuit 168. The logic "1 " is next provided to the D input of flip-flop 77, (FIG. 9), and clocked through flip-flop 77 to the Q output thereof on the positive going edge of the first clock pulse of the PHI3 clock signal of FIG. 29C, thereby insuring a logic "1" at the $\overline{NE}$ input of RAM 78. A logic "1" at the A and B inputs of decoder 304 maintains the first output of decoder 304 at a logic "1" state, thereby maintaining a logic "1" to the D input of flip-flop 77 which is clocked through flip-flop 77 to the Q output thereof on the positive going edge of the each clock pulses of the PHI3 clock signal of FIG. 29C.

As is best illustrated by FIGS. 29D and E, when an erasable programmable read-only memory (EPROM) 332, (FIG. 1B), provides a logic "0" to the A input of decoder 304 and a logic "1" to the B input of decoder 304, the first output of decoder 304 will go to a logic "1" state from an unknown state on the leading edge of the first clock pulse of the PHI2 clock signal of FIG. 29D.

Referring again to the truth tables of FIGS. 24D and 27 when a logic "1" is supplied to the A input of decoder 304 and a logic "0" is supplied to the B input of decoder 304 by EPROM 332 the first output of decoder 304 changes to a logic "0" state on the trailing edge of a PHI2 clock pulse as is illustrated by FIGS. 29D and E. This provides to the D input of flip-flop 77 a logic "0" which is clocked through flip-flop 77 to the Q output thereof on the positive going edge of the first clock pulse of the PHI3 clock signal of FIG. 29C after the D input of flip-flop 77 transitions from "1" to "0", thereby providing a logic "0" to the $\overline{NE}$ input of RAM 78.

It should be noted when power is first turned on, logic zeros are supplied to the A and B inputs of decoder 304 resulting in a logic "1" at the third output of decoder 304. The logic "1" is supplied to the first input of nor gates 308 and 314 thereby preventing either the PHI3 clock signal of FIG. 12E or the clock signal of FIG. 25C from passing through NOVRAM control circuit 302 to the $\overline{WE}$ input of circuit 76. This prevents any voltage spikes which may appear on the DATAIN line of circuit 76 during power up, from being erroneously stored in RAM 78.

It should also be noted that the RAM 78 is a byte wide Nonvolatile Static RAM with a high speed static RAM array overlaid bit-for-bit with a nonvolatile electrically erasable PROM (EEPROM) and that the nonvolatile enable ($\overline{NE}$) input of RAM 78 controls all access to the nonvolatile electrically erasable PROM with RAM 78. As is best illustrated by the truth table of FIG. 30, with the $\overline{NE}$ input low or logic "0" and the $\overline{WE}$ line high a recall operation causes the entire contents of the nonvolatile electrically erasable PROM to be written into the RAM array. $\overline{NE}$ low and $\overline{WE}$ low is defined as a write operation which stores or writes the contents of the RAM array into the nonvolatile electrically erasable PROM.

The EPROM 332 used in the preferred embodiment of the present invention is a Texas Instruments model TMS27C64 63,536 bit erasable programmable read only memory. The EPROM 332 is enabled by a logic "0" provided by the enable output of NAND gate 46 of power control circuit 41 and is in a power down state when the enable output of NAND gate 46 is at a logic "1" state. For any ten bit address provided by counter 140 to the A0–A9 address inputs of EPROM 332, EPROM 332 will provide at the Q1–Q8 outputs thereof an eight bit word. Each eight bit word is, in turn, provided to the D0–D7 inputs of latches 180, 206, and 208.

Referring now to FIGS. 1A, 1B, 10, 21, and 31, the trailing edge of a clock pulse of the PHI1 clock signal of FIG. 12C transfers the eight bit word provided by EPROM 332 through latch 206 to, the power down input line (PD) of power down circuit 41, the sense out (SO) input of encryption circuit 288, the verification input of loader device 276, (VARREQ), the S0 and S1 inputs of a four-to-one demultiplexer/decoder circuit 334, and the S0, S1 and S2 of eight-to-one multiplexer circuit 262.

Figures 32, 33A:
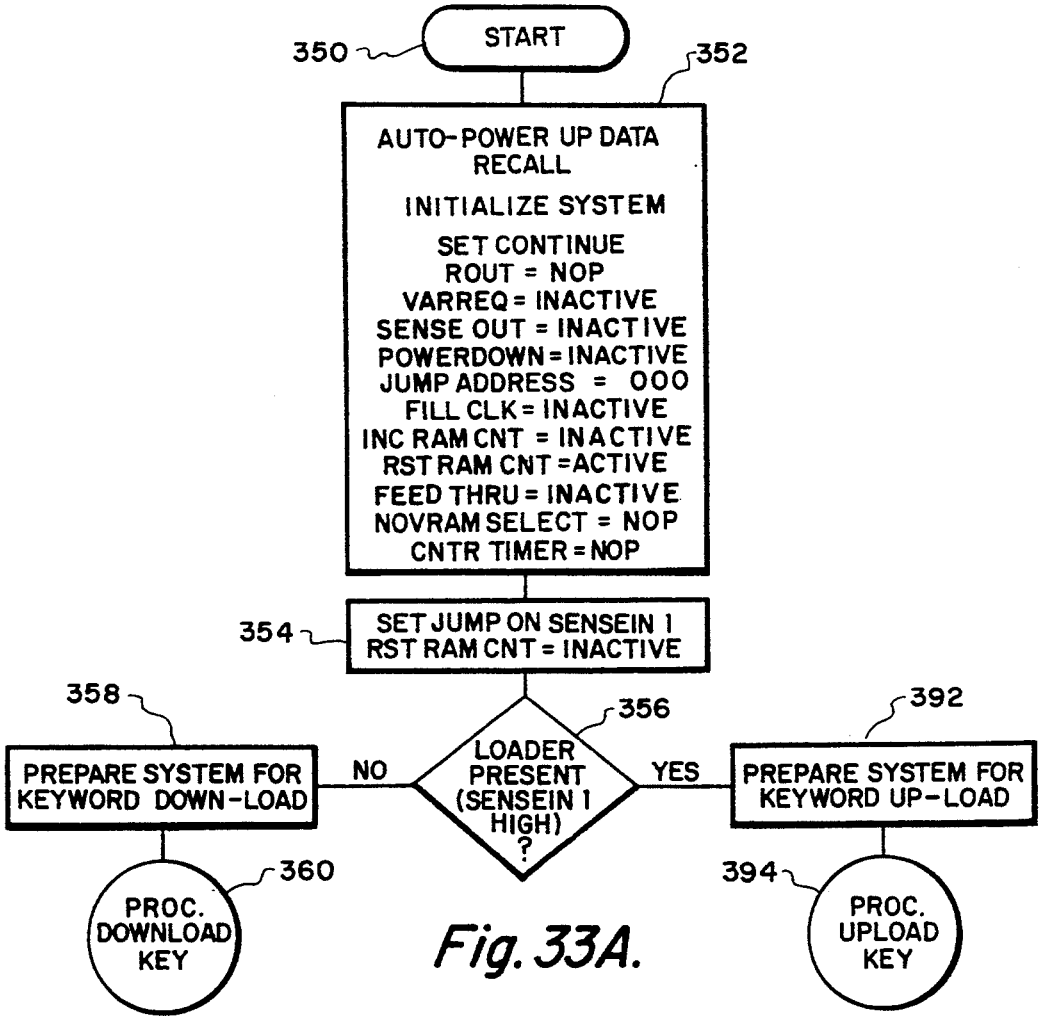
Figure 33B:
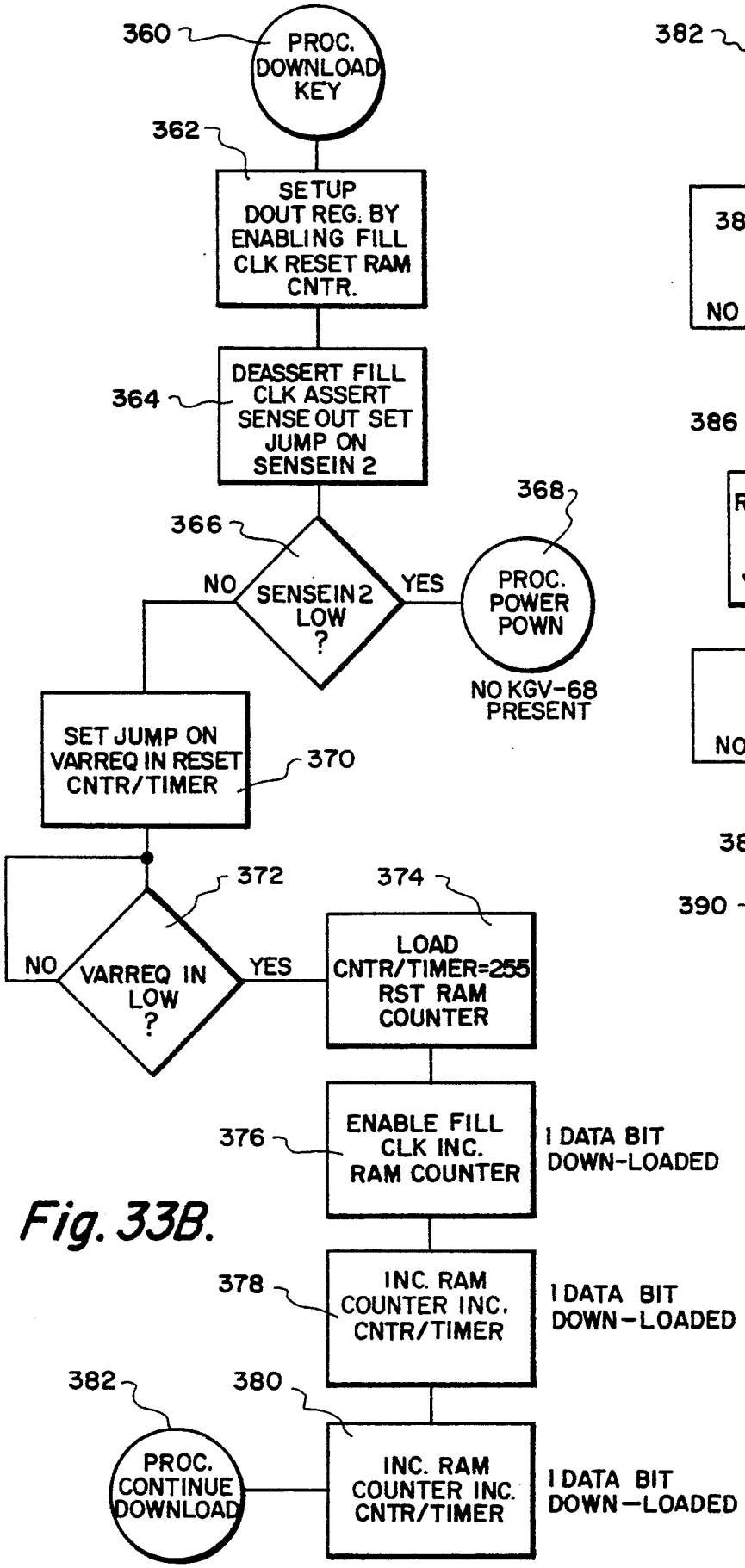
Figure 33C:
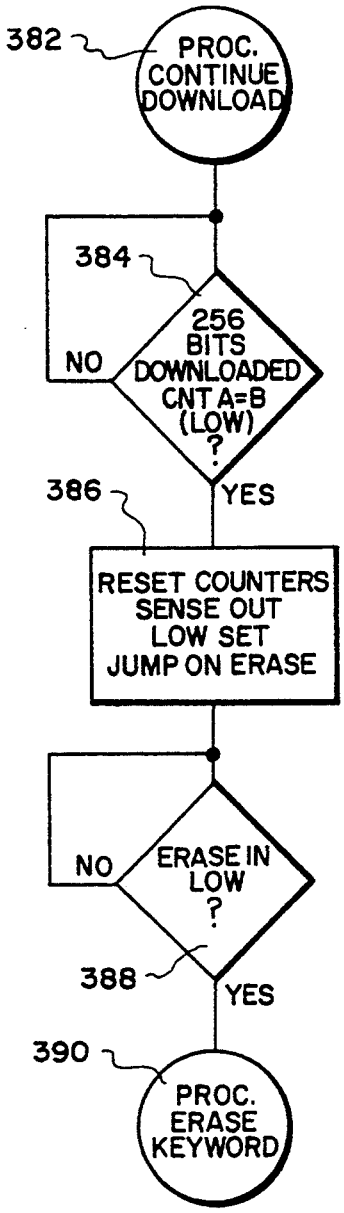
Figure 33D:
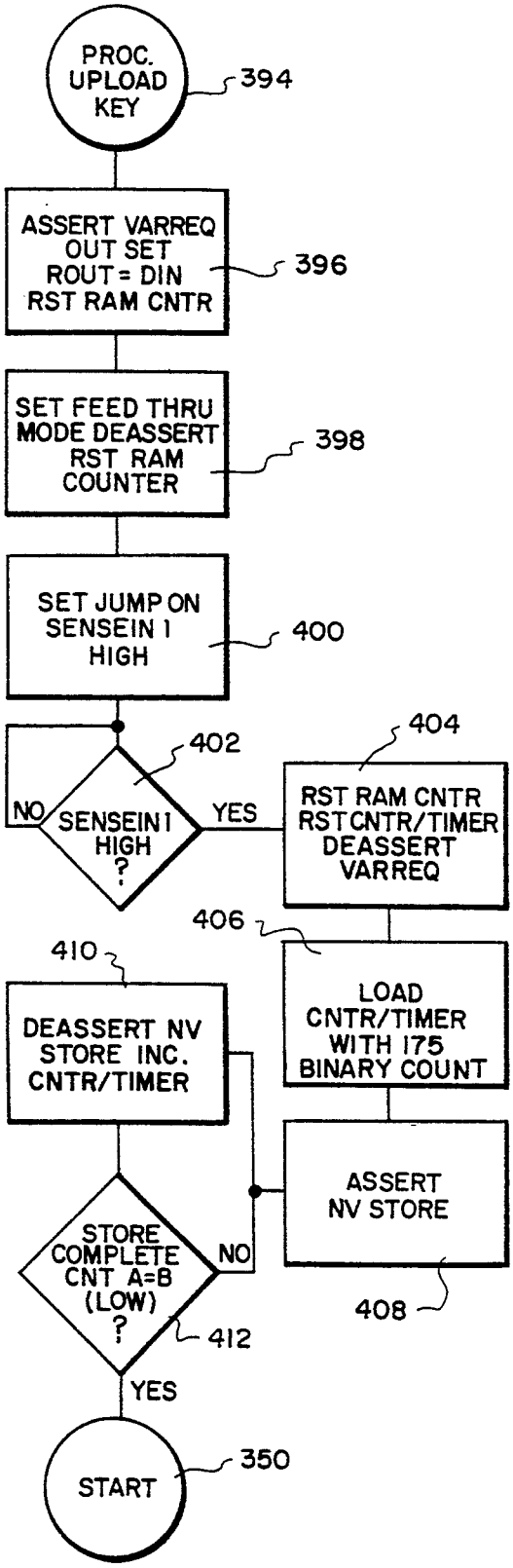
Figure 33E:
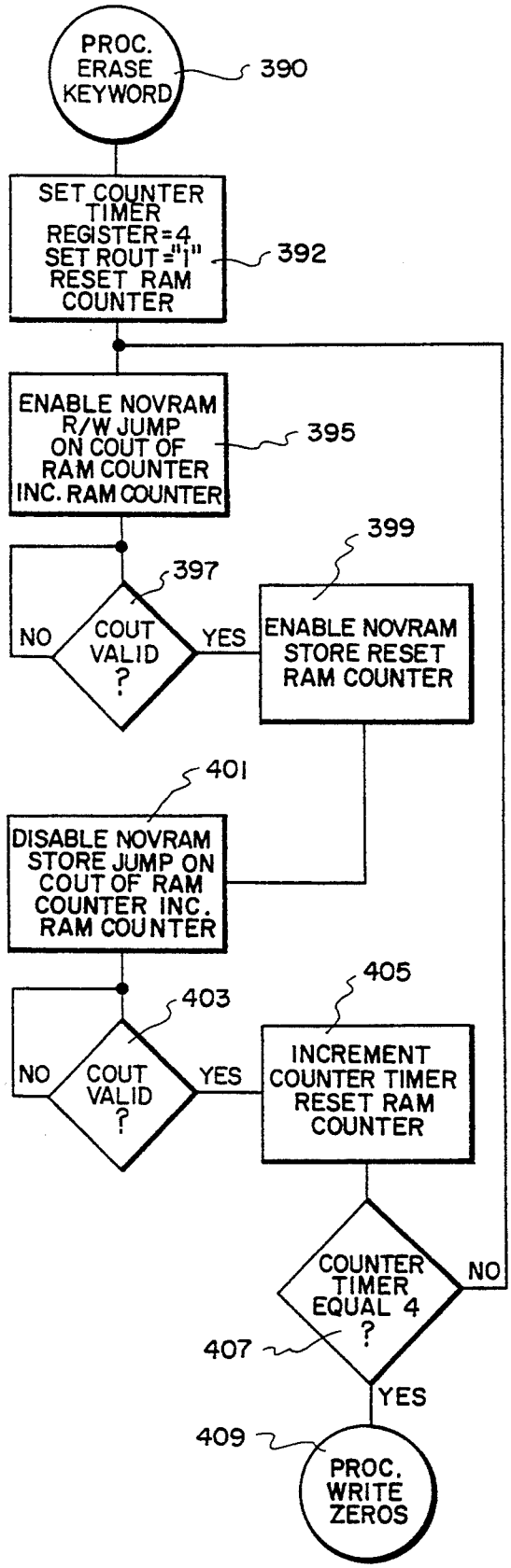
Figure 33F:
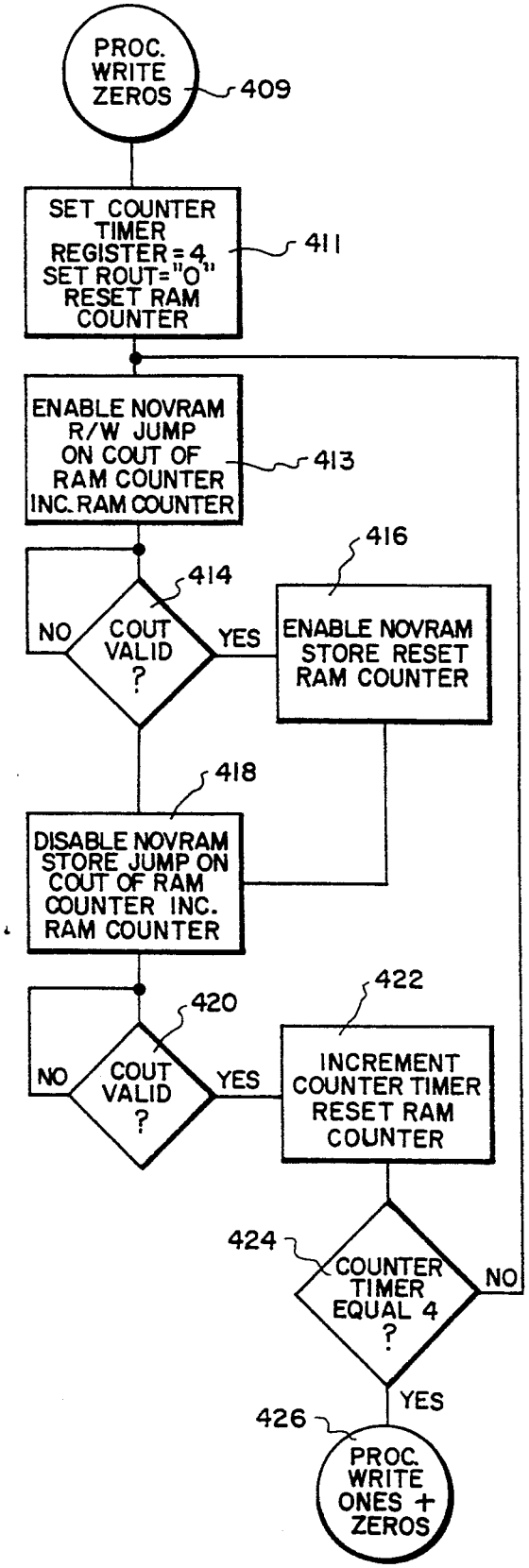
Figure 33G:
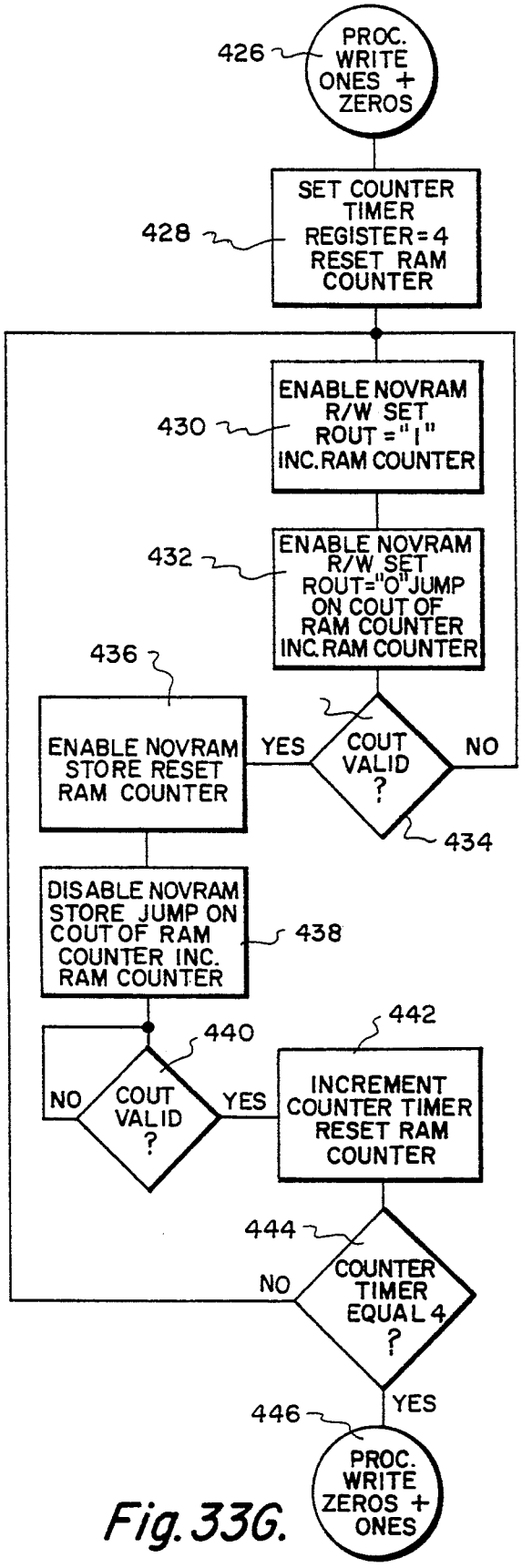
Figure 33H:
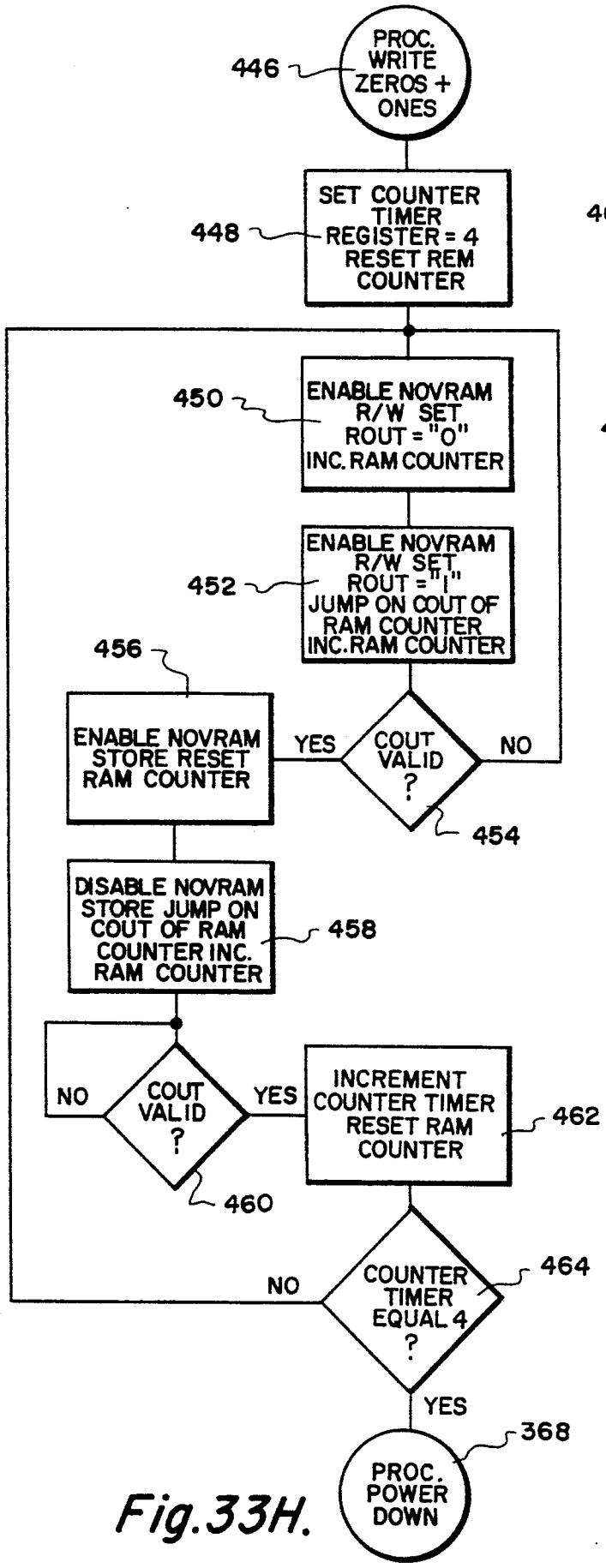
Figure 331:
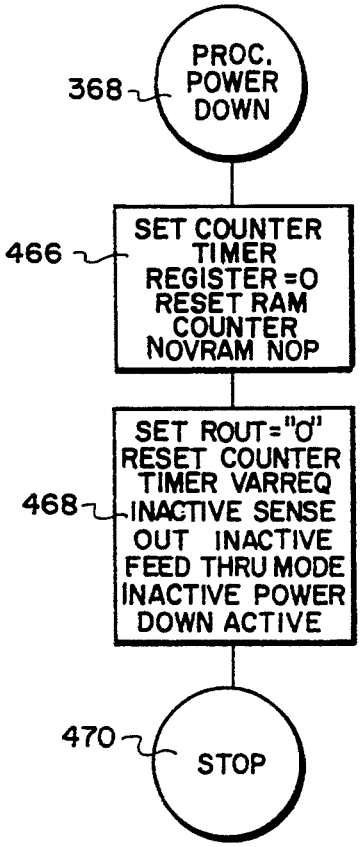

Demultiplexer circuit 334 (FIG. 31) comprises a pair of inverters 336 and 338, eight transmission gates 340–354 and an output driver 356. Each transmission gate 340–354 includes a p-channel MOS field effect transistor (Pfet) P5 and an n-channel MOS field effect transistor N5. Each p-channel MOS transistor P5 will pass a signal at its input when a logic "0" is applied to the base thereof, while each n-channel MOS transistor N5 will pass a signal at its input when a logic "1" is applied to the base thereof. A logic "0" provided at the S1 input of circuit 334 turns on transistors P5 and N5 of transmission gate 342, while a logic "1" applied to the S1 input of circuit 334 turns on transistors P5 and N5 of transmission gate 350 allowing gate 342 to pass from the Q1 input to the output thereof logic zeros and ones as is best illustrated by the truth table of FIG. 32. Since the data output of loader device 276 is connected to the Q1 input of demultiplexer circuit 334 the logic "0" to the S1 input and the logic "1" to the S0 input of circuit 334 allow data to be transferred from the loader 276 through transmission gates 342 and 350 of demultiplexer circuit 334 to the D1 and D2 inputs of RAM 78 for storage within RAM 78.

Multiplexer circuit 262 (FIG. 21) comprises three inverters 358, 360, and 362, eighteen transmission gates 364–398 and an output driver 400. Each transmission gate 364–398 includes a p-channel MOS field effect transistor P6 and an n-channel MOS field effect transistor N6. Each p-channel MOS transistor P6 will pass a signal at its input when a logic "0" is applied to the base thereof, while each n-channel MOS transistor N6 will pass a signal at its input when a logic "1" is applied to the base thereof. Depending upon the logic signals provided to the S0, S1, and S2 inputs of multiplexer circuit 262 by EPROM 332, multiplexer circuit 262 will select one of its eight inputs Q0–Q7 to test for the presence of a logic "0" at the selected input. For example, if a logic "0" is provided to the S0 input, a logic "1" is provided to the S1 input and a logic "0" is provided to the S2 input, the Q2 input will be sampled since transmission gates 368, 384 and 396 will be conductive as is best illustrated by the truth table of FIG. 22. A logic "0" at the Q2 input of multiplexer circuit 262 will pass through multiplexer circuit 262 to the output of multiplexer circuit 262.

The trailing edge of a clock pulse of the PHI1 clock signal of FIG. 12C transfers the eight bit word provided by EPROM 332 through latch 180 to L2 through L9 inputs of counter 140 and the D0–D7 inputs of latch 210. When a logic "0" is provided from the output of multiplexer 262 through the CMPIN input of circuit 168 to NOR gate 330, the load micro counter circuit 328 allows a clock pulse of the PHI3 clock signal of FIG. 12E to pass therethrough to the LMC output of circuit 168. The clock pulse is, in turn, supplied to the load input of counter 140 causing the load input to go to a logic input "1" state which parallel loads the ten data bits at the L0–L9 inputs of counter 140 into flip-flops 142–160. The ten data bits provided to the L0–L9 inputs of counter 140 which when loaded into flip-flops 142–160 provide a different address sequence for EPROM 332 which with the address sequence being incremented one count on the trailing edge of each clock pulse of the PHO12 clock signal of FIG. 12F. It should be noted that L1 and L2 data inputs of counter 140 are tied to a logic "0", while the data bits to the L3–L9 data inputs of counter 140 are provided by EPROM 332.

As is best illustrated by the truth table of FIG. 22, a 0, 0, 1 provided respectively to the S2, S1, and S0 inputs of multiplexer circuit 262 allows circuit 262 to test the carry output of counter 182 to determine whether counter 182 has reached a binary count of 1023 which, in turn, indicates that 1024 data bits have been stored in or retrieved from RAM 78. When counter 182 reaches a count of 512, the $\overline{Q}$ output of flip-flop 204 of counter 182 transitions from a logic "1" to "0" thereby providing to the Q1 input of circuit 262 a logic "0". When a logic "0" is present at the Q1 input of circuit 262, the output thereof will go to a logic "0" state, the load micro counter circuit 328 allows a clock pulse of the PHI3 clock signal of FIG. 12E to pass therethrough to the load input of counter 140 causing the load input to go to a logic input "1" state which parallel loads a new address through the L0–L9 inputs of counter 140 into flip-flops 142–160.

In a similar manner a 0, 1, 0 provided respectively to the S2, S1, and S0 inputs of multiplexer circuit 262 allows circuit 262 to test for a logic "0" at the Q2 input of circuit 262. A logic "0" at the Q2 input of circuit 262, in turn, indicates that the binary count in counter 230 is equal to the binary count stored in latch 210. It should be noted that latch 210, comparator 250 and counter 230 function as a counter/timer circuit which provides a logic "0" to circuit 262 when a time period provided by EPROM 332 to latch 210 is complete. Thus, for a binary count of 255 loaded into latch 210 a time period of approximately ten milliseconds is required before the output of comparator 250 will go to a logic "0" state.

A 0, 1, 1 provided respectively to the S2, S1, and S0 inputs of demultiplexer circuit 262 allows circuit 262 to test for a logic "0" at the Q3 input of circuit 262. A logic "0" at the Q3 input of circuit 262 indicates that the VARI output of encryption device 288 is in an active state or logic "0" state. A logic "0" at the VARI output of encryption device 288, in turn, indicates that the encryption device 288 is ready to receive a key word, i.e. the data bits stored in RAM 78.

A 1, 0, 0 provided respectively to the S2, S1, and S0 inputs of multiplexer circuit 262 allows circuit 262 to test for a logic "0" at the Q4 input circuit 262. A logic "0" at the Q4 input of circuit 262 indicates that erase memory switch 70 has been depressed thereby providing the 5 volt signal from source 54 to the threshold input of a voltage sensing circuit 72 which changes state from a logic "0" to a logic "1". It should be noted at this time that the erase memory signal may be any input with an active state of over 4.5 volts D.C. The logic "1" signal is next supplied through inverter 74, which changes the "1" to "0" to the Q4 input of multiplexer circuit 262. The erase input to nonvolatile memory sequence control circuit 75 includes a 200 kilo-ohms resistor R4 tied to source 54 which insures that the erase input is at a logic "1" state if the line is inadvertently opened.

A 1, 0, 1 provided respectively to the S2, S1 and S0 inputs of multiplexer circuit 262 allows circuits 262 to test for a logic "0" at the Q5 input of circuit 262. A logic "0" at the Q5 input of circuit 262 indicates an encryption circuit 288 is not present to receive digital data from RAM 78. A 1, 1, 0 provided respectively to the S2, S1, and S0 inputs of demultiplexer circuit 262 allows circuit 262 to test for a logic "0" at the Q6 input of circuit 262. A logic "0" at the Q6 input of circuit 262 indicates the presence of a loader 276 to provide or transmit digital data to RAM 78. The sense output of loader 276 is a logic "1" which is inverted by an inverter 335 and supplied to the Q6 input of circuit 262. It should be noted that loader 276 and encryption circuit 288 are removable devices which when not present result in a logic "0" to the Q5 input and a logic "1" to the Q6 input of circuit 262 when the respective inputs are pulled up via 20 kilo-ohms resistors (and the inverter 335).

Referring now to FIGS. 1A, 1B, 10 and 33, steps 350–354 is the start up or power up procedure for nonvolatile memory system 36. During power up source 54 goes from 0 to approximately 5 volts, (FIG. 29), which, in turn, results in the a logic "1" at the output of voltage sensing circuit 52 as is best illustrated by FIG. 29A. The signal of FIG. 29B is provided to the PR input of flip-flop 77 which sets the Q output of flip-flop 77 at a logic "1" state as shown by FIG. 29F. During power up the reset output of power control circuit 41 provides a logic "0", FIG. 6A, to the reset input of nonvolatile memory sequence control circuit 75 which resets Johnson counter 110 and ten bit parallel loadable up counter 140. When power reaches a level of approximately 4.5 volts, the reset output of power control circuit 41 goes to a logic "1" state and the enable output of circuit 41 goes to a logic "0" state which enables EPROM 332. During step 354 multiplexer 262 is set to test for the presence of loader device 256, that is if the sense output of loader 276 is high which results in the sense in one input (S11) to nonvolatile memory sequence control circuit 75 being a logic "0" then a new address will be loaded into counter 140 which will initiate the transfer of digital data from loader 276 to RAM 78.

Step 356 tests for the presence of loader 276. If a loader is present i.e. the sense in one (S11) line to circuit 75 is low the nonvolatile memory system 36 proceeds to step 392 loading a new address in counter 140 which prepares nonvolatile memory system 36 to accept digital data from loader device 276. During step 394 the D2 output of EPROM 332 outputs a logic "0" which is clocked through latch 206 by the PHI0 clock signal of FIG. 12B and the VARREQ output of sequence control circuit 75 to the VARREQ input of loader device 276 (see FIG. 25A) indicating to loader 276 that nonvolatile memory system 36 is ready to accept digital data. Counter 182 which provides addressing for RAM 78 is also reset during step 396 and demultiplexer 334 is set to allow data to be transferred from loader 276 through demultiplexer 334 to the data in input of nonvolatile static RAM interface circuit 76.

During step 398 a logic "0" is provided through the third output of decoder 304 to the first input of NOR gates 308 and 314, (FIG. 23). A logic "0" supplied through the FTM input of control circuit 168 to the second input of NOR gate 314 will allow the fill clock signal of FIG. 25(C), which is inverted by inverter 312 to pass through and be inverted again by gate 314. The logic "0" supplied through the FTM input of circuit 168 is also inverted to a logic "1" by inverter 310 and supplied to second input of NOR gate 308, which results in a logic "1" at the output of NOR gate 308 which is supplied to the first input NOR gate 316. The clock signal of FIG. 25C is again inverted by NOR gates 316, FIG. 25D, and provided to the $\overline{WE}$ line of circuit 76, (FIG. 7), as the signal of FIG. 8C. The reset input of counter 182 is also deasserted allowing the fill clock signal of FIG. 25C to increment counter 182 when a logic "0" is provided through the feed through mode (FTM) input of control circuit 168 to the first input of NOR gate 278. Counter 182, in turn, provides 512 binary addresses to RAM 332 allowing the key word, FIG. 25B, provided by loader 276 to be written into RAM 78.

Step 400 sets multiplexer 262 to test for the absence of a loader that is the Q5 input of circuit 262 is at a logic "1" state. Nonvolatile memory system 36 will not proceed beyond step 368 to step 370 until the sense in one (S11) line to nonvolatile memory sequence control circuit 75 is high. During the step 404 counter 186 and counter 230 are reset and the VARREQ output or line of nonvolatile memory sequence control circuit 75 is set at a logic "1". During step 406 latch 210 is set with a binary count of 175. Step 408 sets the NOVS output of control circuit 168 at a logic "0", FIG. 29E, resulting in a logic "0", FIG. 29F to the $\overline{NE}$ input of RAM 78. When the $\overline{NE}$ input to RAM 78 goes low for approximately 120 nanoseconds the entire contents of the RAM array will be stored within EEPROM of RAM 78. This operation takes approximately 5 milliseconds necessitating that counter 230 be incremented to a binary count of 175 (steps 410 and 412) which makes the binary count of counter 230 equal to the binary count in latch 210. This generates a logic "0" at the output of comparator 250 which when processed through multiplexer 262 and control circuit 168 will load a new address into counter 140.

If a loader is not present the nonvolatile memory system 36 proceeds to step 358 which prepares nonvolatile memory system 36 to down load the contents i.e. key word into encryption device 288. During step 362 a logic "0" is applied to NOR gate 294, (FIG. 23), resulting in the fill clock out clock signal of FIG. 26(C) being provided through the FILLCLKO output of control circuit 168 to the clock input of flip-flop 286 which provides for a logic "0" at the Q output of flip-flop 286. Counter 140 is also reset.

Figure 26A:
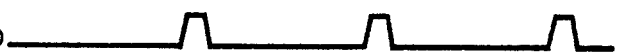
FIGS. 26A to 26C is a graphic illustration of the fill clock out clock signal provided by the control circuit of FIG. 23.
Figure 26B:
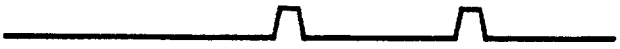
Figure 26C:
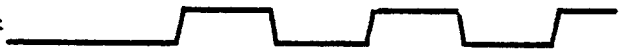
Figure 23A:
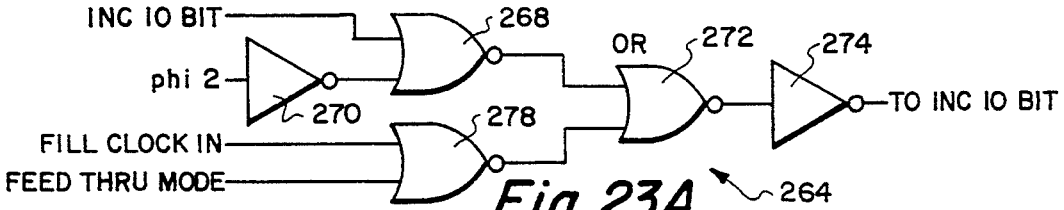
FIG. 23 is a circuit diagram of the control circuit of the present invention.
Figure 23B:
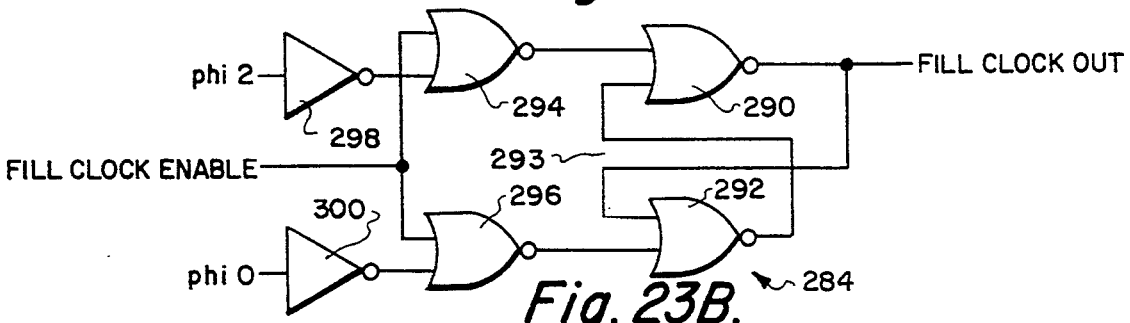
Figure 23C:
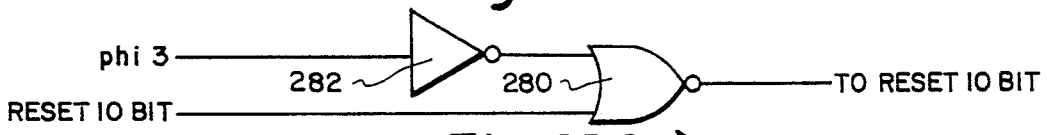
Figure 23D:
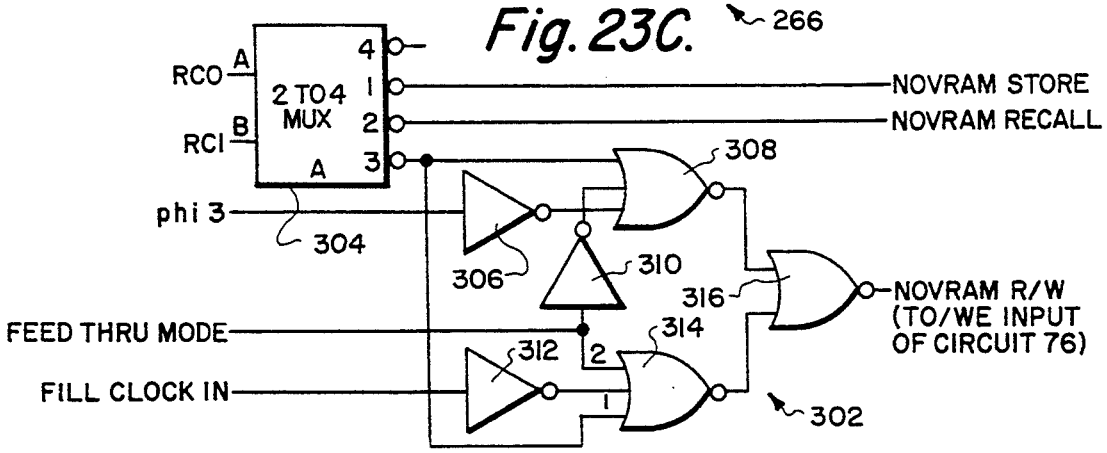
Figure 23E:
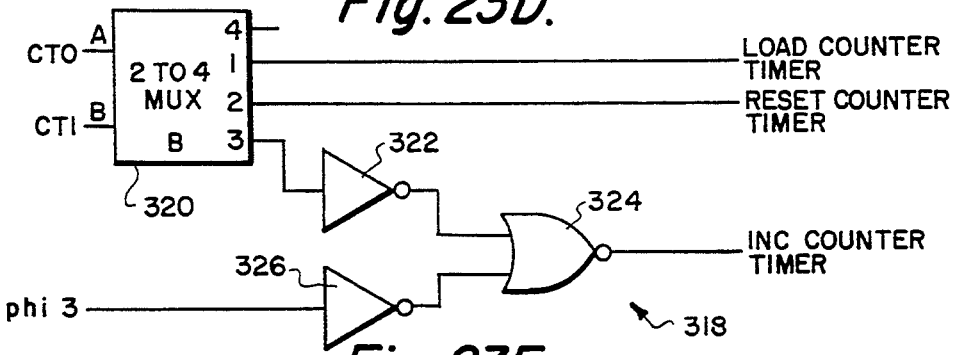
Figure 23F:
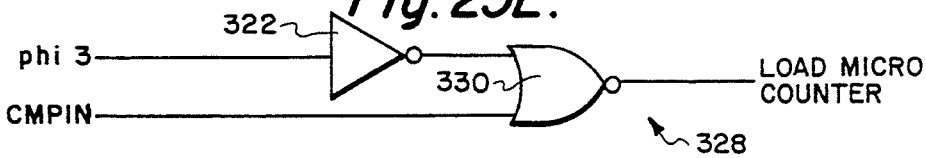

During step 364 a logic "1" is applied to NOR gate 294, (FIG. 23), disabling the fill clock out clock signal of FIG. 26C. Multiplexer circuit 262 is set to test for a logic "0" at the Q5 input of circuit 262. A logic "0" at the Q5 input of circuit 262 indicates that an encryption circuit 88 is not to receive digital data from RAM 78. If an encryption circuit 288 is not present the nonvolatile memory system 36 will proceed to a power down state (step 368). If an encryption circuit 88 is present the nonvolatile memory system 36 will proceed to step 370.

During step 370 demultiplexer circuit 262 is set to test for a logic "0" at the Q3 input of circuit 262. A logic "0" provided by the VARREQ output of encryption device 288 to the Q3 input of circuit 262, in turn, indicates that the encryption device 288 is ready to receive a key word, i.e. the data bits stored in RAM 78. Step 374 loads latch 210 with a binary count of 255 and resets counter 182.

During step 376 a logic "0" is applied to NOR gate 294, (FIG. 23), resulting in the fill clock out clock signal of FIG. 26C being provided through the FILLCLKO output of control circuit 168 to the clock input of flip-flop 286. Each clock pulse of the fill clock out clock signal of FIG. 26C, in turn, clocks a data bit from RAM 78 through negative edge triggered D type flip-flop 286 to the data input of encryption circuit 288. During steps 378 through 382 a key word i.e. a 256 bit digital word stored in RAM 78 is transferred from RAM 78 through flip-flop 286 to encryption circuit 288. When counter 230 reaches a binary count of 255 thereby having a binary count equal to the binary count stored in latch 208 a logic "0" is provided at the output of comparator 250 indicating the completion of the transfer of a key word to encryption device 288 (step 384).

During step 386 multiplexer circuit 262 sets a test for a logic "0" at the Q4 input circuit 262. A logic "0" at the Q4 input of circuit 262 (step 388) indicates that erase memory push button 70 has been depressed which initiates an erase procedure (step 390) within nonvolatile memory system 36. This erase procedure, in turn avoids detection of the digital or key word previously stored in RAM 78.

Step 392 sets latch 210 at a binary value of four, sets the output of demultiplexer 334 at a logic "1" state and resets counter 182. During step 395, NOVRAM control circuit 302, (FIG. 23), is enabled so as to provide the logic signal of FIG. 8C to the $\overline{WE}$ input nonvolatile static RAM interface circuit 76. Multiplexer 262 is set to test for a logic "0" at the Q1 input thereof which would indicate that 1024 bits or logic ones have been written into RAM 78. When the carry output of counter 182 goes to a logic "0" state (step 397) indicating 1024 bits have been written into RAM 78 nonvolatile memory system 36 proceeds to step 398 during which the $\overline{NE}$ input to RAM 78 is set at a logic "0" state which transfers the contents of the RAM array of RAM 78 into the nonvolatile EEPROM of RAM 78. During step 399 counter 182 is also reset. During step 401 the $\overline{NE}$ input of RAM 78 is set at a logic "1" state and multiplexer 262 is set to test for a logic "0" at the Q1 input thereof which would indicate that the timeout procedure of approximately five milliseconds has been completed, that is, the ones in the RAM array of RAM 78 have been written into EEPROM of RAM 78. When 1024 bits have been written into the EEPROM array of RAM 78 the carry output of counter 182 goes to a logic "0" state (step 403). When 1024 bits have been written into the EEPROM of RAM 78 the timeout procedure is completed and the carry output of counter 182 goes to a logic "0" state (step 403). During step 405 counter 230 is incremented by a binary count of "1" and counter 182 is reset. When steps 394–404 have been repeated four times (step 407), nonvolatile memory system 36 proceeds to step 409.

During steps 408–424 of the erasure procedure logic zeros are written into RAM 78. Step 411 sets latch 210 at a binary value of four, sets the output of demultiplexer 334 at a logic "0" state and resets counter 182. During step 413, NOVRAM control circuit 302, (FIG. 23), is enabled so as to provide the logic signal of FIG. 8C to the $\overline{WE}$ input nonvolatile static RAM interface circuit 76. Multiplexer 262 is set to test for a logic "0" at the Q1 input thereof which would indicate that 1024 bits or logic zeros have been written into RAM 78. When the carry output of counter 182 goes to a logic "0" state (step 414) indicating 1024 bits have been written into RAM 78 nonvolatile memory system 36 proceeds to step 416 during which the $\overline{NE}$ input to RAM 78 is set at a logic "0" state which transfers the contents of the RAM array of RAM 78 into the nonvolatile EEPROM of RAM 78. During step 416 counter 182 is also reset. During step 418 the $\overline{NE}$ input of RAM 78 is set at a logic "1" state and multiplexer 262 is set to test for a logic "0" at the Q1 input thereof which would indicate that the timeout procedure of approximately five milliseconds has been completed, that is the zeros in the RAM array of RAM 78 have been written into EEPROM of RAM 78. When 1024 bits have been written into the EEPROM array of RAM 78 the timeout procedure is completed and the carry output of counter 182 goes to a logic "0" state (step 420). During step 422 counter 230 is incremented by a binary count of "1" and counter 182 is reset. When steps 412–424 have been repeated four times (step 424), nonvolatile memory system 36 proceeds to step 426.

During steps 426–444 of the erasure procedure logic ones and zeros are alternately written into RAM 78. Step 428 sets latch 210 at a binary value of four and resets counter 182. During step 430 the output of demultiplexer 334 is set at a logic "1" state, NOVRAM control circuit 302, (FIG. 23), is enabled so as to provide the logic signal of FIG. 8C to the $\overline{WE}$ input nonvolatile static RAM interface circuit 76 and counter 182 is incremented which results in a logic "1" being written into RAM 78. During step 432 the output of demultiplexer 334 is set at a logic "0" state, NOVRAM control circuit 302, (FIG. 23), is enabled so as to provide the logic signal of FIG. 8C to the $\overline{WE}$ input of nonvolatile static RAM interface circuit 76 and counter 182 is incremented which results in a logic "0" being written into RAM 78. Multiplexer 262 is also set to test for a logic "0" at the Q1 input thereof which would indicate that 1024 bits of alternately logic ones and zeros have been written into the RAM array of RAM 78. When the carry output of counter 182 goes to a logic "0" state (step 434) indicating 1024 bits have been written into RAM 78 nonvolatile memory system 36 proceeds to step 436 during which the $\overline{NE}$ input to RAM 78 is set at a logic "0" state which transfers the contents of the RAM array of RAM 78 into the nonvolatile EEPROM of RAM 78. During step 436 counter 182 is also reset.

During step 438 the $\overline{NE}$ input of RAM 78 is set at a logic "1" state and multiplexer 262 is set to test for a logic "0" at the Q1 input thereof which would indicate that the timeout procedure of approximately five milliseconds has been completed, that is the ones and zeros in the RAM array of RAM 78 have been written into EEPROM of RAM 78. When 1024 bits have been written into the EEPROM array of RAM 78 the timeout procedure is complete and the carry output of counter 182 goes to a logic "0" state (step 420). During step 442 counter 230 is incremented by a binary count of "1" and counter 182 is reset. When steps 430–442 have been repeated four times (step 444), nonvolatile memory system 36 proceeds to step 446.

During steps 446–464 of the erasure procedure logic zeros and ones are alternately written into RAM 78. Step 448 sets latch 210 at a binary value of four and resets counter 182. During step 450 the output of demultiplexer 334 is set at a logic "1" state, NOVRAM control circuit 302, (FIG. 23), is enabled so as to provide the logic signal of FIG. 8C to the $\overline{WE}$ input of nonvolatile static RAM interface circuit 76 and counter 182 is incremented which results in a logic "1" being written into RAM 78. During step 452 the output of demultiplexer 334 is set at a logic "0" state, NOVRAM control circuit 302, (FIG. 23), is enabled so as to provide the logic signal of FIG. 8C to the $\overline{WE}$ input of nonvolatile static RAM interface circuit 76 and counter 182 is incremented which results in a logic "0" being written into RAM 78. Multiplexer 262 is also set to test for a logic "0" at the Q1 input thereof which would indicate that 1024 bits of alternately logic zeros and ones have been written into the RAM array of RAM 78. When the carry output of counter 182 goes into a logic "0" state (step 434) indicating 1024 bits have been written into RAM 78 nonvolatile memory system 36 proceeds to step 456 during which the $\overline{NE}$ input to RAM 78 is set at a logic "0" state which transfers the contents of the RAM array of RAM 78 into the nonvolatile EEPROM of RAM 78. During step 456 counter 182 is also reset. During step 458 the $\overline{NE}$ input of RAM 78 is set at a logic "1" state and multiplexer 262 is set to test for a logic "0" at the Q1 input thereof which would indicate that the timeout procedure of approximately five milliseconds has been completed, that is the zeros and ones in the RAM array of RAM 78 have been written into EEPROM of RAM 78. When 1024 bits have been written into the EEPROM array of RAM 78 the timeout procedure is complete and the carry output of counter 182 goes to a logic "0" state (step 460). During step 462 counter 230 is incremented by a binary count of "1" and counter 182 is reset. When steps 450–462 have been repeated four times (steps 464), nonvolatile memory system 36 proceeds to step 446.

When the erasure procedure for nonvolatile memory system 36 is complete (step 464) or whenever an encryption circuit 288 is not present the nonvolatile memory system 36 will proceed to a power down state (step 368). During step 466 latch 210 is set with a binary count of zero, counter 182 is reset, and logic zeros are provided to the CT0, CT1, RT0 and RT1 inputs of control circuit 168 so as to disable NOVRAM control circuit 302 and counter-timer control circuit 318. During step 468 the output of demultiplexer 334 is set at a logic "0" state, counter 230 is reset, the VARREQ output of nonvolatile memory sequence control circuit 75 is set at a logic "1" state, the sense out (SO) output is set at a logic "0" state and the feed through mode is set at a logic "1" state disabling the feed through mode. In addition, during step 468 the power down (PD) output of nonvolatile memory sequence control circuit 75 is set at the active or logic "1" state. This, in turn, causes the enable output of power control circuit 41 to go to a logic "1" causing EPROM 332 and RAM 78 to go to a power down state and the reset output of power control circuit 41 to go to a logic "0" state disabling nonvolatile memory sequence control circuit 75. The system clock 35 remains active however the remaining components of nonvolatile memory system remain in an inactive state i.e. do not consume operating power until source 54 cycles below the 4.5 volt threshold and then back to above 4.5 volts, thus indicating a reset, or power cycle, operation.

In the best mode presently contemplated for the present invention, a suitable software listing for EPROM 332 is provided. The operations discussed above are executed in accordance with microsteps 1 through 119.

NONVOLATILE MEMORY SYSTEM PROGRAM LISTING

| | PHI 0 | | | | | | | | PHI 1 | | | | | | | |
|---|---|---|---|---|---|---|---|---|---|---|---|---|---|---|---|---|
| | D7 COMPARE S2 | D6 COMPARE S1 | D5 COMPARE S0 | D4 ROUT S1 | D3 ROUT S0 | D2 VARREQ OUT | D1 SENSE OUT | D0 POWER OUT | D7 ADD9/ CNT7 | D6 ADD8/ CNT6 | D5 ADD7/ CNT5 | D4 ADD6/ CNT4 | D3 ADD5/ CNT3 | D2 ADD4/ CNT2 | D1 ADD3/ CNT1 | D0 ADD2/ CNT0 |
| | 000 = JUMP<br>001 = COUT<br>010 = CNT A = B<br>011 = VARREQ IN<br>100 = ERASE IN<br>101 = SENSE IN2<br>110 = SENSE IN1<br>111 = CONTINUE | | | 00 = '0'<br>01 = DIN<br>10 = NOP<br>11 = '1' | | ACTIVE LOW | ACTIVE HIGH | ACTIVE HIGH | THE ABOVE DATA IS EITHER THE JUMP ADDRESS TO A LOCATION IN MICROCODE OR A COUNTER TIMER REGISTER VALUE DEPENDING ON THE JUMP COMPARE VALUE (PHI 0, D7–D5) OR COUNTER TIMER SELECT BITS (PHI 2 D1–D0), RESPECTIVELY. | | | | | | | |
| MICRO STEP | | | | | | | | | | | | | | | | |
| 1 | 1 | 1 | 1 | 1 | 0 | 1 | 0 | 0 | 0 | 0 | 0 | 0 | 0 | 0 | 0 | 0 |
| 2 | 1 | 1 | 0 | 1 | 0 | 1 | 0 | 0 | 0 | 0 | 0 | 0 | 1 | 1 | 1 | 1 |
| 3 | 1 | 1 | 1 | 1 | 0 | 1 | 0 | 0 | 0 | 0 | 0 | 0 | 0 | 0 | 0 | 0 |
| 4 | 1 | 1 | 1 | 1 | 0 | 1 | 1 | 0 | 0 | 0 | 0 | 0 | 0 | 0 | 0 | 0 |
| 5 | 1 | 0 | 1 | 1 | 0 | 1 | 1 | 0 | 0 | 1 | 0 | 1 | 0 | 1 | 1 | 1 |
| 6 | 0 | 1 | 1 | 1 | 0 | 1 | 1 | 0 | 0 | 0 | 0 | 0 | 0 | 1 | 1 | 0 |
| 7 | 0 | 0 | 0 | 1 | 0 | 1 | 1 | 0 | 0 | 0 | 0 | 0 | 0 | 0 | 1 | 1 |
| 8 | 0 | 0 | 0 | 1 | 0 | 1 | 1 | 0 | 0 | 0 | 0 | 0 | 0 | 0 | 0 | 0 |
| 9 | 1 | 1 | 1 | 1 | 0 | 1 | 1 | 0 | 1 | 1 | 1 | 1 | 1 | 1 | 1 | 1 |
| 10 | 1 | 1 | 1 | 1 | 0 | 1 | 1 | 0 | 0 | 0 | 0 | 0 | 0 | 0 | 0 | 0 |
| 11 | 1 | 1 | 1 | 1 | 0 | 1 | 1 | 0 | 0 | 0 | 0 | 0 | 0 | 0 | 0 | 0 |
| 12 | 1 | 1 | 1 | 1 | 0 | 1 | 1 | 0 | 0 | 0 | 0 | 0 | 0 | 0 | 0 | 0 |
| 13 | 0 | 1 | 0 | 1 | 0 | 1 | 1 | 0 | 0 | 0 | 0 | 0 | 1 | 1 | 0 | 0 |
| 14 | 0 | 0 | 0 | 1 | 0 | 1 | 1 | 0 | 0 | 0 | 0 | 0 | 1 | 0 | 0 | 1 |
| 15 | 0 | 0 | 0 | 1 | 0 | 1 | 0 | 0 | 0 | 0 | 0 | 0 | 0 | 0 | 0 | 0 |
| 16 | 0 | 0 | 0 | 1 | 0 | 1 | 0 | 0 | 0 | 0 | 0 | 0 | 0 | 0 | 0 | 0 |
| 17 | 1 | 0 | 0 | 1 | 0 | 1 | 0 | 0 | 0 | 0 | 0 | 1 | 1 | 0 | 1 | 1 |
| 18 | 0 | 0 | 0 | 1 | 0 | 1 | 0 | 0 | 0 | 0 | 0 | 0 | 1 | 1 | 0 | 0 |
| 19 | 0 | 0 | 0 | 1 | 0 | 1 | 0 | 0 | 0 | 0 | 0 | 0 | 0 | 0 | 0 | 0 |
| 20 | 0 | 0 | 0 | 1 | 0 | 1 | 0 | 0 | 0 | 0 | 0 | 0 | 0 | 0 | 0 | 0 |
| 21 | 1 | 1 | 1 | 0 | 1 | 0 | 0 | 0 | 0 | 0 | 0 | 0 | 0 | 0 | 0 | 0 |
| 22 | 1 | 1 | 1 | 0 | 1 | 0 | 0 | 0 | 0 | 0 | 0 | 0 | 0 | 0 | 0 | 0 |
| 23 | 1 | 1 | 1 | 0 | 1 | 0 | 0 | 0 | 0 | 0 | 0 | 0 | 0 | 0 | 0 | 0 |
| 24 | 1 | 1 | 1 | 0 | 1 | 0 | 0 | 0 | 0 | 0 | 0 | 0 | 0 | 0 | 0 | 0 |
| 25 | 1 | 1 | 0 | 0 | 1 | 0 | 0 | 0 | 0 | 0 | 0 | 1 | 0 | 0 | 1 | 0 |
| 26 | 0 | 0 | 0 | 0 | 1 | 0 | 0 | 0 | 0 | 0 | 0 | 1 | 0 | 1 | 0 | 1 |
| 27 | 0 | 0 | 0 | 1 | 0 | 1 | 0 | 0 | 0 | 0 | 0 | 0 | 0 | 0 | 0 | 0 |
| 28 | 0 | 0 | 0 | 1 | 0 | 1 | 0 | 0 | 0 | 0 | 0 | 0 | 0 | 0 | 0 | 0 |
| 29 | 1 | 1 | 1 | 1 | 0 | 1 | 0 | 0 | 0 | 0 | 0 | 0 | 0 | 0 | 0 | 0 |
| 30 | 1 | 1 | 1 | 1 | 0 | 1 | 0 | 0 | 0 | 1 | 0 | 1 | 0 | 1 | 1 | 1 |
| 31 | 1 | 1 | 1 | 1 | 0 | 1 | 0 | 0 | 0 | 0 | 0 | 0 | 0 | 0 | 0 | 0 |
| 32 | 1 | 1 | 1 | 1 | 0 | 1 | 0 | 0 | 0 | 0 | 0 | 0 | 0 | 0 | 0 | 0 |
| 33 | 0 | 1 | 0 | 1 | 0 | 1 | 0 | 0 | 0 | 0 | 0 | 0 | 0 | 0 | 0 | 0 |
| 34 | 0 | 0 | 0 | 1 | 0 | 1 | 0 | 0 | 0 | 0 | 0 | 1 | 1 | 0 | 0 | 0 |
| 35 | 0 | 0 | 0 | 1 | 0 | 1 | 0 | 0 | 0 | 0 | 0 | 0 | 0 | 0 | 0 | 0 |
| 36 | 0 | 0 | 0 | 1 | 0 | 1 | 0 | 0 | 0 | 0 | 0 | 0 | 0 | 0 | 0 | 0 |
| 37 | 1 | 1 | 1 | 1 | 1 | 1 | 0 | 0 | 0 | 0 | 0 | 0 | 0 | 1 | 0 | 0 |
| 38 | 1 | 1 | 1 | 1 | 1 | 1 | 0 | 0 | 0 | 0 | 0 | 0 | 0 | 0 | 0 | 0 |
| 39 | 1 | 1 | 1 | 1 | 1 | 1 | 0 | 0 | 0 | 0 | 0 | 0 | 0 | 0 | 0 | 0 |

-continued

| | | | | | | | | | | | | | | | | |
|---|---|---|---|---|---|---|---|---|---|---|---|---|---|---|---|---|
| 40 | 1 | 1 | 1 | 1 | 1 | 1 | 0 | 0 | 0 | 0 | 0 | 0 | 0 | 0 | 0 | 0 |
| 41 | 0 | 1 | 0 | 1 | 1 | 1 | 0 | 0 | 0 | 0 | 1 | 0 | 0 | 0 | 0 | 1 |
| 42 | 0 | 0 | 0 | 1 | 1 | 1 | 0 | 0 | 0 | 0 | 0 | 1 | 1 | 1 | 1 | 0 |
| 43 | 0 | 0 | 0 | 1 | 0 | 1 | 0 | 0 | 0 | 0 | 0 | 0 | 0 | 0 | 0 | 0 |
| 44 | 0 | 0 | 0 | 1 | 0 | 1 | 0 | 0 | 0 | 0 | 0 | 0 | 0 | 0 | 0 | 0 |
| 45 | 1 | 1 | 1 | 1 | 0 | 1 | 0 | 0 | 0 | 0 | 0 | 0 | 0 | 0 | 0 | 0 |
| 46 | 1 | 1 | 1 | 1 | 0 | 1 | 0 | 0 | 0 | 0 | 0 | 0 | 0 | 0 | 0 | 0 |
| 47 | 1 | 1 | 1 | 1 | 0 | 1 | 0 | 0 | 0 | 0 | 0 | 0 | 0 | 0 | 0 | 0 |
| 48 | 1 | 1 | 1 | 1 | 0 | 1 | 0 | 0 | 0 | 0 | 0 | 0 | 0 | 0 | 0 | 0 |
| 49 | 0 | 1 | 0 | 1 | 0 | 1 | 0 | 0 | 0 | 0 | 1 | 0 | 0 | 1 | 1 | 1 |
| 50 | 0 | 0 | 0 | 1 | 0 | 1 | 0 | 0 | 0 | 0 | 1 | 0 | 0 | 1 | 0 | 0 |
| 51 | 0 | 0 | 0 | 1 | 0 | 1 | 0 | 0 | 0 | 0 | 0 | 0 | 0 | 0 | 0 | 0 |
| 52 | 0 | 0 | 0 | 1 | 0 | 1 | 0 | 0 | 0 | 0 | 0 | 0 | 0 | 0 | 0 | 0 |
| 53 | 1 | 1 | 1 | 1 | 0 | 1 | 0 | 0 | 0 | 0 | 0 | 0 | 0 | 0 | 0 | 0 |
| 54 | 0 | 1 | 0 | 1 | 0 | 1 | 0 | 0 | 0 | 0 | 1 | 0 | 1 | 0 | 1 | 0 |
| 55 | 0 | 0 | 0 | 1 | 1 | 1 | 0 | 0 | 0 | 0 | 0 | 1 | 1 | 1 | 1 | 0 |
| 56 | 0 | 0 | 0 | 1 | 0 | 1 | 0 | 0 | 0 | 0 | 0 | 0 | 0 | 0 | 0 | 0 |
| 57 | 1 | 1 | 1 | 0 | 0 | 1 | 0 | 0 | 0 | 0 | 0 | 0 | 0 | 1 | 0 | 0 |
| 58 | 1 | 1 | 1 | 0 | 0 | 1 | 0 | 0 | 0 | 0 | 0 | 0 | 0 | 0 | 0 | 0 |
| 59 | 1 | 1 | 1 | 0 | 0 | 1 | 0 | 0 | 0 | 0 | 0 | 0 | 0 | 0 | 0 | 0 |
| 60 | 1 | 1 | 1 | 0 | 0 | 1 | 0 | 0 | 0 | 0 | 0 | 0 | 0 | 0 | 0 | 0 |
| 61 | 0 | 1 | 0 | 0 | 0 | 1 | 0 | 0 | 0 | 0 | 1 | 1 | 0 | 0 | 0 | 0 |
| 62 | 0 | 0 | 0 | 0 | 0 | 1 | 0 | 0 | 0 | 0 | 1 | 0 | 1 | 1 | 0 | 1 |
| 63 | 0 | 0 | 0 | 1 | 0 | 1 | 0 | 0 | 0 | 0 | 0 | 0 | 0 | 0 | 0 | 0 |
| 64 | 0 | 0 | 0 | 1 | 0 | 1 | 0 | 0 | 0 | 0 | 0 | 0 | 0 | 0 | 0 | 0 |
| 65 | 1 | 1 | 1 | 1 | 0 | 1 | 0 | 0 | 0 | 0 | 0 | 0 | 0 | 0 | 0 | 0 |
| 66 | 1 | 1 | 1 | 1 | 0 | 1 | 0 | 0 | 0 | 0 | 0 | 0 | 0 | 0 | 0 | 0 |
| 67 | 1 | 1 | 1 | 1 | 0 | 1 | 0 | 0 | 0 | 0 | 0 | 0 | 0 | 0 | 0 | 0 |
| 68 | 1 | 1 | 1 | 1 | 0 | 1 | 0 | 0 | 0 | 0 | 0 | 0 | 0 | 0 | 0 | 0 |
| 69 | 0 | 1 | 0 | 1 | 0 | 1 | 0 | 0 | 0 | 0 | 1 | 1 | 0 | 1 | 1 | 0 |
| 70 | 0 | 0 | 0 | 1 | 0 | 1 | 0 | 0 | 0 | 0 | 1 | 1 | 0 | 0 | 1 | 1 |
| 71 | 0 | 0 | 0 | 1 | 0 | 1 | 0 | 0 | 0 | 0 | 0 | 0 | 0 | 0 | 0 | 0 |
| 72 | 0 | 0 | 0 | 1 | 0 | 1 | 0 | 0 | 0 | 0 | 0 | 0 | 0 | 0 | 0 | 0 |
| 73 | 1 | 1 | 1 | 1 | 0 | 1 | 0 | 0 | 0 | 0 | 0 | 0 | 0 | 0 | 0 | 0 |
| 74 | 0 | 1 | 0 | 1 | 0 | 1 | 0 | 0 | 0 | 0 | 1 | 1 | 1 | 0 | 0 | 1 |
| 75 | 0 | 0 | 0 | 0 | 0 | 1 | 0 | 0 | 0 | 0 | 1 | 0 | 1 | 1 | 0 | 1 |
| 76 | 0 | 0 | 0 | 1 | 0 | 1 | 0 | 0 | 0 | 0 | 0 | 0 | 0 | 0 | 0 | 0 |
| 77 | 1 | 1 | 1 | 1 | 1 | 1 | 0 | 0 | 0 | 0 | 0 | 0 | 0 | 1 | 0 | 0 |
| 78 | 1 | 1 | 1 | 1 | 1 | 1 | 0 | 0 | 0 | 0 | 0 | 0 | 0 | 0 | 0 | 0 |
| 79 | 1 | 1 | 1 | 1 | 1 | 1 | 0 | 0 | 0 | 0 | 0 | 0 | 0 | 0 | 0 | 0 |
| 80 | 1 | 1 | 1 | 0 | 0 | 1 | 0 | 0 | 0 | 0 | 0 | 0 | 0 | 0 | 0 | 0 |
| 81 | 0 | 1 | 0 | 1 | 1 | 1 | 0 | 0 | 0 | 0 | 1 | 1 | 1 | 1 | 1 | 1 |
| 82 | 0 | 0 | 0 | 0 | 0 | 1 | 0 | 0 | 0 | 0 | 1 | 1 | 1 | 1 | 0 | 0 |
| 83 | 0 | 0 | 0 | 1 | 0 | 1 | 0 | 0 | 0 | 0 | 0 | 0 | 0 | 0 | 0 | 0 |
| 84 | 0 | 0 | 0 | 1 | 0 | 1 | 0 | 0 | 0 | 0 | 0 | 0 | 0 | 0 | 0 | 0 |
| 85 | 1 | 1 | 1 | 1 | 0 | 0 | 0 | 0 | 0 | 0 | 0 | 0 | 0 | 0 | 0 | 0 |
| 86 | 1 | 1 | 1 | 1 | 0 | 1 | 0 | 0 | 0 | 0 | 0 | 0 | 0 | 0 | 0 | 0 |
| 87 | 1 | 1 | 1 | 1 | 0 | 1 | 0 | 0 | 0 | 0 | 0 | 0 | 0 | 0 | 0 | 0 |
| 88 | 1 | 1 | 1 | 1 | 0 | 1 | 0 | 0 | 0 | 0 | 0 | 0 | 0 | 0 | 0 | 0 |
| 89 | 0 | 0 | 0 | 1 | 0 | 1 | 0 | 0 | 0 | 1 | 0 | 0 | 0 | 1 | 0 | 1 |
| 90 | 0 | 0 | 0 | 1 | 0 | 1 | 0 | 0 | 0 | 1 | 0 | 0 | 0 | 0 | 1 | 0 |
| 91 | 0 | 0 | 0 | 1 | 0 | 1 | 0 | 0 | 0 | 0 | 0 | 0 | 0 | 0 | 0 | 0 |
| 92 | 0 | 0 | 0 | 1 | 0 | 1 | 0 | 0 | 0 | 0 | 0 | 0 | 0 | 0 | 0 | 0 |

-continued

| | | | | | | | | | | | | | | | | |
|---|---|---|---|---|---|---|---|---|---|---|---|---|---|---|---|---|
| 93 | 1 | 1 | 1 | 1 | 0 | 1 | 0 | 0 | 0 | 0 | 0 | 0 | 0 | 0 | 0 | 0 |
| 94 | 0 | 1 | 0 | 1 | 0 | 1 | 0 | 0 | 0 | 1 | 0 | 0 | 1 | 0 | 0 | 0 |
| 95 | 0 | 0 | 0 | 1 | 0 | 1 | 0 | 0 | 0 | 0 | 1 | 1 | 1 | 1 | 0 | 0 |
| 96 | 0 | 0 | 0 | 1 | 0 | 1 | 0 | 0 | 0 | 0 | 0 | 0 | 0 | 0 | 0 | 0 |
| 97 | 1 | 1 | 1 | 0 | 0 | 1 | 0 | 0 | 0 | 0 | 0 | 0 | 0 | 1 | 0 | 0 |
| 98 | 1 | 1 | 1 | 0 | 0 | 1 | 0 | 0 | 0 | 0 | 0 | 0 | 0 | 0 | 0 | 0 |
| 99 | 1 | 1 | 1 | 0 | 0 | 1 | 0 | 0 | 0 | 0 | 0 | 0 | 0 | 0 | 0 | 0 |
| 100 | 1 | 1 | 1 | 1 | 1 | 1 | 0 | 0 | 0 | 0 | 0 | 0 | 0 | 0 | 0 | 0 |
| 101 | 0 | 1 | 0 | 0 | 0 | 1 | 0 | 0 | 0 | 1 | 0 | 0 | 1 | 1 | 1 | 0 |
| 102 | 0 | 0 | 0 | 1 | 1 | 1 | 0 | 0 | 0 | 1 | 0 | 0 | 1 | 0 | 1 | 1 |
| 103 | 0 | 0 | 0 | 1 | 0 | 1 | 0 | 0 | 0 | 0 | 0 | 0 | 0 | 0 | 0 | 0 |
| 104 | 0 | 0 | 0 | 1 | 0 | 1 | 0 | 0 | 0 | 0 | 0 | 0 | 0 | 0 | 0 | 0 |
| 105 | 1 | 1 | 1 | 1 | 0 | 1 | 0 | 0 | 0 | 0 | 0 | 0 | 0 | 0 | 0 | 0 |
| 106 | 1 | 1 | 1 | 1 | 0 | 1 | 0 | 0 | 0 | 0 | 0 | 0 | 0 | 0 | 0 | 0 |
| 107 | 1 | 1 | 1 | 1 | 0 | 1 | 0 | 0 | 0 | 0 | 0 | 0 | 0 | 0 | 0 | 0 |
| 108 | 1 | 1 | 1 | 1 | 0 | 1 | 0 | 0 | 0 | 0 | 0 | 0 | 0 | 0 | 0 | 0 |
| 109 | 0 | 1 | 0 | 1 | 0 | 1 | 0 | 0 | 0 | 1 | 0 | 1 | 0 | 1 | 0 | 0 |
| 110 | 0 | 0 | 0 | 1 | 0 | 1 | 0 | 0 | 0 | 1 | 0 | 1 | 0 | 0 | 0 | 1 |
| 111 | 0 | 0 | 0 | 1 | 0 | 1 | 0 | 0 | 0 | 0 | 0 | 0 | 0 | 0 | 0 | 0 |
| 112 | 0 | 0 | 0 | 1 | 0 | 1 | 0 | 0 | 0 | 0 | 0 | 0 | 0 | 0 | 0 | 0 |
| 113 | 1 | 1 | 1 | 1 | 0 | 1 | 0 | 0 | 0 | 0 | 0 | 0 | 0 | 0 | 0 | 0 |
| 114 | 0 | 1 | 0 | 1 | 0 | 1 | 0 | 0 | 0 | 1 | 0 | 1 | 0 | 1 | 1 | 1 |
| 115 | 0 | 0 | 0 | 1 | 0 | 1 | 0 | 0 | 0 | 1 | 0 | 0 | 1 | 0 | 1 | 1 |
| 116 | 0 | 0 | 0 | 1 | 0 | 1 | 0 | 0 | 0 | 0 | 0 | 0 | 0 | 0 | 0 | 0 |
| 117 | 1 | 1 | 1 | 1 | 0 | 1 | 0 | 0 | 0 | 0 | 0 | 0 | 0 | 0 | 0 | 0 |
| 118 | 1 | 1 | 1 | 0 | 0 | 1 | 0 | 0 | 0 | 0 | 0 | 0 | 0 | 0 | 0 | 0 |
| 119 | 0 | 0 | 0 | 0 | 0 | 1 | 0 | 1 | 0 | 1 | 0 | 1 | 0 | 1 | 1 | 1 |

NONVOLATILE MEMORY SYSTEM PROGRAM LISTING

| | PHI 2 | | | | | | | | |
|---|---|---|---|---|---|---|---|---|---|
| MICRO STEP | D7 FILE CLK EN ACTIVE LOW | D6 INC RAM CNT ACTIVE LOW | D5 RST RAM CNT ACTIVE LOW | D4 FEED THRU ACTIVE LOW | D3 NOVRAM SEL1 00 = NOP 01 = NOV STORE 10 = NOV RECALL 11 = R/W ENABLE | D2 NOVRAM SEL0 | D1 CNT/ TIMER 1 00 = NOP 01 = LOAD CNTTIMER 10 = RESET CNTTIMER 11 = INCR. CNTTIMER | D0 CNT/ TIMER 0 | COMMENTS |
| 1 | 1 | 1 | 0 | 1 | 0 | 0 | 0 | 0 | Initialize System |
| 2 | 1 | 1 | 1 | 1 | 0 | 0 | 0 | 0 | Jump on Sense IN1 to 21 |
| 3 | 0 | 1 | 0 | 1 | 0 | 0 | 0 | 0 | Setup D out<br>Reset RAM Cntr |
| 4 | 1 | 1 | 1 | 1 | 0 | 0 | 0 | 0 | Assert Sense Out |
| 5 | 1 | 1 | 1 | 1 | 0 | 0 | 0 | 0 | Is KGV-68 Present? No<br>Jump to 118 |
| 6 | 1 | 1 | 1 | 1 | 0 | 0 | 1 | 0 | Is Varreq In Low? Yes<br>Jump to 9 |
| 7 | 1 | 1 | 1 | 1 | 0 | 0 | 0 | 0 | No, Jump to Step 5 |
| 8 | 1 | 1 | 1 | 1 | 0 | 0 | 0 | 0 | Error State Jump to 1 |
| 9 | 1 | 1 | 1 | 1 | 0 | 0 | 0 | 1 | Load Cntr/Timer 255 |

-continued

| | | | | | | | | | |
|---|---|---|---|---|---|---|---|---|---|
| 10 | 0 | 0 | 1 | 1 | 0 | 0 | 0 | 0 | Down Load Data Bit |
| 11 | 0 | 0 | 1 | 1 | 0 | 0 | 1 | 1 | Inc Counter/Timer |
| 12 | 0 | 0 | 1 | 1 | 0 | 0 | 1 | 1 | Inc Counter/Timer |
| 13 | 0 | 0 | 1 | 1 | 0 | 0 | 1 | 1 | 256 Bits Down-Loaded? Yes, Go to 17 |
| 14 | 0 | 0 | 1 | 1 | 0 | 0 | 1 | 1 | Jump back to 13 |
| 15 | 1 | 1 | 1 | 1 | 0 | 0 | 0 | 0 | Error State Jump to 1 |
| 16 | 1 | 1 | 1 | 1 | 0 | 0 | 0 | 0 | Error State Jump to 1 |
| 17 | 1 | 1 | 0 | 1 | 0 | 0 | 1 | 0 | Reset Counters (If erase Step 37) Sense Out Low |
| 18 | 1 | 1 | 1 | 1 | 0 | 0 | 0 | 0 | Wait for Erase |
| 19 | 1 | 1 | 1 | 1 | 0 | 0 | 0 | 0 | Error State Jump to 1 |
| 20 | 1 | 1 | 1 | 1 | 0 | 0 | 0 | 0 | Error State Jump to 1 |
| 21 | 1 | 1 | 0 | 1 | 0 | 0 | 0 | 0 | Upload Keyword |
| 22 | 1 | 1 | 1 | 0 | 0 | 0 | 0 | 0 | Feed Thru Mode |
| 23 | 1 | 1 | 1 | 0 | 0 | 0 | 0 | 0 | Wait |
| 24 | 1 | 1 | 1 | 0 | 0 | 0 | 0 | 0 | Wait |
| 25 | 1 | 1 | 1 | 0 | 0 | 0 | 0 | 0 | Loader Removed? No Go to 25 |
| 26 | 1 | 1 | 1 | 0 | 0 | 0 | 0 | 0 | Yes, Go to 29 |
| 27 | 1 | 1 | 1 | 1 | 0 | 0 | 0 | 0 | Error, Go to 1 |
| 28 | 1 | 1 | 1 | 1 | 0 | 0 | 0 | 0 | Error, Go to 1 |
| 29 | 1 | 1 | 0 | 1 | 0 | 0 | 1 | 0 | Reset RAM Cntr Reset Cntr/Timer |
| 30 | 1 | 1 | 1 | 1 | 0 | 0 | 0 | 1 | Load Counter/Timer = 87 |
| 31 | 1 | 1 | 1 | 1 | 0 | 1 | 0 | 0 | NV Store Data |
| 32 | 1 | 1 | 1 | 1 | 0 | 0 | 0 | 0 | Deassert NV Store |
| 33 | 1 | 1 | 1 | 1 | 0 | 0 | 1 | 1 | Is Counter/Timer = 87 Yes, Go to 0 |
| 34 | 1 | 1 | 1 | 1 | 0 | 0 | 0 | 0 | No, Jump Back to 33 |
| 35 | 1 | 1 | 1 | 1 | 0 | 0 | 0 | 0 | Error Jump to 1 |
| 36 | 1 | 1 | 1 | 1 | 0 | 0 | 0 | 0 | Error Jump to 1 |
| 37 | 1 | 1 | 0 | 1 | 0 | 0 | 0 | 1 | Start Erase Keyword Load Counter/Timer = 4 |
| 38 | 1 | 1 | 0 | 1 | 0 | 0 | 0 | 1 | Reset Cntr/Timer |
| 39 | 1 | 0 | 1 | 1 | 1 | 1 | 0 | 0 | Start Write to NVRAM |
| 40 | 1 | 0 | 1 | 1 | 1 | 1 | 0 | 0 | Continue |
| 41 | 1 | 0 | 1 | 1 | 1 | 1 | 0 | 0 | All 1024 Bits Written? Yes, Jump to 45 |
| 42 | 1 | 0 | 1 | 1 | 1 | 1 | 0 | 0 | No, Jump Back to 41 |
| 43 | 1 | 1 | 1 | 1 | 0 | 0 | 0 | 0 | Error State, Go to 1 |
| 44 | 1 | 1 | 1 | 1 | 0 | 0 | 0 | 0 | Error State, Go to 1 |
| 45 | 1 | 1 | 0 | 1 | 0 | 1 | 0 | 1 | Enable NOV-Store Reset RAM Counter |
| 46 | 1 | 1 | 1 | 1 | 0 | 0 | 0 | 0 | Disable NOV-Store |
| 47 | 1 | 0 | 1 | 1 | 0 | 0 | 0 | 0 | Start Time Out Counting |
| 48 | 1 | 0 | 1 | 1 | 0 | 0 | 0 | 0 | Continue |
| 49 | 1 | 0 | 1 | 1 | 0 | 0 | 0 | 0 | Time Out Complete? Yes, Jump to 53 |
| 50 | 1 | 0 | 1 | 1 | 0 | 0 | 0 | 0 | Jump Back to 49 |
| 51 | 1 | 1 | 1 | 1 | 0 | 0 | 0 | 0 | Error, Go to 1 |
| 52 | 1 | 1 | 1 | 1 | 0 | 0 | 0 | 0 | Error, Go to 1 |
| 53 | 1 | 1 | 0 | 1 | 0 | 0 | 1 | 1 | Reset RAM Cntr |

-continued

| | | | | | | | | | |
|---|---|---|---|---|---|---|---|---|---|
| | | | | | | | | | Increment Cntr/Timer |
| 54 | 1 | 1 | 1 | 1 | 0 | 0 | 0 | 0 | Cntr/Timer = 4? |
| | | | | | | | | | Yes, Go to 57 |
| 55 | 1 | 0 | 1 | 1 | 1 | 1 | 0 | 0 | No, Go to 41 |
| 56 | 1 | 1 | 1 | 1 | 0 | 0 | 0 | 0 | Error, Go to 1 |
| 57 | 1 | 1 | 0 | 1 | 0 | 0 | 0 | 1 | Start Erase 0's |
| | | | | | | | | | Load Cntr/Timers = 4 |
| 58 | 1 | 1 | 1 | 1 | 0 | 0 | 1 | 0 | Reset Cntr/Timer |
| 59 | 1 | 0 | 1 | 1 | 1 | 1 | 0 | 0 | Start Writing 0's |
| 60 | 1 | 0 | 1 | 1 | 1 | 1 | 0 | 0 | Continue |
| 61 | 1 | 0 | 1 | 1 | 1 | 1 | 0 | 0 | All 1024 Bits Written? |
| | | | | | | | | | Yes, Jump to 65 |
| 62 | 1 | 0 | 1 | 1 | 1 | 1 | 0 | 0 | No, Jump to 61 |
| 63 | 1 | 1 | 1 | 1 | 0 | 0 | 0 | 0 | Error, Go to 1 |
| 64 | 1 | 1 | 1 | 1 | 0 | 0 | 0 | 0 | Error, Go to 1 |
| 65 | 1 | 1 | 0 | 1 | 0 | 1 | 0 | 0 | Enable NOV Store |
| | | | | | | | | | Reset RAM Counter |
| 66 | 1 | 1 | 1 | 1 | 0 | 0 | 0 | 0 | Disable NOV-Store |
| 67 | 1 | 0 | 1 | 1 | 0 | 0 | 0 | 0 | Start Store Time Out |
| 68 | 1 | 0 | 1 | 1 | 0 | 0 | 0 | 0 | Continue |
| 69 | 1 | 0 | 1 | 1 | 0 | 0 | 0 | 0 | Time out complete? |
| | | | | | | | | | Yes, Jump to 73 |
| 70 | 1 | 0 | 1 | 1 | 0 | 0 | 0 | 0 | No, Jump Back to 69 |
| 71 | 1 | 1 | 1 | 1 | 0 | 0 | 0 | 0 | Error, Go to 1 |
| 72 | 1 | 1 | 1 | 1 | 0 | 0 | 0 | 0 | Error, Go to 1 |
| 73 | 1 | 1 | 0 | 1 | 0 | 0 | 1 | 1 | Reset RAM Cntr |
| | | | | | | | | | Increment Counter/Timer |
| 74 | 1 | 1 | 1 | 1 | 0 | 0 | 0 | 0 | Cntr/Timer = 4 |
| | | | | | | | | | Yes, Go to 77 |
| 75 | 1 | 0 | 1 | 1 | 1 | 1 | 0 | 0 | No, Go to 61 |
| 76 | 1 | 1 | 1 | 1 | 0 | 0 | 0 | 0 | Error, Go to 1 |
| 77 | 1 | 1 | 0 | 1 | 0 | 0 | 0 | 1 | Start running 1's + 0's |
| | | | | | | | | | Load Counter/Timer = 4 |
| 78 | 1 | 1 | 1 | 1 | 0 | 0 | 1 | 0 | Reset Counter/Timer |
| 79 | 1 | 0 | 1 | 1 | 1 | 1 | 0 | 0 | Write a 1 |
| 80 | 1 | 0 | 1 | 1 | 1 | 1 | 0 | 0 | Write a 0 |
| 81 | 1 | 0 | 1 | 1 | 1 | 1 | 0 | 0 | All 1024 bits Written? |
| | | | | | | | | | Yes, Jump to 85 |
| 82 | 1 | 0 | 1 | 1 | 1 | 1 | 0 | 0 | No, Jump to 81 |
| 83 | 1 | 1 | 1 | 1 | 0 | 0 | 0 | 0 | Error, Go to 1 |
| 84 | 1 | 1 | 1 | 1 | 0 | 0 | 0 | 0 | Error, Go to 1 |
| 85 | 1 | 1 | 0 | 1 | 0 | 1 | 0 | 0 | Enable NOV Store |
| | | | | | | | | | Reset RAM Counter |
| 86 | 1 | 1 | 1 | 1 | 0 | 0 | 0 | 0 | Disable NOV Store |
| 87 | 1 | 1 | 1 | 1 | 0 | 0 | 0 | 0 | Start Store Time Out |
| 88 | 1 | 1 | 1 | 1 | 0 | 0 | 0 | 0 | Continue |
| 89 | 1 | 0 | 1 | 1 | 0 | 0 | 0 | 0 | Time out complete? |
| | | | | | | | | | Yes, Jump to 93 |
| 90 | 1 | 0 | 1 | 1 | 0 | 0 | 0 | 0 | No, Jump back to 89 |
| 91 | 1 | 1 | 1 | 1 | 0 | 0 | 0 | 0 | Error, Go to 1 |
| 92 | 1 | 1 | 1 | 1 | 0 | 0 | 0 | 0 | Error, Go to 1 |
| 93 | 1 | 1 | 0 | 1 | 0 | 0 | 1 | 1 | Reset RAM Counter |
| | | | | | | | | | Increment Counter/Timer |

-continued

| | | | | | | | | | |
|---|---|---|---|---|---|---|---|---|---|
| 94 | 1 | 1 | 1 | 1 | 0 | 0 | 0 | 0 | Counter/Timer = 4? Yes, Go to 97 |
| 95 | 1 | 1 | 1 | 1 | 0 | 0 | 0 | 0 | No, Go to 81 |
| 96 | 1 | 1 | 1 | 1 | 0 | 0 | 0 | 0 | Error, Go to 1 |
| 97 | 1 | 1 | 0 | 1 | 0 | 0 | 0 | 1 | Start running 0's + 1's Load Counter/Timer = 4 |
| 98 | 1 | 1 | 1 | 1 | 0 | 0 | 1 | 0 | Reset Counter/Timer |
| 99 | 1 | 0 | 1 | 1 | 1 | 1 | 0 | 0 | Write a 0 |
| 100 | 1 | 0 | 1 | 1 | 1 | 1 | 0 | 0 | Write a 1 |
| 101 | 1 | 0 | 1 | 1 | 1 | 1 | 0 | 0 | All 1024 bits Written Yes, Jump to 105 |
| 102 | 1 | 0 | 1 | 1 | 1 | 1 | 0 | 0 | No, Jump to 101 |
| 103 | 1 | 1 | 1 | 1 | 0 | 0 | 0 | 0 | Error, Go to 1 |
| 104 | 1 | 1 | 1 | 1 | 0 | 0 | 0 | 0 | Error, Go to 1 |
| 105 | 1 | 1 | 0 | 1 | 0 | 1 | 0 | 0 | Enable NOV-Store Reset RAM Counter |
| 106 | 1 | 1 | 1 | 1 | 0 | 0 | 0 | 0 | Disable NOV-Store |
| 107 | 1 | 0 | 1 | 1 | 0 | 0 | 0 | 0 | Start Store Time out |
| 108 | 1 | 0 | 1 | 1 | 0 | 0 | 0 | 0 | Continue |
| 109 | 1 | 0 | 1 | 1 | 0 | 0 | 0 | 0 | Time out complete? Yes, Jump to 113 |
| 110 | 1 | 0 | 1 | 1 | 0 | 0 | 0 | 0 | No, Jump back to 109 |
| 111 | 1 | 1 | 1 | 1 | 0 | 0 | 0 | 0 | Error, Go to 1 |
| 112 | 1 | 1 | 1 | 1 | 0 | 0 | 0 | 0 | Error, Go to 1 |
| 113 | 1 | 1 | 0 | 1 | 0 | 0 | 1 | 1 | Reset RAM Counter 0 Inc. Counter/Timer |
| 114 | 1 | 1 | 1 | 1 | 0 | 0 | 0 | 0 | Counter/Timer = 4 Yes, Go to 117 |
| 115 | 1 | 1 | 1 | 1 | 0 | 0 | 0 | 0 | No, Go to 101 |
| 116 | 1 | 1 | 1 | 1 | 0 | 0 | 0 | 0 | Error, Go to 1 |
| 117 | 1 | 1 | 0 | 1 | 0 | 0 | 0 | 1 | Start Power Down |
| 118 | 1 | 1 | 1 | 1 | 0 | 0 | 1 | 0 | Continue |
| 119 | 1 | 1 | 1 | 1 | 0 | 0 | 0 | 0 | Set Loop to 117 (Just in case) Power Down Complete. STOP |

What is claimed is:

1. A nonvolatile memory system for sensing the presence of an external loader device and then receiving a key word of up to 1024 digital data bits from said external loader device, for storing said key word therein for a period of time of up to three years and then transferring said key word to said encryption circuit, said nonvolatile memory system comprising:

erasable programmable read-only memory means for providing a plurality of program instructions, each of said program instructions being provided by said erasable programmable read-only memory means in response to a binary address supplied to said erasable programmable read-only memory means, said program instructions controlling a sequencing of operations within said nonvolatile memory system, each of said program instructions having at least eight digital data bits;

nonvolatile static digital data storage means for receiving said key word from said encryption circuit and storing said key word therein, said nonvolatile static digital data storage means having first and second data input/outputs, a write enable input and a nonvolatile enable input;

first address generating means for supplying each binary address to said erasable programmable read-only memory means;

second address generating means for supplying sequential binary addresses to said nonvolatile static digital data storage means, each sequential binary address supplied to said nonvolatile static digital data storage means selectively allowing said nonvolatile static digital data storage means to store therein two digital data bits of said key word from said external loader device or allowing two digital data bits of said key word to be retrieved from said nonvolatile static digital data storage means for transfer to said encryption circuit;

clock generating means for providing a system clock signal;

counter means for generating PHI0, PHI1, PHI2, PHI3 and PHI012 clock signals in response to the system clock signal being provided to said counter means by said clock generating means and for providing a first reset signal;

said first address generating means being incremented by the PHI012 clock signal generated by said counter means and being reset by the first reset signal provided by said counter means;

first, second, and third program instruction storage means for latching therein said plurality of program instructions provided by said erasable programmable read-only memory means, each of said program instructions being latched into said first, second and third program instruction storage means respectively by said PHI0, PHI1 and PHI2 clock signals;

said first program instruction storage means providing a power down signal, said power down signal setting said nonvolatile static digital data storage means at a power down standby state to allow for retention of said key word within said nonvolatile static digital data storage means for said period of time of up to three years;

multiplexer means for sensing the presence of said external loader device and if said external loader device is not present testing for the presence of said encryption circuit, said multiplexer means providing a first digital logic signal indicating the presence of said external loader device or the presence of said encryption circuit, said multiplexer means being enabled to sense for the presence of said external loader device by one of the plurality of program instructions latched within said first program instruction storage means and being selectively enabled to sense for the presence of said encryption circuit by another of the plurality of program instructions latched within said first program instruction storage means;

control circuit means for providing a parallel load signal to said first address generating means in response to the first digital logic signal provided by said multiplexer means, said parallel load signal effecting the parallel loading of the program instruction latched within said second program instruction storage means into said first address generating means, one of said plurality of program instructions when parallel loaded into said first address generating means initiating the transfer of the key word from said external loader device to said nonvolatile static digital data storage means and another of said plurality of program instructions when parallel loaded into said first address generating means initiating the transfer of the key word from said nonvolatile static digital data storage means to said encryption circuit;

said control circuit means providing a second reset signal for resetting said second address generating means and an increment second address generating means clock signal for incrementing said second address generating means so that said second address generating means provides said sequential binary addresses to said nonvolatile static digital data storage means;

said control circuit means providing a read/write digital logic signal to said nonvolatile static digital data storage means for controlling storage of said key word in said nonvolatile static digital data storage means and retrieval of said key word from said nonvolatile static digital data storage means;

demultiplexer means for effecting the transfer of said key word from said external loader device to said nonvolatile static digital data storage means, said demultiplexer means being enabled to effect the transfer of said key word from said external loader device to said nonvolatile static digital data storage means by one of the plurality of program instructions latched within said first program instruction storage means;

flip-flop means for effecting the transfer of said key word from said nonvolatile static digital data storage means to said encryption circuit; and said control circuit means providing an increment flip-flop means clock signal to effect the transfer of said key word from said nonvolatile static digital data storage means to said encryption circuit.

2. The nonvolatile memory system of claim 1 further comprising power control circuit means for generating an enable signal for enabling said erasable programmable read-only memory means, a third reset signal for resetting said counter means and a power up signal, said power up signal and said enable signal from said power control circuit means setting said nonvolatile static digital data storage means to a power up state to selectively allow for the storage of said key word within said nonvolatile static digital data storage means and the retrieval of said key word from said nonvolatile static digital data storage means.

3. The nonvolatile memory system of claim 2 wherein said power control circuit means comprises:

first and second D flip-flops, each of said first and second flip-flops having a data input, a clock input, a Q output, a not Q output, a preset input and a reset input;

the clock inputs of said first and second flip-flops receiving said system clock signal, the preset inputs of said first and second flip-flops being connected to a logic one signal;

a voltage sensing circuit having an output connected to the clear input of said first flip-flop and the clear input of said second flip-flop;

a first NAND gate having a first input connected to the not Q output of said first flip-flop, a second input connected to the not Q output of said second flip-flop, and an output connected to the data input of said first flip-flop;

a second NAND gate having a first input connected to the Q output of said first flip-flop, a second input connected to the Q output of said second flip-flop and an output;

a first inverter having an input for receiving said power down signal and an output;

a third NAND gate having a first input connected to the Q output of said first flip-flop, a second input connected to the output of said inverter and an output;

a fourth NAND gate having a first input connected to the output of said first NAND gate, a second input conneced to the output of said second NAND gate, a third input connected to the output of said third NAND gate and an output connected to the data input of said second flip-flop;

a fifth NAND gate having a first input for receiving said power down signal, a second input connected to the not Q output of said second flip-flop and an output;

a sixth NAND gate having a first input connected to the output of said fifth NAND gate, a second input connected to the Q output of said first flip-flop, a third input connected to said logic one signal and an output;

a seventh NAND gate having a first input connected to said logic one signal, a second input connected to the output of said sixth NAND gate, a third input connected to the output of said voltage sensing circuit and an output for providing said enable signal; and a second inverter having an input connected to the output of said seventh nand gate and an output for providing said third reset signal.

4. The nonvolatile memory system of claim 1 further comprising a nonvolatile static RAM interface circuit means, said nonvolatile static RAM interface circuit means serially recieing pairs of digital data bits of said key word, temporarily storing a first bit of each pair of digital data bits of said key word and then for each pair providing simultaneously the first and second digital data bits respectively to the first and second data input-/outputs of said nonvolatile static digital data storage means.

5. The nonvolatile memory system of claim 4 wherein said nonvolatile static RAM interface circuit means comprises:

first and second D flip-flops, each of said first and second flip-flops having a data input, a clock input, a Q output, and a clear input;

the clear and preset inputs of said first flip-flop and the clear input of said second flip-flop being connected to a logic one signal;

the clock input of said second flip-flop receiving said PHI3 clock signal;

the data input of said first flip-flop receiving the first bit of each pair of digital data bits of said key word;

the Q output of said second flip-flop connected to the nonvolatile enable input of said nonvolatile static digital data storage means;

a first NOR gate having a first input for receiving said read/write digital logic signal, a second input for receiving address bit zero from said second address generating means and an output connected to the clock input of said first flip-flop;

a first inverter having an input for receiving address bit zero from said second address generating means and an output;

a second NOR gate having a first input connected to the output of said first inverter, a second input for receiving said read/write digital logic signal and an output;

a third NOR gate having a first input connected to the Q output of said second flip-flop, a second input connected to ground and an output;

a fourth NOR gate having a first input connected to the output of said second NOR gate, a second input connected to the output of said third NOR gate and an output connected to the write enable input of said nonvolatile static digital data storage means;

a second inverter having an input connected to the output of said fourth NOR gate and an output connected to output enable input of said nonvolatile static digital data storage means;

a first tristate output buffer gate having a data input connected to the Q output of said first flip-flop, an enable input connected to the output of said fourth NOR gate and an output connected to the first data input/output of said nonvolatile digital data storage means;

a second tristate output buffer gate having a data input for receiving each digital data bit of said key word, an enable input connected to the output of said fourth NOR gate and an output connected to the second data input/output of said nonvolatile static digital data storage means;

a third tristate output buffer gate having an input connected to the first data input/output of said nonvolatile digital data storage means, an enable input for receiving address bit zero from said second address generating means and an output; and a fourth tristate output buffer gate having an input connected to the second data input/output of said nonvolatile static digital data storage means, an enable input connected to the output of said first inverter and an output connected to the output of said third tristate buffer.

6. The nonvolatile memory system of claim 1 wherein said counter means comprises:

a first inverter having an input for receiving said third reset signal and an output;

a first D flip-flop having a data input connected to a logic one signal, a clock input for receiving said system clock signal, a clear input connected to the output of said first inverter and a not Q output;

a second D flip-flop having a data input, a clock input for receiving said system clock signal, a clear input connected to the not Q output of said first flip-flop, a not Q output connected to the data input of said second D flip-flop and a Q output;

a third D flip-flop having a data input, a clock input connected to the Q output of said second flip-flop, a clear input connected to the not Q output of said first flip-flop, a not Q output connected to the data input of said third D flip-flop and a Q output;

a second inverter having an input connected to the not Q output of said first flip-flop and an output for providing said first reset signal;

a first NOR gate having a first input for receiving said system clock signal, a second input connected to the not Q output of said first flip-flop, a third input connected to the Q output of said second flip-flop, a fourth input connected to the Q output of said third flip-flop and an output for providing said PHI0 clock signal;

a second NOR gate having a first input for receiving said system clock signal, a second input connected to the not Q output of said second flip-flop, a third input connected to the not Q output of said third flip-flop and an output for providing said PHI1 clock signal;

a third NOR gate having a first input for receiving said system clock signal, a second input connected to the Q output of said second flip-flop, a third input connected to the not Q output of said third flip-flop and an output for providing said PHI2 clock signal;

a fourth NOR gate having a first input for receiving said system clock signal, a second input connected to the Q output of said second flip-flop, a third input connected to the Q output of said third flip-flop and an output for providing said PHI3 clock signal;

a fifth NOR gate having a first input connected to the not Q output of said first flip-flop, a second input for receiving said system clock signal, a third input and an output for providing said PHI012 clock signal;

a NAND gate having a first input for receiving said system clock signal, a second input connected to the Q output of said second flip-flop and an output; and a third inverter having an input connected to the output of said NAND gate and an output connected to the third input of said fifth NOR gate.

7. The nonvolatile memory system of claim 1 wherein said first address generating means comprises:

first through tenth negative edge triggered J K flip-flops, each of said J K flip-flops having a J input connected to a logic one signal, a K input connected to said logic one signal, a clock input, a preset input, a clear input and a Q output;

the clock input of said first J K flip-flop receiving said PHI012 clock signal;

the Q output of said first J K flip-flop being connected to the clock input of said second J K flip-flop, the Q output of said second J K flip-flop being connected to the clock input of said third J K flip-flop, the Q output of said third J K flip-flop being connected to the clock input of said fourth J K flip-flop, the Q output of said fourth J K flip-flop being connected to the clock input of said fifth J K flip-flop, the Q output of said fifth J K flip-flop being connected to the clock input of said sixth J K flip-flop, the Q output of said sixth J K flip-flop being connected to the clock input of said seventh J K flip-flop, the Q output of said seventh J K flip-flop being connected to the clock input of said eighth J K flip-flop, the Q output of said eighth J K flip-flop being connected to the clock input of said ninth J K flip-flop and the Q output of said ninth J K flip-flop being connected to the clock input of said tenth J K flip-flop;

first through tenth load circuits, each of said load circuits having a data input, a reset input for receiving said first reset signal, a load input for receiving said parallel load signal, a data input, a preset output and a clear output;

the data inputs of said first and second load circuits being connected to a logic zero and the data inputs of said third, fourth, fifth, sixth, seventh, eighth, ninth and tenth load circuits being respectively connected to first, second, third, fourth, fifth, sixth, seventh and eighth Q outputs of said second program instruction storage means;

the preset outputs of said first, second, third, fourth, fifth, sixth, seventh, eighth, ninth and tenth load circuits being respectively connected to the preset inputs of said first, second, third, fourth, fifth, sixth, seventh, eighth, ninth and tenth J K flip-flops; and the clear outputs of said first, second, third, fourth, fifth, sixth, seventh, eighth, ninth and tenth load circuits being respectively connected to the clear inputs of said first, second, third, fourth, fifth, sixth, seventh, eighth, ninth and tenth J K flip-flops.

8. The nonvolatile memory system of claim 7 wherein each of said load circuits comprises:

a first NAND gate having a first input for receiving said first reset signal, a second input and an output;

a second NAND gate having a first input for receiving said first reset signal, a second input and an output;

an inverter having an input for receiving said parallel load signal and an output connected to the second input of said second nand gate;

a third NAND gate having a first input connected to the output of said first NAND gate, a second input connected to the output of said second NAND gate and an output connected to the clear input of a respective one of said J K flip-flops; and a fourth NAND gate having a first input for receiving said parallel load signal, an output connected to the preset input of a respective one of said J K flip-flops and a second input;

the second inputs of the first and fourth NAND gates of said first and second load circuits being connected to said logic zero signal and the second inputs of the first and fourth NAND gates of said third, fourth, fifth, sixth, seventh, eighth, ninth and tenth load circuits being respectively connected to the first, second, third fourth, fifth, sixth, seventh and eighth Q outputs of said second program instruction storage means.

9. The nonvolatile memory system of claim 1 wherein each of said first, second and third program instruction storage means comprises eight negative edge triggered D flip-flops.

10. The nonvolatile memory system of claim 1 wherein said second address generating means comprises:

first through eleventh negative edge triggered J K flip-flops, each of said J K flip-flops having a J input connected to a logic one signal, a K input connected to said logic one signal, a preset input connected to said logic one signal, a clock input, a clear input and a Q output;

the clock input of said first J K flip-flop receiving said increment second address generating means clock signal;

the clear input of each of said J K flip-flops receiving said second reset signal;

the Q output of said first J K flip-flop being connected to the clock input of said second J K flip-flop, the Q output of said second J K flip-flop being connected to the clock input of said third J K flip-flop, the Q output of said third J K flip-flop being connected to the clock input of said fourth J K flip-flop, the Q output of said fourth J K flip-flop being connected to the clock input of said fifth J K flip-flop, the Q output of said fifth J K flip-flop being connected to the clock input of said sixth J K flip-flop, the Q output of said sixth J K flip-flop being connected to the clock input of said seventh J K flip-flop, the Q output of said seventh J K flip-flop being connected to the clock input of said eighth J K flip-flop, the Q output of said eighth J K flip-flop being connected to the clock input of said ninth J K flip-flop, the Q output of said ninth J K flip-flop being connected to the clock input of said tenth J K flip-flop and the Q output of said tenth J K flip-flop being connected to the clock input of said eleventh J K flip-flop.

11. The nonvolatile memory system of claim 1 wherein said flip-flop means comprises a negative edge triggered D type flip-flop.

12. The nonvolatile memory system of claim 1 wherein at least one of the program instructions latched within said third program instruction storage means when supplied to and decoded by said control circuit means will result in said control circuit means providing said read/write digital logic signal to said nonvolatile static digital data storage means.

13. A nonvolatile memory system for sensing the presence of an external loader device and then receiving a key word of up to 1024 digital data bits from said external loader device, for storing said key word therein for a period of time of up to three years and for sensing a presence of an encryption circuit and then transferring said key word to said encryption circuit, said nonvolatile memory system comprising:

erasable programmable read-only memory means for providing a plurality of program instructions, each of said program instructions being provided by said erasable programmable read-only memory in response to a binary address supplied to said erasable programmable read-only memory means, said program instructions controlling a sequencing of operations within said nonvolatile memory system, each of said program instructions having at least eight digital data bits;

nonvolatile static digital data storage means for receiving said key word from said encryption circuit and storing said key word therein, said nonvolatile static digital data storage means having first and second data input/outputs, a write enable input and a nonvolatile enable input;

first address generating means for supplying each binary address to said erasable programmable read-only memory means;

second address generating means for supplying 512 sequential binary addresses to said nonvolatile static digital data storage means, each sequential binary address supplied to said nonvolatile static digital data storage means selectively allowing said nonvolatile static digital data storage means to store therein two digital data bits of said key word from said external loader device or allowing two digital data bits of said key word to be retrieved from said nonvolatile static digital data storage means for transfer to said encryption circuit;

clock generating means for providing a system clock signal;

counter means for generating PHI0, PHI1, PHI2, PHI3 and PHI012 clock signals in response to the system clock signal being provided to said counter means by said clock generating means and for providing a first reset signal;

said first address generating means being incremented by the PHI012 clock signal generated by said counter means and being reset by the first reset signal provided by said counter means;

first, second, and third program instruction storage means for latching therein said plurality of program instructions provided by said erasable programmable read-only memory means, each of said program instructions being latched into said first, second and third program instruction storage means respectively by said PHI0, PHI1 and PHI2 clock signals;

said first program instruction storage means providing a power down signal, said power down signal setting said nonvolatile static digital data storage means at a power down standby state to allow for retention of said key word within said nonvolatile static digital data storage means for said period of time of up to three years;

multiplexer means for sensing the presence of said external loader device and if said loader device is not present testing for the presence of said encryption circuit, said multiplexer means providing a first digital logic signal indicating the presence of said external loader device or the presence of said encryption circuit, said multiplexer means being enabled to sense for the presence of said external loader device by one of the plurality of program instructions latched within said first program instruction storage means and being selectively enabled to sense for the presence of said encryption circuit by another of the plurality of program instructions latched within said first program instruction storage means;

control circuit means for providing a parallel load signal to said first address generating means in response to the first digital logic signal provided by said multiplexer means, said parallel load signal effecting the parallel loading of the program instruction latched within said second program instruction storage means into said first address generating means, one of said plurality of program instructions when parallel loaded into said first address generating means initiating the transfer of the key word from said external loader device to said nonvolatile static digital data storage means and another of said plurality of program instructions when parallel loaded into said first address generating means initiating the transfer of the key word from said nonvolatile static digital device storage means to said encryption circuit;

said control circuit means providing a second reset signal for resetting said second address generating means and an increment second address generating means clock signal for incrementing said second address generating means so that said second address generating means provides said 512 sequential binary addresses to said nonvolatile static digital data storage means;

said control circuit means providing a read/write digital logic signal to said nonvolatile static digital data storage means for controlling storage of said key word in said nonvolatile static digital data storage means and retrieval of said key word from said nonvolatile static digital data storage means;

demultiplexing means for effecting the transfer of said key word from said external loader device to said nonvolatile static digital data storage means, said demultiplexer means being enabled to effect the transfer of said key word from said external loader device to said nonvolatile static digital data storage means by one of the plurality of program instructions latched within said first program instruction storage means;

flip-flop means for effecting the transfer of said key word from said nonvolatile static digital data storage means to said encryption circuit;

said control circuit means providing an increment flip-flop means clock signal to effect the transfer of said key word from said nonvolatile static digital data storage means to said encryption circuit power control circuit means for generating an enable signal for enabling said erasable programmable read-only memory means, a third reset signal for resetting said counter means and a power up signal, said power up signal and said enable signal from said power control circuit means setting said nonvolatile static digital data storage means to a power up state to selectively allow for the storage of said key word within said nonvolatile static digital data storage means and the retrieval of said key word from said nonvolatile static digital data storage means; and nonvolatile static RAM interface circuit means, said nonvolatile static RAM interface circuit means serially receiving pairs of digital data bits of said key word, temporarily storing a first bit of each pair of digital data bits of said key word and then for each pair providing simultaneously the first and second digital data bits respectively to the first and second data input/outputs of said nonvolatile static digital data storage means.

14. The nonvolatile memory system of claim 13 wherein said power control circuit means comprises:

first and second D flip-flops, each of said first and second flip-flops having a data input, a clock input, a Q output, a not Q output, a preset input and a reset input;

the clock inputs of said first and second flip-flops receiving said system clock signal, the preset inputs of said first and second flip-flops being connected to a logic one signal;

a voltage sensing circuit having an output connected to the clear input of said first flip-flop and the clear input of said second flip-flop;

a first NAND gate having a first input connected to the not Q output of said first flip-flop, a second input connected to the not Q output of said second flip-flop, and an output connected to data input of said first flip-flop;

a second NAND gate having a first input connected to the Q output of said first flip-flop, a second input connected to the Q output of said second flip-flop and an output;

a first inverter having an input for receiving said power down signal and an output;

a third NAND gate having a first input connected to the Q output of said first flip-flop, a second input connected to the output of said inverter and an output;

a fourth NAND gate having a first input connected to the output of said first NAND gate, a second input connected to the output of said second NAND gate, a third input connected to the output of said third NAND gate and an output connected to the data input of said second flip-flop;

a fifth NAND gate having a first input for receiving said power down signal, a second input connected to the not Q output of said second flip-flop and an output;

a sixth NAND gate having a first input connected to the output of said fifth NAND gate, a second input connected to the Q output of said first flip-flop, a third input connected to said logic one signal and an output;

a seventh NAND gate having a first input connected to said logic one signal, a second input connected to the output of said sixth NAND gate, a third input connected to the output of said voltage sensing circuit and an output for providing said enable signal; and a second inverter having an input connected to the output of said seventh nand gate and an output for providing said third reset signal.

15. The nonvolatile memory system of claim 13 wherein said nonvolatile static RAM interface circuit means comprises:

first and second flip-flops, each of said first and second flip-flops having a data input, a clock input, a Q output, a preset input and a clear input;

the clear and preset inputs of said first flip-flop and the clear input of said second flip-flop being connected to a logic one signal;

the preset input of said second flip-flop receiving said power up signal;

the clock input of said second flip-flop said PHI3 clock signal;

the data input of said first flip-flop being receiving the first bit of each pair of digital data bits of said key word;

the Q output of said second flip-flop connected to the nonvolatile enable input of said nonvolatile static digital data storage means;

a first NOR gate having a first input for receiving said read/write digital logic signal, a second input for receiving address bit zero from said second address generating means and an output connected to the clock input of said first flip-flop;

a first inverter having an input for receiving address bit zero from said second address generating means and an output;

a second NOR gate having a first input connected to the output of said first inverter, a second input for receiving said read/write digital logic signal and an output;

a third NOR gate having a first input connected to the Q output of said second flip-flop, a second input connected to ground and an output;

a fourth NOR gate having a first input connected to the output of said second NOR gate, a second input connected to the output of said third NOR gate and an output connected to the write enable input of said nonvolatile static digital data storage means;

a second inverter having an input connected to the output of said fourth NOR gate and an output connected to output enable input of said nonvolatile static digital data storage means;

a first tristate output buffer gate having a data input connected to the Q output of said first flip-flop, an enable input connected to the output of said fourth NOR gate and an output connected to the first data input/output of said nonvolatile digital data storage means;

a second tristate output buffer gate having a data input for receiving each digital data bit of said key word, an enable input connected to the output of said fourth NOR gate and an output connected to the second data input/output of said nonvolatile static digital data storage means;

a third tristate output buffer gate having an input connected to the first data input/output of said nonvolatile digital data storage means, an enable input for receiving address bit zero from said second address generating means and an output; and a fourth tristate output buffer gate having an input connected to the second data input/output of said nonvolatile static digital data storage means, an enable input connected to the output of said first inverter and an output connected to the output of said third tristate buffer.

16. The nonvolatile memory system of claim 13 wherein said counter means comprises:

a first inverter having an input for receiving said third reset signal and an output;

a first D flip-flop having a data input connected to a logic one signal, a clock input for receiving said system clock signal, a clear input connected to the output of said first inverter and a not Q output;

a second flip-flop having a data input, a clock input for receiving said system clock signal, a clear input connected to the not Q output of said first flip-flop, a not Q output connected to the data input of said second D flip-flop and a Q output;

a third D flip-flop having a data input, a clock input connected to the Q output of said second flip-flop, a clear input connected to the not Q output of said first flip-flop, a not Q output connected to the data input of said third D flip-flop and a Q output;

a second inverter having an input connected to the not Q output of said first flip-flop and an output for providing said first reset signal;

a first NOR gate having a first input for receiving said system clock signal, a second input connected to the not Q output of said first flip-flop, a third input connected to the Q output of said second flip-flop, a fourth input connected to the Q output of said third flip-flop and an output;

a second NOR gate having a first input for receiving said system clock signal, a second input connected to the not Q output of said second flip-flop, a third input connected to the not Q output of said third flip-flop and an output for providing said PHI1 clock signal;

a third NOR gate having a first input for receiving said system clock signal, a second input connected to the Q output of said second flip-flop, a third input connected to the not Q output of said third flip-flop and an output for providing said PHI2 clock signal;

a fourth NOR gate having a first input for receiving said system clock signal, a second input connected to the Q output of said second flip-flop, a third input connected to the Q output of said third flip-flop and an output;

a fifth NOR gate having a first input connected to the not Q output of said flip-flop, a second input for receiving said system clock signal, a third input and an output for providing said PHI012 clock signal;

a NAND gate having a first input for receiving said system clock signal, a second input connected to the Q output of said second flip-flop and an output; and a third inverter having an input connected to the output of said NAND gate and an output connected to the third input of said fifth NOR gate.

17. The nonvolatile memory system of claim 13 wherein said first address generating means comprises:

ten first through tenth negative edge triggered J K flip-flops, each of said J K flip-flops having a J input connected to a logic one signal, a K input connected to said logic one signal, a clock input, a preset input, a clear input and a Q output;

the clock input of said first JK flip-flop receiving said PHI012 clock signal;

the Q output of said first JK flip-flop being connected to the clock input of said second J K flip-flop, the Q output of said second J K flip-flop being connected to the clock input of said third J K flip-flop, the Q output of said third J K flip-flop being connected to the clock input of said fourth J K flip-flop, the Q output of said fourth J K flip-flop being connected to the clock input of said fifth J K flip-flop, the Q output of said fifth J K flip-flop being connected to the clock input of said sixth J K flip-flop, the Q output of said sixth J K flip-flop being connected to the clock input of said seventh J K flip-flop, the Q output of said seventh J K flip-flop being connected to the clock input of said eighth J K flip-flop, the Q output of said eighth J K flip-flop being connected to the clock input of said ninth J K flip-flop and the Q output of said ninth J K flip-flop being connected to the clock input of said tenth J K flip-flop;

first through tenth load circuits, each of said load circuits having a data input, a reset input for receiving said first reset signal, a load input for receiving said parallel load signal, a data input, a preset output and a clear output;

the data inputs of said first and second load circuits being connected to a logic zero and the data inputs of said third, fourth, fifth, sixth, seventh, eighth, ninth and tenth load circuits being respectively connected to first, second, third, fourth, fifth, sixth, seventh and eighth Q outputs of said second program instruction storage means;

the preset outputs of said first, second, third, fourth, fifth, sixth, seventh, eighth, ninth and tenth load circuits being respectively connected to the preset inputs of said first, second, third, fourth, fifth, sixth, seventh, eighth, ninth and tenth J K flip-flop; and the clear outputs of said first, second, third, fourth, fifth, sixth, seventh, eighth, ninth and tenth load circuits being respectively connected to the clear inputs of said first, second, third, fourth, fifth, sixth, seventh, eighth, ninth and tenth J K flip-flops.

18. The nonvolatile memory system of claim 17 wherein each of said load circuits comprises:

a first NAND gate having a first input for receiving said first reset signal, a second input and an output;

a second NAND gate having a first input for receiving said first reset signal, a second input and an output;

an inverter having an input for receiving said parallel load signal and an output connected to the second input of said second nand gate;

a third NAND gate having a first input connected to the output of said first NAND gate, a second input connected to the output of said second NAND gate and an output connected to the clear input of a respective one of said J K flip-flops; and a fourth NAND gate having a first input for receiving said parallel load signal, an output connected to the present input of a respective one of said J K flip-flops and a second input;

the second inputs of first and fourth NAND gates of said first and second load circuits being connected to said logic zero signal and the second inputs of the first and fourth NAND gates of said third, fourth, fifth, sixth, seventh, eighth, ninth and tenth load circuits being respectively connected to the first, second, third, fourth, fifth, sixth, seventh and eighth Q outputs of said second program instruction storage means.

19. The nonvolatile memory system of claim 13 wherein each of said first, second and third program instruction storage means comprises eight negative edge triggered D flip-flops.

20. The nonvolatile memory system of claim 13 wherein said second address generating means comprises:

first through eleventh negative edge triggered J K flip-flops, each of said J K flip-flops having a J input connected to a logic one signal, a K input connected to said logic one signal, a preset input connected to said logic one signal, a clock input, a clear input and a Q output;

the clock input of said first J K flip-flop receiving said increment address generating means clock signal;

clear input of each of said J K flip-flops receiving said second reset signal;

the Q output of said first J K flip-flop being connected to the clock input of said second J K flip-flop, the Q output of said second J K flip-flop being connected to the clock input of said third J K flip-flop, the Q output of said third J K flip-flop being connected to the clock input of said fourth J K flip-flop, the Q output of said fourth J K flip-flop being connected to the clock input of said fifth J K flip-flop, the Q output of said fifth J K flip-flop being connected to the clock input of said sixth J K flip-flop, the Q output of said sixth J K flip-flop being connected to the clock input of said seventh J K flip-flop, the Q output of said seventh J K flip-flop being connected to the clock input of said eighth J K flip-flop, the Q output of said eighth J K flip-flop being connected to the clock input of said ninth J K flip-flop, the Q output of said ninth J K flip-flop being connected to the clock input of said tenth J K flip-flop and the Q output of said tenth J K flip-flop being connected to the clock input of said eleventh J K flip-flop.

21. The nonvolatile memory system of claim 13 wherein said flip-flop means comprises a negative edge triggered D type flip-flop.

22. The nonvolatile memory system of claim 13 wherein at least one of the program instructions latched within said third program instruction storage means when supplied to and decoded by said control circuit means will result in said control circuit means providing said read/write digital logic signal to said nonvolatile static digital data storage means.

* * * * *